(12) United States Patent  (10) Patent No.: US 8,744,890 B1
Bernier et al.  (45) Date of Patent:  Jun. 3, 2014

(54) SYSTEM AND METHOD FOR MANAGING SYSTEM-LEVEL WORKFLOW STRATEGY AND INDIVIDUAL WORKFLOW ACTIVITY

(71) Applicants: Clark Bernier, San Francisco, CA (US); Derek Choy, San Francisco, CA (US); William Hunt, Saratoga, CA (US); Robert Willson, Tokyo (JP); David Ehrlich, San Francisco, CA (US); John O'Holleran, San Francisco, CA (US)

(72) Inventors: Clark Bernier, San Francisco, CA (US); Derek Choy, San Francisco, CA (US); William Hunt, Saratoga, CA (US); Robert Willson, Tokyo (JP); David Ehrlich, San Francisco, CA (US); John O'Holleran, San Francisco, CA (US)

(73) Assignee: Aktana, Inc., San Francisco, CA (US)

( * ) Notice: Subject to any disclaimer, the term of this patent is extended or adjusted under 35 U.S.C. 154(b) by 0 days.

(21) Appl. No.: 13/767,815

(22) Filed: Feb. 14, 2013

(51) Int. Cl.
 *G06Q 10/00* (2012.01)
(52) U.S. Cl.
 USPC ....... 705/7.16; 705/7.11; 705/7.12; 705/7.13; 705/7.17; 705/7.18; 705/7.21; 705/7.22; 705/7.27
(58) Field of Classification Search
 USPC ...................................................... 705/7.16
 See application file for complete search history.

(56) References Cited

U.S. PATENT DOCUMENTS

| | | | |
|---|---|---|---|
| 5,394,324 A | 2/1995 | Clearwater | |
| 5,487,168 A | 1/1996 | Geiner et al. | |
| 5,606,602 A | 2/1997 | Johnson et al. | |
| 5,640,569 A | 6/1997 | Miller et al. | |
| 5,826,244 A | 10/1998 | Huberman | |
| 5,835,896 A | 11/1998 | Fisher et al. | |
| 5,890,138 A | 3/1999 | Godin et al. | |
| 5,905,975 A | 5/1999 | Ausubel | |
| 5,946,388 A | 8/1999 | Walker et al. | |
| 6,006,194 A | 12/1999 | Merel | |
| 6,021,398 A | 2/2000 | Ausubel | |
| 6,023,685 A | 2/2000 | Brett et al. | |
| 6,032,123 A | 2/2000 | Jameson | |
| 6,061,506 A | 5/2000 | Wollaston et al. | |
| 6,067,525 A | 5/2000 | Johnson et al. | |
| 6,115,698 A | 9/2000 | Tuck et al. | |
| 6,151,589 A | 11/2000 | Aggarwal et al. | |
| 6,356,836 B1* | 3/2002 | Adolph | 701/410 |
| 6,578,005 B1* | 6/2003 | Lesaint et al. | 705/7.14 |
| 6,671,676 B1 | 12/2003 | Shacham | |
| 6,801,520 B2 | 10/2004 | Philonenko | |
| 6,857,004 B1 | 2/2005 | Howard et al. | |
| 6,907,405 B2 | 6/2005 | Brett | |
| 6,970,844 B1* | 11/2005 | Bierenbaum | 705/39 |
| 7,110,977 B2 | 9/2006 | Semret et al. | |
| 7,139,721 B2 | 11/2006 | Borders et al. | |
| 7,219,080 B1 | 5/2007 | Wagoner et al. | |

(Continued)

OTHER PUBLICATIONS

Smith, Stephen Leslie; "Task allocation and vehicle routing in dynamic environments"; University of California, Santa Barbara; ProQuest, UMI Dissertations Publishing, 2009. 3379516.*

(Continued)

*Primary Examiner* — Leland Marcus
(74) *Attorney, Agent, or Firm* — Pillsbury Winthrop Shaw Pittman LLP

(57) ABSTRACT

A system and method for managing workflow including the ability to manage system-level workflow strategy, manage individual workflow activity, and provide suggestions to optimize individual workflow activity, is provided. The system may provide suggestions to workers based on their schedules and activities that the workers have to perform. Users of the system may configure the criteria used in determining which suggestions to provide to workers. The system may refine the suggestions provided to workers based on feedback received regarding the suggestions previously provided.

26 Claims, 26 Drawing Sheets

(56) References Cited

U.S. PATENT DOCUMENTS

| | | | |
|---|---|---|---|
| 7,349,863 B1 * | 3/2008 | Pena-Mora et al. | 705/7.12 |
| 7,461,022 B1 | 12/2008 | Churchill et al. | 705/37 |
| 7,516,088 B2 | 4/2009 | Johnson et al. | 705/16 |
| 7,546,248 B2 | 6/2009 | Ellison et al. | 705/11 |
| 7,574,388 B1 | 8/2009 | Peebler | 705/35 |
| 7,620,564 B1 | 11/2009 | Lippock | 705/10 |
| 7,729,931 B1 | 6/2010 | Tobin | 705/7 |
| 7,783,511 B2 | 8/2010 | Sridharan | 705/9 |
| 7,809,628 B1 | 10/2010 | West et al. | 705/37 |
| 7,877,266 B2 | 1/2011 | Brydon et al. | 705/1.1 |
| 7,899,697 B2 | 3/2011 | Boss et al. | 705/1.1 |
| 7,941,341 B2 | 5/2011 | Johnson et al. | 705/16 |
| 7,949,578 B2 | 5/2011 | Johnson et al. | 705/16 |
| 7,974,870 B2 | 7/2011 | Ikezawa | 705/7.38 |
| 8,019,632 B2 | 9/2011 | Niheu et al. | 705/7.11 |
| 8,032,402 B2 | 10/2011 | Aleksiejczyk et al. | 705/7.13 |
| 8,046,252 B2 | 10/2011 | Urano et al. | 705/7.25 |
| 8,185,429 B2 | 5/2012 | Howard | 705/7.26 |
| 8,260,627 B2 | 9/2012 | Davidson | 705/1.1 |
| 8,271,317 B2 | 9/2012 | Thompson et al. | 705/7.29 |
| 8,271,355 B2 | 9/2012 | Johnson et al. | 705/26.81 |
| 8,296,173 B2 | 10/2012 | Raffel et al. | 705/7.29 |
| 8,296,174 B2 | 10/2012 | Raffel et al. | 705/7.29 |
| 2002/0072957 A1 | 6/2002 | Thompson et al. | 705/10 |
| 2002/0082892 A1 | 6/2002 | Raffel et al. | 705/8 |
| 2002/0143687 A1 | 10/2002 | Bahar | 705/37 |
| 2003/0050825 A1 | 3/2003 | Gallivan et al. | 705/10 |
| 2003/0187769 A1 | 10/2003 | Muramatsu et al. | 705/35 |
| 2005/0192831 A1 | 9/2005 | Ellison et al. | 705/1 |
| 2005/0283420 A1 | 12/2005 | Bailey et al. | 705/37 |
| 2006/0085211 A1 | 4/2006 | Bennett et al. | 705/1 |
| 2006/0129447 A1 | 6/2006 | Dockery et al. | 705/10 |
| 2006/0190310 A1 | 8/2006 | Gudla et al. | 705/7 |
| 2006/0293930 A1 | 12/2006 | Rodgers et al. | 705/5 |
| 2007/0027787 A1 | 2/2007 | Tripp | 705/36 |
| 2007/0055564 A1 * | 3/2007 | Fourman | 705/11 |
| 2007/0087756 A1 * | 4/2007 | Hoffberg | 455/450 |
| 2007/0143198 A1 | 6/2007 | Brandes et al. | 705/36 R |
| 2007/0165608 A1 | 7/2007 | Altberg et al. | 370/352 |
| 2007/0255611 A1 | 11/2007 | Mezo et al. | 705/9 |
| 2007/0282618 A1 * | 12/2007 | Barahona et al. | 705/1 |
| 2007/0282650 A1 | 12/2007 | Jackness et al. | 705/7 |
| 2008/0004929 A9 | 1/2008 | Raffel et al. | 705/8 |
| 2008/0046471 A1 | 2/2008 | Moore et al. | 707/104.1 |
| 2008/0077464 A1 * | 3/2008 | Gottlieb et al. | 705/8 |
| 2008/0140597 A1 * | 6/2008 | Satir et al. | 706/46 |
| 2008/0183533 A1 | 7/2008 | Raffel et al. | 705/7 |
| 2008/0183563 A1 | 7/2008 | Raffel et al. | 705/10 |
| 2008/0195429 A1 | 8/2008 | Hoff | 705/7 |
| 2008/0262893 A1 | 10/2008 | Hoffberg | 705/8 |
| 2008/0301024 A1 | 12/2008 | Boss et al. | 705/37 |
| 2008/0306840 A1 | 12/2008 | Houlihan et al. | 705/28 |
| 2009/0248479 A1 | 10/2009 | Johnson et al. | 705/8 |
| 2009/0254423 A1 | 10/2009 | Ellison et al. | 705/11 |
| 2009/0265204 A1 | 10/2009 | Stinchcombe et al. | 705/37 |
| 2009/0265205 A1 | 10/2009 | Stinchcombe et al. | 705/37 |
| 2009/0319344 A1 | 12/2009 | Tepper et al. | 705/11 |
| 2010/0042456 A1 | 2/2010 | Stinchcombe et al. | 705/35 |
| 2010/0138263 A1 | 6/2010 | Goldberg et al. | 705/7 |
| 2010/0153243 A1 | 6/2010 | Bird et al. | 705/30 |
| 2010/0211424 A1 | 8/2010 | Hill | 705/8 |
| 2010/0211434 A1 | 8/2010 | McKean | 705/10 |
| 2011/0035228 A1 | 2/2011 | Li et al. | 705/1.1 |
| 2011/0106549 A1 | 5/2011 | Hoff | 705/1.1 |
| 2011/0125668 A1 | 5/2011 | Colliat et al. | 705/348 |
| 2011/0196717 A1 | 8/2011 | Colliat et al. | 705/7.29 |
| 2011/0202388 A1 | 8/2011 | Luby et al. | 705/7.32 |
| 2011/0264486 A1 | 10/2011 | Johnson et al. | 705/7.36 |
| 2011/0295648 A1 | 12/2011 | Nicholas | 705/7.29 |
| 2011/0313840 A1 * | 12/2011 | Mason et al. | 705/14.35 |
| 2011/0320238 A1 | 12/2011 | Niheu et al. | 705/7.24 |
| 2012/0054112 A1 | 3/2012 | Gormish et al. | 705/301 |
| 2012/0095804 A1 | 4/2012 | Calabrese et al. | 705/7.31 |
| 2012/0185163 A1 * | 7/2012 | Boschker et al. | 701/411 |
| 2012/0227044 A1 * | 9/2012 | Arumugham et al. | 718/100 |
| 2012/0253866 A1 | 10/2012 | Hill | 705/7.12 |
| 2012/0265576 A1 | 10/2012 | Howard | 705/7.15 |

OTHER PUBLICATIONS

Schermerhorn, Paul W.; "The cost of communication: Efficient coordination in multi-agent territory exploration tasks"; University of Notre Dame; ProQuest, UMI Dissertations Publishing, 2006. 3406911.*

Chester, Louie Benjamin; "The Applicability of Management by Objectives to the Management of Research and Development"; The University of Arizona, ProQuest, UMI Dissertations Publishing, 1977. 7718660.*

Saenz, Oscar Alejandro; "Framework for enterprise systems engineering"; Florida International University, ProQuest, UMI Dissertations Publishing, 2005. 3257515.*

Metreo's Customers Gain $550 Million in Revenues with Smart Pricing Suite, http://findarticles.com/p/articles/mi_pwwi/is_200507/ai_n14822275, Jul. 2005.

* cited by examiner

| Factor | Parameter | Default Value |
|---|---|---|
| Timing | Overdue Accelerator<br>When optimal pace is followed, full performance of a workflow associated with a customer can be achieved. Once a worker falls behind in pacing, targets are at risk and a customer's score is accelerated. | 1.5 |
|  | Per Day Pacing Score<br>Adds value for everyday between performing a recurring activity of a same type. This increments the customer's score in a linear fashion, increasing their importance each day. | 1.0 |
| Activity Value | Activity Relative Weights<br>Weighting the value of an activity based on its position in a workflow | All = 1.0 |
|  | "Activity #" Relative Weights<br>This parameter enables prioritizing the value of performing an activity in a workflow which has only had 2 out of 3 required activities performed over performing an activity in a workflow where 5 out of 6 required activities have been performed. | All = 1.0 |
|  | Promoted Product Bonus<br>Used to add emphasis to customers targeted for seasonally promoted products without changing workflows and/or weights | 25% |
|  | Individual Product Weights<br>Weighting the value of a product detail based on its position in a workflow | All = 1.0 |
| Availability | Customer has Availability Bonus<br>Based on customer availability data entered by the workers and/or learned by the system, a bonus score is applied to distinguish this customer from other similarly scored customers who are less likely to meet with the worker on a given day | 100% |
|  | Customer is Unavailable Penalty<br>Similar to availability scores, if a customer is known to be unavailable, their score is discounted | -100% |
| Location | Travel Time Penalty/Bonus Factor<br>A travel time penalty is used to discount the score of customers who are further away. This will allow for convenient & important customers to float to the top of the suggestions. | 30 |

Fig. 24

SYSTEM AND METHOD FOR MANAGING SYSTEM-LEVEL WORKFLOW STRATEGY AND INDIVIDUAL WORKFLOW ACTIVITY

FIELD OF THE INVENTION

The invention relates to a system and method for managing workflow including the ability to manage system-level workflow strategy, manage individual workflow activity, and provide suggestions to optimize individual workflow activity.

BACKGROUND OF THE INVENTION

Generally speaking, companies prepare strategies aimed to enhance the sale of their products and/or services. These strategies may be focused on segments of the markets, specific products and/or services, geographic territories, and/or other focuses. These strategies are often multi-tiered, focusing on global criteria such as, for example, segments of the markets, specific products and/or services, geographic territories, and/or other global criteria, as well as personnel-based criteria such as, for example, individual sales goals, individual activity goals, and/or other personnel-based criteria. Often, employees are left to implement personnel-level strategies using their own judgment.

Conventional workflow management tools may exist, but have various limitations and drawbacks. For example, conventional workflow management tools may be limited to providing functionality for personnel to schedule activities and manage time based on their respective judgment of how to achieve associated goals. These and other drawbacks exist.

SUMMARY OF THE INVENTION

The disclosure relates to a system and method for managing workflow including the ability to manage system-level workflow strategy, manage individual workflow activity, and provide suggestions to optimize individual workflow activity.

According to an aspect of the invention, the system may facilitate more efficient and optimized sales performance for a company. For example, the system may enable workers who participate in sales of products to schedule activities and manage time based on strategy goals set by managers of the company and by using suggestions provided by the system to more effectively meet their performance goals. The system may also facilitate the development of strategies and workflows by managers of the company to help increase sales of one or more products provided by the company. The system may also use machine-learning to optimize the suggestions provided to workers and the development of strategies and workflows by managers.

As used herein, a product may comprise a tangible product, an intangible product, a service, and/or other type of good.

A company may include a plurality of workers and a plurality of managers. A worker may be, for example, an employee, a contractor, a sub-contractor, and/or another type of worker that engages in sales activity related to products of the company.

As used herein, a strategy may comprise a plan related to the sale of products to one or more customers. Strategies may be associated with enhancing global company performance, enhancing sales of one or more products, enhancing sales across one or more geographical territories, enhancing worker performance via access and/or usage of the system, and/or other company goals. For example, strategies may be developed to enhance sales of a product in a specific territory, to increase usage of the system by workers, to enhance cross-sales of related products, to enhance sales to one or more market segments, and/or to otherwise affect company goals. A company may maintain a plurality of strategies for one or more company goals and/or one or more levels of abstraction for a company goal. Information related to an individual strategy may comprise, for example, one or more of: strategy name, associated segments, associated customers, market conditions (e.g., level of activity in market, type of market, competitors, and/or other market conditions), timeframe when strategy is active, number of associated workflows, information related to associated workflows, projected sales, impact of strategy (e.g., change in performance metrics from previous strategy, changes in worker performance from previous strategy, and/or other indications of the impact of the strategy), cost to implement, return on investment, level of abstraction, a priority level of the strategy, and/or other information related to the strategy. A level of abstraction may be based, for example, on one or more of market segments, territories, products, customers, workers, and/or other factors.

As used herein, a workflow may comprise one or more activities by which a strategy may be implemented. A workflow may be directed toward one or more of: overall product strategy, overall customer strategy, individual product strategy, individual customer strategy, strategy for selling an individual product to a specific customer, and/or other levels of strategy implementation. A workflow may comprise a plurality of activities to be performed at predetermined times, where one or more activities of a same type may be performed on a recurring basis. Information related to a workflow may include one or more of: a number of activities, types of the individual activities, when an individual activity is to occur, an order of activities, one or more types of messaging recommended for an individual activity, an estimated cost for an individual activity, an estimated cost for an individual activity for a specific customer, information related to previous activity execution, one or more communication channels via which to execute an individual activity, one or more communication channels via which to execute an individual activity for a specific customer, one or more products to associate with an individual activity, potential cross-sale products to associate with an individual activity, whether an activity is a recurring activity, a cycle for a recurring activity, and/or other information related to activities to be implemented. An activity may comprise a communication with a customer such as, for example, an in-person visit, email, text, phone call, attending an event, sending a gift, providing a sample product, providing information about a product, providing information about a potential cross-sale product, and/or other communication.

A system for workflow management may comprise a computing device including a physical processor configured to perform some or all of a functionality of a plurality of modules. In some implementations, the computing device may comprise a non-transitory, tangible computer-readable storage medium with an executable program stored thereon, wherein the program instructs a microprocessor to perform some or all of the functionality of the plurality of modules. The plurality of modules may include, for example, a strategy management module, a suggestion management module, a trigger management module, an activity management module, a worker management module, a gamification module, a transaction management module, a reporting module, a role-based permissions module, and/or other modules. A manager, worker, and/or other user may access the workflow management system via, for example, one or more interfaces (e.g., web pages) communicated from the computing device to a client device, an application such as a mobile application executing on a client device that generates the interface based on information communicated from the computing device, an agent running on the computing device, and/or via other interfaces.

The strategy management module may be configured to determine market segmentation, develop one or more sales strategies, monitor workflow execution for different market segments based on the developed strategies, prepare optimal workflows based on the developed strategies, and/or perform other functionality related to strategy management. The suggestion management module may be configured to determine suggested activities for a workflow, facilitate selection of criteria for determining suggestions, incorporate feedback from previously suggested activities, facilitate sharing suggested activities and/or feedback related to suggested activities, and/or perform other functionality related to managing suggested activities. The trigger management module may be configured to provide triggers for scheduled activities for a workflow based on workflow strategy, facilitate acceptance of triggers for scheduled activities, and/or perform other functionality related to managing triggers to prompt workflow activity. The activity management module may display scheduled activities, facilitate addition, removal, and editing of scheduled activities, display suggestions for activities, facilitate acceptance, pushing, and dismissal of suggestions, store templates for workflow activity, create scheduled activities based on stored templates, prepare optimal schedules based on an associated workflow, and/or perform other functionality related to managing workflow activity. The worker management module may be configured to store information relating to workers, and/or perform other functionality related to managing workers. The gamification module may be configured to track performance of workflow activity by worker, provide incentives related to access and/or use of the workflow management system, and/or perform other functionality related to monitoring access of the workflow management system. The transaction management module may be configured to track transactions relating to workflow activity, implement one or more business models associated with access and/or usage of the system, and/or other perform other functionality related to managing transactions. The reporting module may be configured to facilitate analysis and report information related to system usage, information related to strategy and/or workflow execution, customer analytics, market analysis, product analysis, and/or other information stored via the system. The role-based permission module may be configured to tailor access to the system based on one or more roles associated with a user of the system.

Strategy Management Module

The strategy management module may be configured to determine market segmentation, develop one or more sales strategies, monitor workflow execution for different market segments based on the developed strategies, prepare optimal workflows based on the developed strategies, and/or perform other functionality related to strategy management. In some implementations, the strategy management module may comprise a segmentation module, a strategy development module, a workflow management module, and/or other modules.

The segmentation module may be configured to determine market segments for sales efforts. In some implementations, segmentation module may determine market segments based on one or more levels of abstraction. For example, levels of abstraction may include company-level abstraction, product-level abstraction, territorial-level abstraction, worker-level abstraction, customer-level abstraction, and/or other levels of abstraction. Company-level abstraction may comprise segmentation based on, for example, territory, products, customers, workers, historical sales data, learned information, and/or other global criteria. Product-level abstraction may comprise segmentation based on information related to products provided by the company. Territorial-level abstraction may comprise segmentation based on information related to products, customers, workers, and/or other information related to a specific territory. Worker-level abstraction may comprise segmentation based on information related to workers and/or a team of related workers. Customer-level abstraction may comprise segmentation based on information related to one or more customers and/or potential customers.

The segmentation module may determine market segments at one or more levels of abstraction based on one or more segmentation criteria, including, for example, performance metrics for strategies related to stored market segments, information related to territories, product information, product inventory, information related to product demand, information related to potential cross-sale products available, applicable laws and/or regulations, information related to customers, information related to one or more targeted communication channels for respective customers, information related to workers, historical sales data, customer networks, feedback received via workers associated with a respective product, territory, and/or team included in the market segment, information related to specific targeted customers, and/or other segmentation criteria. The segmentation module may be configured to refine segmentation based on the segmentation criteria used to determine market segments. For example, when one or more segmentation criteria is updated via the system, the segmentation module may revise market segments at one or more levels of abstraction based on statistical and/or computational analysis of the stored information related to the segmentation criteria. In some implementations, based on the analysis of the segmentation criteria, the segmentation module may be configured to recommend combining, splitting, and/or removing existing market segments, developing new market segments, combining, splitting, and/or removing existing levels of abstraction, developing new levels of abstraction, and/or other market segmentation revisions. In some implementations, the segmentation module may automatically revise market segments at periodic intervals.

In some implementations, the segmentation module may use one or more of mutation analysis, chi-square tests, basis t-test, KNN and support-vector machines, logistic regression (e.g., GLM, and/or other tools for performing logistic regression), and/or other tools to determine, revise, and/or otherwise affect market segments at one or more levels of abstraction.

The strategy development module may be configured to store information relating to a plurality of strategies, monitor metrics related to company performance, revise existing strategies, facilitate the display of information related to strategy execution and company performance, and/or perform other functionality related to managing strategies. The strategy development module may store information related to a plurality of strategies for one or more company goals and/or one or more levels of abstraction for a company goal. For example, strategies may be developed to enhance sales of a product in a specific territory, to increase usage of the system by workers, to enhance cross-sales of related products, to enhance sales to one or more market segments, and/or to otherwise affect company goals. An individual strategy may comprise one or more workflows associated with one or more market segments, with an individual workflow to be executed for a predetermined time period.

The strategy development module may store strategy information related to an individual strategy. Strategy information may comprise one or more of: strategy name, associated segments, associated customers, market conditions (e.g., level of activity in market, type of market, competitors, and/or other market conditions), customer networks, timeframe when strategy is active, number of associated workflows, information related to associated workflows, projected sales, impact of strategy (e.g., change in performance metrics from previous strategy, change in worker performance from previous strategy, and/or other indications of the impact of the strategy), cost to implement, return on investment, priority level, and/or other information related to the strategy. The strategy development module may be configured to obtain one or more portions of strategy information from one or more users of the system via one or more interfaces of one or more client devices, from storage associated with the system, from statistical and/or computational analysis of data related to company performance stored at the storage, and/or by other methods.

The strategy development module may be configured to monitor metrics related to company performance. For example, strategy development module may monitor, for one or more strategies, a number of customers associated with the strategy, a number of sales to the associated customers, profit associated with the strategy, profit associated with an individual customer, number of sales associated with the strategy, number of sales per individual customer, number of activities associated with the strategy, percentage of strategy execution, number of sales per activity, product inventory, overall return on investment for strategy, return on investment for customers associated with the strategy, one or more indicators of strategy efficiency (e.g., percentage of activities completed, whether a threshold number of activities have been executed, and/or other indicators of strategy efficiency), and/or other information related to performance and execution of an individual strategy.

In some implementations, the strategy development module may be configured to revise an individual strategy based on information updated via the system. For example, the strategy development module may automatically update an individual strategy to include different segments based on revised segmentation performed by the segmentation module. The strategy development module may update an individual strategy based on an updated workflow associated with the strategy, input from users of the system, feedback received from workers, updated information stored via the system, statistical and/or computational analysis of data related to company performance, and/or other information. Updated information stored via the system may include, for example, a new cost to implement a strategy, an updated ROI associated with a strategy, updated analysis of one or more metrics, updated predictions related to one or more metrics, cost/benefit analysis of one or more strategies, one or more workflows, one or more workflow activities, and/or other cost, updated historical sales data, updated predictions related to sales data, and/or other updated information. In some implementations, the strategy development module may be configured to provide recommendations to users based on information updated via the system.

The strategy development module may be configured to display information related to one or more strategies stored in the storage via one or more interfaces of a client device. In some implementations, strategy development module may be configured to facilitate filtering of available strategies by product, by customer, by market segment, by territory, and/or by other criteria. Strategy development module may be configured to display, for an individual strategy, one or more of: strategy name, associated product, market conditions, associated segments, associated workflows, number of customers for which strategy is implemented, impact of strategy, cost of strategy, ROI for strategy, and/or other information related to the strategy. In some implementations, strategy development module may be configured to facilitate the editing of a displayed strategy. The strategy development module may be configured to facilitate the editing, creation, and/or deletion of a strategy using drag/drop functionality to include, change, and/or remove information related to the strategy. For example, an interface displaying the strategies may comprise information related to market segments, market conditions, workflows, and/or other information related to a strategy via which strategy information may be changed.

The workflow management module may be configured to monitor workflow execution based on the developed strategies, prepare optimal workflows based on the developed strategies, display performance execution of a workflow, and/or perform other functionality related to workflow management.

The workflow management module may be configured to monitor workflow execution based on the stored strategies. In some implementations, the workflow management module may be configured to display information related to one or more workflows for a strategy stored in the storage via one or more interfaces of a client device. For example, the workflow management module may be configured to display progress of execution of a workflow through display of, for example, a toolbar, a percentage of workflow executed, whether a threshold amount of activity associated with the workflow has been executed, and/or by other visual indicators. In some implementations, the workflow management module may be configured to display progress of execution for an individual workflow for a specific strategy, workflows associated with a specific customer, workflows for a team of workers, workflows for a specific worker, workflows for a geographic territory, workflows for a market segment, workflows for a product, workflows across the company, and/or other types of workflows.

The workflow management module may be configured to prepare optimal workflows based on the developed strategies at one or more levels of abstraction. As mentioned above, a workflow may be directed toward one or more of: overall product strategy, overall customer strategy, individual product strategy, individual customer strategy, a strategy for selling an individual product to a specific customer, and/or other levels of strategy implementation. The workflow management module may be configured to prepare an optimal workflow based on a stored workflow associated with a stored strategy. As mentioned above, a workflow may comprise a plurality of activities to be performed at predetermined times, where one or more activities of a same type may be performed on a recurring basis. A workflow may comprise one or more workflow elements including, for example, one or more of: a number of activities, the respective types of the individual activities, when an individual activity is to occur, an order of the activities, one or more types of messaging recommended for an individual activity, an estimated cost for an individual activity, information related to previous activity execution, one or more communication channels via which to execute an individual activity, one or more products to associate with an individual activity, potential cross-sale products to associate with an individual activity, whether an activity is a recurring activity, a cycle for a recurring activity, and/or other elements related to activities to be implemented. The workflow management module may prepopulate data for one or more elements of the workflow. For an optimal workflow, the workflow module may prepopulate data for one or more elements based on statistical and/or computational analysis of data stored at the storage. The data may be associated with previously executed workflows, may be data input into the system by one or more users, may be based on feedback received via the system relating to previously executed workflows, and/or may be other data related to the workflow.

In some implementations, the workflow management module may be configured to prepare one or more optimal workflows for an existing workflow associated with a stored strategy. The one or more workflows may be prepared to maximize different returns, including, for example, customer satisfaction, ROI, gross sales, worker performance, efficiency, reduced costs, and/or other goals.

In some implementations, the workflow management module may use one or more of cadence and response curves, GLM survival/hazard modules, A/B testing, regression analysis (e.g., GLM models and/or other regression models), multinomial models, neural net models, descriptive statistics, and/or other tools to manage workflows.

Suggestion Management Module

The suggestion management module may be configured to determine suggestions for activities for a worker, facilitate selection of criteria used to determine suggestions, incorporate feedback from previously suggested activities, and/or perform other functionality related to managing suggested activities. Suggestions may be displayed to a worker via functionality associated with activity management module (described below). In some implementations, suggestions may be displayed via an interface on a client device through which a worker accesses their schedule. In some implementations, the suggestion management module may comprise a suggestion determination module, a suggestion configuration module, a learning module, and/or other modules.

The suggestion determination module may be configured to determine suggestions for activities for a worker. A suggestion may comprise information related to the activity, a suggested time at which the activity is to be performed, location information associated with the activity (e.g., a specific location at which the activity is to be performed, a map of the location, directions to the location, and/or other location information), one or more rationales for the activity, information related to factors and/or parameters associated with the suggestion, information indicating whether the suggestion is new, and/or other information related to the activity. A rationale for a suggestion may be based, for example, on a score associated with one or more factors associated with the activity. For example, a rationale may be based on a factor with the highest score, a parameter of a factor with the highest score, a factor and/or parameter that most influenced the score for the suggestion, and/or other information related to the scoring of the activity. Information related to factors and/or parameters associated with the suggestion may comprise, for example, a number of days since an activity of the same type was performed, a known availability of the customer, a trigger associated with the suggestion, and/or other information. Information indicating whether the suggestion is new may comprise an icon, flag, coloring of the displayed suggestion, and/or other indication that the suggestion is new. A suggestion may be considered to be new when, for example, the suggestion was first provided within a prior predetermined time period, the suggestion relates to an activity that was added to a workflow within a prior predetermined time period, the suggestion relates a trigger that was provided within a prior predetermined time period, and/or for other reasons for which the suggestion may be considered to be a "new" suggestion.

The suggestion determination module may determine suggestions for activities for a worker based on one or more criteria. The criteria may include, for example, one or more factors, one or more parameters, weights associated with one or more selected factors, relative weights of one or more selected factors, weights associated with one or more selected parameters, relative weights of one or more selected parameters, bonuses associated with one or more factors, penalties associated with one or more factors, bonuses associated with one or more parameters, penalties associated with one or more parameters, bonuses associated with the overall suggestion, penalties associated with the overall suggestion, and/or other criteria used to determine which suggestions to provide. In some implementations, the criteria used to determine suggestions for a worker may depend upon an associated strategy, associated workflow, associated team of workers, information related to the worker for whom the suggestion is being provided, associated products, associated customers, and/or other levels of abstraction for which suggestions may be determined for the worker. The criteria and associated levels of abstractions used to determine suggestions for a worker may be stored in the storage associated with the system.

In some implementations, the suggestion determination module may be configured to determine relevant information to be provided with a suggestion for an activity. In these implementations, the suggestion determination module may store one or more rules relating to relevant information to provide based on the criteria used to determine suggestions, a level of abstraction associated with the suggestions being provided, the worker for whom suggestions are being provided, whether a trigger is associated with the suggestion, and/or other information related to providing suggestions.

Based on the rules associated with criteria used to determine a specific suggestion, a level of abstraction associated with the suggestion, a worker associated with the specific suggestion, and/or other information related to the specific suggestion, the suggestion determination module may determine relevant information to be provided with the specific suggestion. For example, the suggestion determination module may store a rule stating that location information should not be included in the relevant information displayed with a suggestion if the worker for whom the suggestion is provided has visited the location associated with the suggestion a predetermined number of times. Another example rule may state that location information is provided for a worker associated with a large territory, but location information is not provided for a worker associated with a small territory. Yet another example rule may state that information related to a product associated with the suggestion should be included as relevant information if one or more customers associated with the suggestion have purchased more than one product. Other types of rules may be stored as well. The rules stored by the suggestion determination module are not limited to the examples described herein.

In some implementations, relevant information for a suggestion always includes the rationale for a suggestion and information relating to the activity being suggested. In some implementations, the inclusion of a rationale for a suggestion and/or the inclusion of information relating to the activity being suggested as relevant information may depend upon the rules associated with the suggestion.

In some implementations, the suggestion determination module may determine relevant information based on rules associated with a suggestion and/or based on scores associated with the suggestion. For example, relevant information may include information based on one or more scores calculated when determining a score for the suggestion. The information included as relevant information may be based on scores that had a significant impact on the score for the suggestion. For example, scores that had a significant impact may include scores above an average threshold, a predetermined number of scores of the highest value, and/or other types of scores.

In some implementations, the suggestion determination module may determine only a predetermined number of items of relevant information to be provided for a suggestion. In some implementations, the suggestion determination module may provide all relevant information determined for a suggestion. A user of the system may determine a number of items of relevant information to be provided with a suggestion. In some implementations, the rules used to determine relevant information may also state a number of items of relevant information to be provided for a suggestion.

The rules used to determine relevant information to provide with a suggestion may be updated based on information stored at the system. For example, the rules may be updated based on feedback provided by users of the system, based on performance metrics relating to activities associated with the suggestions, based on an amount of acceptance of the suggestion, based on user input, and/or based on other information stored at the system.

In some implementations, the suggestion determination module may determine, for one or more activities to be performed in one or more workflows associated with the worker, one or more respective scores. The suggestion determination module may provide a predetermined number of suggestions with the highest scores (or lowest scores) to the worker via the activity management module. In some implementations, suggestions with a score above a predetermined threshold, suggestions within a first quartile of scores, and/or other groups of suggestions may be provided the worker. In some implementations, the suggestion determination module may calculate a score distribution (e.g., a matrix-based score distribution, and/or other score distribution) of the suggestions to determine which suggestions to provide to a worker. A suggestion with a higher score (or lower score based on weighting, bonuses, and penalties applied) may be indicated to a worker as having more importance than a suggestion with a lower score (or correspondingly, a higher score). In some implementations, an importance of a suggestion may be represented by an icon, label (e.g., high, medium, low, and/or other label), number, percentage based on other suggestions, rank relative to other suggestions, color, and/or indicator.

In some implementations, the suggestion determination module may determine a score for an activity based on a current location of the worker and/or a current time and schedule of the worker. The suggestion determination module may obtain location information for the worker via, for example, a client device associated with the worker, schedule information for the worker that includes location, and/or other information associated with the location for the worker. In these implementations, the suggestion determination module may determine suggestions that comprise specific location information and/or specific timing information related to performing the activity.

In some implementations, the suggestion determination module may be configured to determine one or more scores for one or more activities based on one or more system factors, one or more worker factors, and/or one or more other factors. System factors include, for example, activity value, activity timing, and/or other system factors. Worker factors include, for example, location, availability, and/or other worker factors.

The suggestion determination module may determine a score for an activity based on scores associated with the one or more system factors, one or more worker factors, and/or other factors associated with the activity. The scores associated with the factors may be based on standardized numerical scores associated with the values related to the factors. In some implementations, one or more factors may be scored with respective weights, penalties, bonuses, and/or other scoring effects. In some implementations, a factor may be associated with one or more parameters. A score for a factor may be based on scores for the one or more parameters. The scores associated with the parameters may be based on standardized numerical scores associated with the values related to the parameters. In some implementations, the one or more parameters may be scored with respective weights, penalties, bonuses, and/or other scoring effects. In some implementations, weights, penalties, bonuses, and/or other scoring effects may be based on information stored at storage, may be based on information updated by the learning module of the suggestion management module (as discussed below), and/or may be based on other information available via the system. In some implementations, weights, bonuses, penalties, and/or other scoring effects may be applied to a score for an activity based on one or more strategies associated with the activity, one or more workflows associated with the activity, one or more products associated with the activity, one or more customers associated with the activity, and/or based on other information associated with the activity.

The suggestion determination module may be configured to determine a score for an activity value factor associated with an activity based on one or more parameters. For example, the parameters may include performance execution (e.g., comparison of how many activities have been completed and total number of activities for the workflow, types of activities to be completed for the workflow, comparison of the number of activities of the same type of activity to be completed for the workflow and total number of activities of that type, and/or other information related to performance execution), number of activities of the same type performed and/or planned, value of product associated with activity, regulatory requirements associated with the activity, probable success of cross-sale of products when performing the activity, patent term for products associated with the activity, inventory of products associated with the activity, and/or other parameters. In some implementations, one or more parameters associated with the activity value factor may be weighted. For example, activities of a first type may be weighted higher or lower than activities of a second type. In some implementations, one or more bonuses may be associated with an activity when determining a score for activity value. The one or more bonuses may comprise, for example, a bonus based on market segment associated with workflow, a bonus based on promotions for a product associated with the activity, a bonus for promoting information about a specific product, a bonus for performing the activity in an order detailed by the workflow, a bonus for performing an activity before it is due to be performed according to the workflow, and/or other bonuses. In some implementations, one or more penalties may be associated with an activity when determining a score for activity value.

The suggestion determination module may be configured to determine a score for a timing factor associated with an activity based on one or more parameters. For example, the parameters may include time since activity of same type last performed, time since same type of activity in workflow last performed, time until next activity in workflow planned, optimal timing for activity (e.g., based on workflow, based on feedback provided by workers, based on data stored at storage, and/or based on other information obtained via the system), amount of time past optimal timing, probability of success associated with activity (e.g., based on feedback provided by workers, based on data at storage, and/or based on other information obtained via the system) and/or other parameters. In some implementations, one or more parameters associated with the timing factor may be weighted. For example, an amount of time past optimal timing may be weighted higher than other factors. In some implementations, one or more bonuses may be associated with an activity when determining a score for timing. The one or more bonuses may comprise, for example, a bonus for performing the activity in an order detailed by the workflow, a bonus for performing an activity before it is due to be performed according to the workflow, a bonus for performing the activity at the optimal timing, and/or other bonuses. In some implementations, one or more penalties may be associated with an activity when determining a score for timing.

The suggestion determination module may be configured to determine a score for an availability factor associated with an activity based on one or more parameters. For example, the parameters may include customer availability (e.g., provided by the system, provided by one or more workers, based on feedback provided by one or more workers, provided by the customer, obtained via an API configured to facilitate access a customer calendar, and/or based on other information obtained via the system), worker availability (e.g., based on worker schedule data obtained by storage, and/or based on other information obtained via the system), wait time associated with the activity (e.g., provided by the system, provided by one or more workers, provided via the customer, based on feedback provided by one or more workers, and/or based on other information obtained via the system), amount of time for performing the activity (e.g., provided by the system, provided by one or more workers, provided by the customer, based on feedback provided by one or more workers, and/or based on other information obtained via the system), and/or other parameters. In some implementations, one or more parameters associated with the availability factor may be weighted. In some implementations, one or more bonuses may be associated with an activity when determining a score for availability. In some implementations, one or more penalties may be associated with an activity when determining a score for availability. For example, a penalty may be associated with a known schedule conflict determined based on worker availability and/or customer availability.

The suggestion determination module may be configured to determine a score for a location factor associated with an activity based on one or more parameters. For example, the parameters may include proximity to location of activity at different times based on schedule information of worker, travel time to the activity, and/or other parameters. In some implementations, one or more parameters associated with the location factor may be weighted. In some implementations, one or more bonuses may be associated with an activity when determining a score for location. For example, a bonus may be associated with an activity within a predetermined radius of a worker's current location. In some implementations, one or more penalties may be associated with an activity when determining a score for location. For example, a penalty may be associated with an activity outside a predetermined radius of a worker's current location.

In some implementations, other factors considered by the suggestion determination module comprise customer information (e.g., amount of sales associated with customer, amount of sales of product associated with customer, time since customer purchased product associated with activity, and/or other customer information), sales trends associated with the activity, market share associated with the activity, and/or other factors. In some implementations, these factors may be scored with weights, penalties, bonuses, and/or other scoring effects.

The suggestion determination module may determine an overall score for a suggestion. For example, the suggestion determination module may determine an overall score by combining the scores of one or more factors related to the suggestion. The suggestion determination module may determine an overall score by using linear and/or non-linear functional forms for the one or more factors. In some implementations, the suggestion determination module may apply one or more applicable bonuses, penalties, and/or weights to the overall score. The suggestion determination module may combine the factors by using auto-calibration methods to ensure that adding a factor, removing a factor, or changing the parameters of a factor do not create an imbalance in the distribution of scores of suggestions. For example, the suggestion determination module may use one or more of: monte-carlo simulation techniques, automated sensitivity analyses, normalization of factor scores, functional forms that robustly handle non-normal score distributions, and/or other auto-calibration methods.

In some implementations, the suggestion determination module may automatically determine suggestions, may determine suggestion responsive to user input, and/or may determine suggestion at other times. For example, the suggestion determination module may determine suggestions on a periodic basis, upon provision of a new trigger, upon selection of criteria via the suggestion configuration module, upon addition, revision, or removal of a strategy, upon addition, revision, or removal of a workflow, upon addition, revision, or removal of workers to a team, upon addition, revision, or removal of one or more workers from the system, and/or based upon other activity in the system.

A suggestion configuration module may be configured to facilitate selection of criteria used to determine which suggestions to provide to a worker. The criteria may include, for example, one or more factors, one or more parameters, weights associated with one or more selected factors, relative weights of one or more selected factors, weights associated with one or more selected parameters, relative weights of one or more selected parameters, bonuses associated with one or more factors, penalties associated with one or more factors, bonuses associated with one or more parameters, penalties associated with one or more parameters, bonuses associated with the overall suggestion, penalties associated with the overall suggestion, and/or other criteria used to determine which suggestions to provide. In some implementations, the suggestion configuration module may be configured to facilitate selection one or more of strategy, workflow, team of workers, one or more individual workers, one or more types of workers, products, customers, and/or other groupings for which suggestions may be determined. In these implementations, the criteria selected via the suggestion configuration module may be applied to determining suggestions for the selected grouping.

The suggestion configuration module may be configured to display expected performance metrics associated with the selected criteria. For example, the suggestion configuration module may be configured to automatically update and display expected performance metrics upon a revision of selected criteria by a user.

In some implementations, the suggestion configuration module may be configured to provide pre-set combinations of criteria. The pre-set combinations of criteria may be associated with one or more strategies, one or more workflows, one or more products, one or more customers, one or more teams of workers, one or more individual workers, one or more types of workers, and/or other grouping for which suggestions may be determined. The pre-set combinations of criteria may include a combination of factors, weights associated with the factors, bonuses and/or penalties associated with the factors, parameters associated with the factors, weights associated with the respective parameters, bonuses and/or penalties associated with the respective parameters, bonuses and/or penalties associated with the suggestion, and/or other criteria used in determining a suggestion. The suggestion configuration module may be configured to display information related to available pre-set combinations of criteria based on groupings selected by a user.

In some implementations, the suggestion configuration module may use one or more of A/B testing, genetic algorithms, distributed Monte Carlo simulations, optimization techniques, and/or other tools to simulate the impact of a selection of criteria for determining suggestions will have on performance metrics. The suggestion configuration module may be configured to facilitate A/B testing of different combinations of criteria, manage trial runs of different combinations of criteria, and/or otherwise determine the impact of different combinations of criteria used to determine suggestions. In some implementations, the suggestion configuration module may automatically perform A/B testing of one or more combinations of criteria for determining suggestions across one or more strategies, one or more workflows, one or more products, one or more customers, one or more teams of workers, one or more workers, and/or across one or more other groupings.

In some implementation, the learning module of the suggestion management module may be configured to update how suggestions are scored based on feedback from previously suggested activities (e.g., based on whether a suggestion was pushed, dismissed, accepted, ignored, and/or otherwise treated, based on feedback provided with treatment of a suggestion, and/or based on other information related to feedback from previously suggested activities), based on feedback from scheduled activities, based on performance execution of a workflow (e.g., based on completing an activity in a workflow, based on reaching a threshold of performance execution for the workflow, and/or based on other information related to performance execution), based on historical sales data associated with a workflow, and/or based on other information available via the system.

The learning module may be configured to update weights associated with one or more parameters and/or one or more factors considered by the suggestion management module. For example, the learning module may be configured to update weights, bonuses, penalties, and/or other scoring effects based on feedback provided by workers related to a suggestion, based on whether suggestions were followed by workers, based on updated strategies stored at the system, based on updated workflows stored at the system, based on updated regulatory information, based on updated legal information, and/or based on other information available via the system. In some implementations, the learning module may update weights associated with one or more factors and/or one or more parameters based on length of time since an activity of a same type was performed, based on an amount of time since a customer purchased a product, and/or based on other historical data available via the system.

In some implementations, the learning module may update scoring effects, factors, parameters, and/or other attributes used for determining a score for a suggestion based on one or more of: date, location, market segment, product, economic conditions associated with the market segment, product, customer, and/or other abstraction-level, market type, and/or other information.

In some implementations, the learning module may use neural net heuristics and/or other tools to implement updating of weights, bonuses, penalties, and/or other scoring effects. Learning module may continuously update scoring effects, may periodically update scoring effects, may update scoring effects when information is updated via the system (e.g., feedback is received, a strategy is revised, a workflow is revised, and/or other information is updated), and/or may otherwise update scoring effects.

Trigger Management Module

The trigger management module may be configured to provide triggers for an activity based on workflow strategy, facilitate acceptance of triggers for scheduled activities, and/or perform other functionality related to managing triggers to prompt workflow activity. Triggers may be displayed to a worker via functionality associated with activity management module (discussed below). In some implementations, triggers may be displayed via an interface on a client device through which a worker accesses an associated schedule. Triggers may be provided based on sales data stored at system (e.g., changes in customer behavior learned from system, changes in customer data input via one or more workers and/or one or more managers, sales goals that were not met, sales goals that were exceeded, and/or other information related to sales data), based on marketing events (e.g., promotions associated with a product, promotions associated with cross-sale of a product, and/or other marketing events), based on triggers from other workers (e.g., a suggestion shared between workers, feedback from another worker, and/or other information provided from workers), based on regulatory changes, based on strategies associated with a worker (e.g., activities associated with a strategy, changes in a strategy, and/or other information associated with the strategy). In some implementations, when a trigger is provided to a worker, the worker may be allowed a predetermined amount of time to accept the trigger before the trigger is automatically included as a scheduled event for the worker.

Activity Management Module

The activity management module may be configured to display scheduled activities, facilitate addition, removal, and editing of scheduled activities, accept feedback regarding scheduled activities, display suggestions, accept feedback regarding suggestions, store templates for scheduling activity, create scheduled activities based on stored templates, prepare proposed templates for scheduling activity based on an associated workflow, share suggestions, shared schedule activities, and/or perform other functionality related to managing activities. In some implementations, the activity management module may comprise a calendar management module, a template management module, a sharing module, and/or other modules.

The calendar management module of the activity management module may be configured to display scheduled activities, facilitate the addition, removal and editing of scheduled activities, accept feedback regarding scheduled activities, display suggestions for scheduled activities, accept feedback regarding suggestions, and/or perform other functionality related to managing scheduled activities. The calendar management module may be configured to display a schedule of activities for a worker. For example, the calendar management module may be configured to display a schedule of activities for a specific day, for a specific week, for a specific month, by date range, by activity type, by location, by product, by customer, by strategy, by workflow, and/or by other criteria. The calendar management module may be configured to display information related to a scheduled activity including, for example, data associated with the activity, notes stored by the worker relating to the activity, activity information stored at the storage, contact information of a customer associated with the activity, tips related to a customer associated with the activity, and/or other information related to the activity.

The calendar management module may be configured to facilitate the addition, removal, and/or editing of a scheduled activity. The calendar management module may be configured to create an activity to be scheduled with or without a specific time and date associated with the activity. In some implementations, when a worker creates an activity, the calendar management module may suggest times for the activity based on worker availability, based on expected length of event, based on expected wait time associated with the activity, based on availability of a customer associated with the activity, based on travel time to the activity, and/or based on other information relating to the activity.

In some implementations, the calendar management module may be configured to prompt a worker for feedback relating to a completed schedule event. For example, the calendar management module may be configured to prompt the worker to provide feedback relating to a wait time experienced by the worker for the activity, a length of time for performing the activity, information learned during the activity, tips for handling the activity, notes related to the performance of the activity, and/or other information. The feedback provided by the worker may be used by the suggestion management module, the activity management module, the strategy management module, and/or other modules to optimize strategy, workflows, suggestions provided to the worker, and/or other functionality of the system.

In some implementations, the calendar management module may be configured to restrict the creation of a scheduled activity based on strategy and/or workflow associated with the activity. For example, the calendar management module may be configured to restrict the creation of a scheduled activity by a worker when a same type of activity occurred the same day, when a same type of activity occurred within a predetermined time period, when the scheduled activity is contrary to regulations and/or laws, and/or for other reasons.

In some implementations, the calendar management module may be configured to display suggestions for activities provided by the suggestion management module, accept feedback regarding suggestions, and/or otherwise enable user interaction with suggestions provided by the suggestion management module. The calendar management module may be configured to display suggestions when displaying a schedule of the worker. Suggestions may be displayed based on an importance of the suggestion (as provided by the suggestion management module). For example, a suggestion displayed via the calendar management module may be displayed with an indicator of importance (e.g., a color, rank, percentage, and/or other indicator as discussed above with the suggestion management module). In some implementations, suggestions may be displayed by importance, by day, by week, by month, by customer, by location, by product, by rationale, by suggested date/time, by a date range, by filtering criteria associated with the display of the worker's schedule, and/or by other criteria. The calendar management module may facilitate the filtering of suggestions by importance, by day, by week, by month, by customer, by location, by product, by rationale, by suggested date/time, by a date range, by filtering criteria associated with the display of the worker's schedule, by treatment of suggestion (e.g., accepted, dismissed, pushed, ignored, and/or other treatment) and/or by other criteria. In some implementations, a suggestion may no longer be displayed once it has been accepted, dismissed, or ignored for a predetermined period of time.

The calendar management module may be configured to enable a worker to add a suggestion as a scheduled event. For example, the calendar management module may enable a worker to drag and drop a suggestion for an activity into an open time slot of a displayed schedule for the worker. In some implementations, the calendar management module may be configured to display an availability of one or more customers associated with an event for one or more time slots when the user is determining where to drag and drop an event. For example, the availability of one or more customers may be displayed via color, shading, and/or other indication.

In some implementations, the calendar management module may be configured to enable a worker to accept a suggestion, dismiss a suggestion, push a suggestion to another date and/or time, ignore a suggestion (e.g., fail to interact with a suggestion for a predetermined time period, and/or otherwise ignore the suggestion), and/or otherwise treat a suggestion. In some implementations, when a worker accepts a suggestion, the calendar management module may create a scheduled activity for the worker based on the activity of the suggestion. When a worker pushes a suggestion, the calendar management module may be configured to remove the suggestion from display and provide the suggestion for display after a pre-determined time period. The pre-determined time period may be a default pre-determined time period, or may be based on feedback provided by the worker. When a worker dismisses a suggestion, the calendar management module may remove the suggestion from display.

Based on treatment of a suggestion, the calendar management module may be configured to prompt the worker for feedback related to the treatment of the suggestion. For example, the calendar management module may be configured to prompt the worker to provide feedback relating to why the worker accepted the activity, why the worker pushed the activity, why the worker dismissed the activity, why the worker ignored the activity, activities that the worker would prefer as suggestions, and/or other information. The feedback provided by the worker may be used by the suggestion management module, the activity management module, the strategy management module, and/or other modules to optimize strategy, workflows, suggestions provided to the worker, and/or other functionality of the system.

In some implementations, the calendar management module may display scores related to the suggestion, scores related to factors associated with the suggestion, weights applied to the suggestion and/or factors associated with the suggestion, information associated with factors and/or parameters associated with the suggestion, and/or other information relating to how the suggestion was determined. The feedback provided by the worker may comprise information relating to one or more factors, one or more parameters, scoring of one or more factors, scoring of one or more parameters, application of one or more weights, application of one or more bonuses, application of one or more penalties, changes to values of one or more weights, bonuses, penalties, and/or other scoring effects, importance of the suggestion, and/or other information relating to the determination of the suggestion. The information associated with factors and/or parameters associated with the suggestion may comprise, for example, information that was calculated during the determination of a score for the suggestion, information used in determining a score for the suggestion, and/or other information that provides context and/or strategy associated with the suggestion.

The template management module may store templates for scheduling workflow activity, create scheduled activities based on stored templates, prepare proposed templates for scheduling workflow activity based on an associated workflow, and/or perform other functionality related to scheduling activity. In some implementations, the template management module may enable a worker to store a schedule of the worker as a template. The template management module may enable a worker to filter activities on a schedule of the worker to store as part of a template. For example, the activities may be filtered by location, activity type, associated product, associated customer, date range, and/or other criteria. In some implementations, the template management module may enable a worker to add notes related to a template. In some implementations, the template management module may be configured to prepare a proposed template for a worker based on activities scheduled for the worker and suggestions provided for the worker.

In some implementations, the sharing module of the suggestion management module may be configured to enable a worker to share suggestions for activities, responses to suggestions, feedback related to suggested activities, feedback related to scheduled activities, templates stored by a worker, schedules, and/or other information stored via the system. For example, the sharing module may facilitate sharing information from one worker to another via text message, calendar event, trigger, email, and/or other communication medium.

Worker Management Module

The worker management module may be configured to store information relating to one or more workers, information relating to teams of workers, and/or perform other functionality related to managing workers. For example, for an individual worker, the worker management module may be configured to store worker information, including, for example, one or more of: name, address, schedule, activities executed by the worker, feedback received from the worker related to scheduled activities, feedback received from the user related to suggestions, performance metrics associated with the user, amount of system access and system usage, one or more triggers associated with the worker, performance metrics associated with the worker, products to be sold by the worker, customers associated with the worker, territory associated with the worker, one or more teams associated with the worker, one or more market segments associated with the worker, one or more workflows associated with the products, customer, market segments, and/or territory associated with the worker, and/or other information related to the worker.

Gamification Module

The gamification module may be configured to track access and usage of the system by workers, provide incentives related to access and/or use of the workflow management system, and/or to perform other functionality related to monitoring access of the workflow management system.

In some implementations, the gamification module may be configured to track the access and/or usage of the system by workers. For example, the gamification module may store tracking information for a worker including, for example, frequency of access, length per access, percentage of activities for which a worker provided feedback, type of feedback provided, amount of feedback provided, number of suggestions used, number of suggestions dismissed, amount of feedback provided regarding dismissal of suggestion, number of suggestions pushed, amount of feedback provided regarding pushing of suggestions, number of templates stored by the worker, number of customers for which worker accessed system, number of products for which worker accessed system, and/or other tracking information.

The gamification module may be configured to provide incentives to a worker based on an amount of access and/or usage of the system by the worker. In some implementations, the gamification module may store one or more levels of usage associated with respective levels of rewards. A level of usage could be based on number of suggestions accepted, number of times feedback provided, frequency of use, and/or other tracking information. In some implementations, the gamification module may associate a suggestion provided to a worker with an incentive. For example, the gamification module may augment a suggestion to include the provision of a reward to the worker if the suggested is accepted by the worker.

In some implementations, the gamification module may be configured to compare tracking information between individual workers of a same team, between teams of workers, between some or all workers, and/or between other sets of users of the system. The gamification module may be configured to modify the rewards available to individual workers or teams of workers based on the comparison of tracking information.

Transaction Management Module

The transaction management module may be configured to track transactions relating to strategy, workflow, and workflow activity, implement one or more business models associated with access and/or usage of the system, and/or other perform other functionality related to managing transactions. The transaction management model may be configured to implement one or more business models associated with access and/or usage of the system. For example, the transaction management module may be configured to store information related to features of the system which a user may access for free and features of the system for which a user may need to pay for access. The transaction management model may also store information related to users who have unlimited access to the system. The transaction management module may further include the appropriate functionality for receiving and processing payments from customers, groups, and/or other entities, including, for example, credit card payments, payments via third parties such as PayPal, electronic check processing, and/or other types of payments.

Reporting Module

The reporting module may be configured to facilitate analysis and report information related to system usage, information related to strategy and/or workflow execution, customer analytics, market analysis, product analysis, and/or other information stored via the system.

Role-Based Permissions Module

The role-based permission module may be configured to tailor a user's access to the system based on one or more roles associated with the user. The role-based permission module may be configured to tailor a user's access to the system based on one or more roles associated with the user. The one or more roles may include system-level roles, company-based roles, and/or other roles. A user registered with the system may access the system based on the user's system-level role and company-level role. The role-based permissions module may maintain a plurality of system-level roles, including, for example, administrator, company, and/or other roles. System-level roles may grant access to various system features such as for example, access to one or more modules, access to information stored at a storage, and/or other access to system features. Different system-level roles may be granted that provide access to different system features.

Company-level roles may grant access to information related to a specific company. Company information may include, for example, information stored at the storage that is associated with the specific company. The role-based permissions module may maintain a plurality of company-level roles, including, for example, manager, worker, team, and/or other roles. Different company-based roles may be granted that provide access to different company information, provide access to different modules, and/or provide other access to the system.

In some implementations, the system may be used to manage strategy, workflow, and activity for workers across various industries. The types of industries include pharmaceutical sales, insurance, financial services, consumer goods, business services and office equipment, biotech and/or healthcare, telecommunications, technology services, and/or other industries.

The functionality of the system may be compatible with existing systems, may be integrated with one or more existing systems, or may be performed as a stand-alone system. For example, the system may be integrated with multiple existing systems, such as, for example, existing calendar management systems, existing workflow management systems, and/or other types of systems.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 6 illustrates an exemplary screenshot of an interface that displays strategies stored in the system, according to various implementations of the invention.

FIG. 7 illustrates an exemplary screenshot of an interface that facilitates editing one or more stored strategies, according to various implementations of the invention.

FIG. 13 depicts exemplary default values for weights to be applied to scores determined for factors and parameters, according to various implementations of the invention.

FIG. 24 illustrates an exemplary screenshot of an interface that displays a monthly schedule of a worker, according to various implementations of the invention.

DETAILED DESCRIPTION

Figure 1:
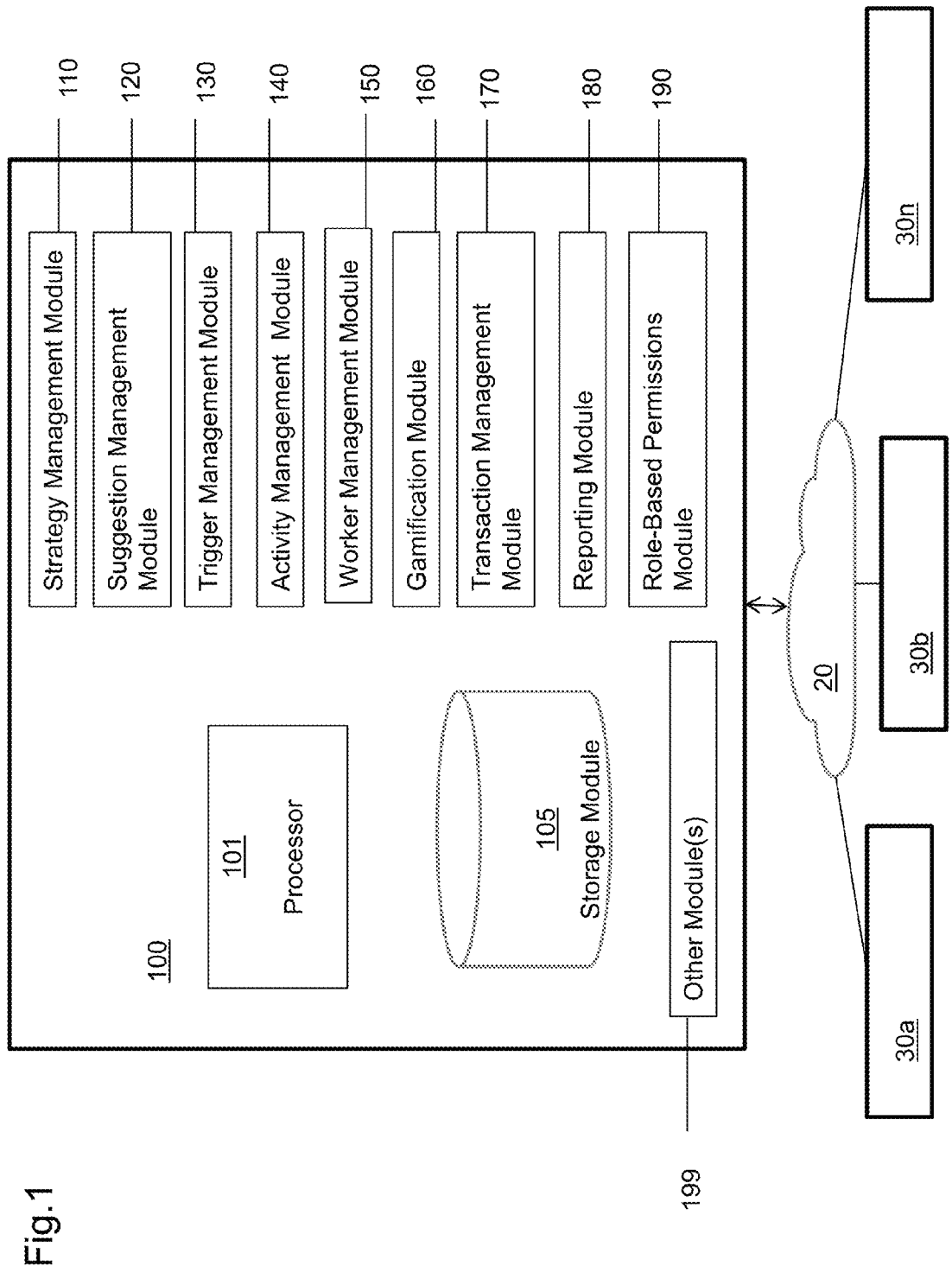
FIG. 1 illustrates a block diagram of an exemplary system for managing workflow including the ability to manage system-level workflow strategy, manage individual workflow activity, and provide suggestions to optimize individual workflow activity, according to an aspect of the invention.

FIG. 1 illustrates a diagram of a system 10 for managing workflow including the ability to manage system-level workflow strategy, manage individual workflow activity, and provide suggestions to optimize individual workflow activity, according to an implementation of the invention. The system 10 may include a network 20, a computing device 100, one or more client devices 30a, . . . , 30n, and/or other components. The computing device 100 may include a processor 101 configured to perform some or all of a functionality of a plurality of modules. In some implementations, the computing device 100 may comprise a non-transitory, tangible computer-readable storage medium (e.g., storage module 105) with an executable program stored thereon, wherein the program instructs a microprocessor (e.g., processor 101) to perform some or all of the functionality of the plurality of modules. The plurality of modules may include, for example, a strategy management module 110, a suggestion management module 120, a trigger management module 130, an activity management module 140, a worker management module 150, a gamification module 160, a transaction management module 170, a reporting module 180, a role-based permissions module 190, and/or other modules 199. A manager, worker, and/or other entity may access the workflow management system 10 via, for example, one or more interfaces (e.g., web pages) communicated from the computing device 100 to a client device, an application such as a mobile application executing on a client device that generates the interface based on information communicated from the computing device 100, an agent running on the computing device 100, and/or via other interfaces.

The strategy management module 110 may be configured to determine market segmentation, develop one or more sales strategies, monitor workflow execution for different market segments based on the developed strategies, prepare optimal workflows based on the developed strategies, and/or perform other functionality related to strategy management. The suggestion management module 120 may be configured to determine suggested activities for a workflow, incorporate feedback from previously suggested activities, facilitate sharing suggested activities and/or feedback related to suggested activities, and/or perform other functionality related to managing suggested activities. The trigger management module 130 may be configured to provide triggers for scheduled activities for a workflow based on workflow strategy, facilitate acceptance of triggers for scheduled activities, and/or perform other functionality related to managing triggers to prompt workflow activity. The activity management module 140 may display scheduled activities, display suggested activities, facilitate addition, removal, and editing of scheduled activities, store templates for workflow activity, create scheduled activities based on stored templates, prepare optimal schedules based on an associated workflow, and/or perform other functionality related to managing workflow activity. The worker management module 150 may be configured to store information relating to workers, and/or perform other functionality related to managing workers. The gamification module 160 may be configured to track performance of workflow activity by workers, provide incentives related to access and/or use of the workflow management system 10, and/or perform other functionality related to monitoring access of the workflow management system 10. The transaction management module 170 may be configured to track transactions relating to workflow activity, implement one or more business models associated with access and/or usage of the system 10, and/or other perform other functionality related to managing transactions. The reporting module 180 may be configured to facilitate analysis and report information related to system usage, information related to strategy and/or workflow execution, customer analytics, market analysis, product analysis, and/or other information stored via the system 10. The role-based permission module 190 may be configured to tailor access to the system 10 based on one or more roles associated with a user of the system 10.

Figure 2:
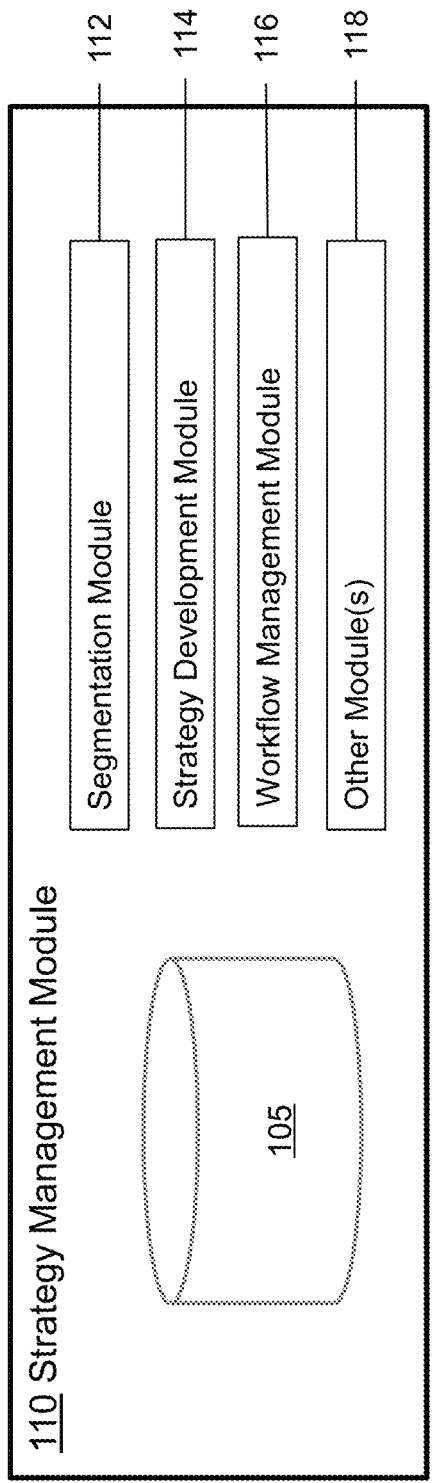
FIG. 2 illustrates a block diagram of an exemplary strategy management module, according to an aspect of the invention.

The strategy management module 110 may be configured to determine market segmentation, develop one or more sales strategies, monitor workflow execution for different market segments based on the developed strategies, prepare optimal workflows based on the developed strategies, and/or perform other functionality related to strategy management. FIG. 2 illustrates a block diagram of an exemplary strategy management module, according to an aspect of the invention. In some implementations, the strategy management module 110 may comprise a segmentation module 112, a strategy development module 114, a workflow management module 116, and/or other modules 118.

The segmentation module 112 may be configured to determine market segments for sales efforts. In some implementations, segmentation module 112 may determine market segments based on one or more levels of abstraction. For example, levels of abstraction may include company-level abstraction, product-level abstraction, territorial-level abstraction, worker-level abstraction, customer-level abstraction, and/or other levels of abstraction. Company-level abstraction may comprise segmentation based on, for example, territory, products, customers, workers, historical sales data, learned information, and/or other global criteria. Product-level abstraction may comprise segmentation based on information related to products provided by the company. Territorial-level abstraction may comprise segmentation based on information related to products, customers, workers, and/or other information related to a specific territory. Worker-level abstraction may comprise segmentation based on information related to products. Customer-level abstraction may comprise segmentation based on information related to one or more customers and/or potential customers.

The segmentation module 112 may determine market segments at one or more levels of abstraction based on one or more segmentation criteria, including, for example, performance metrics for strategies related to stored market segments, information related to territories, product information, product inventory, information related to product demand, information related to potential cross-sale products available, applicable laws and/or regulations, information related to customers, information related to one or more targeted communication channels for respective customers, information related to workers, historical sales data, customer networks, feedback received via workers associated with a respective product, territory, and/or team included in the market segment, information related to specific targeted customers, and/or other segmentation criteria. The segmentation module 112 may be configured to refine segmentation based on the segmentation criteria used to determine market segments. For example, when one or more segmentation criteria is updated via the system 10, the segmentation module may revise market segments at one or more levels of abstraction based on statistical and/or computational analysis of the stored information related to the segmentation criteria. In some implementations, based on the analysis of the segmentation criteria, the segmentation module 112 may be configured to recommend combining, splitting, and/or removing existing market segments, developing new market segments, combining, splitting, and/or removing existing levels of abstraction, developing new levels of abstraction, and/or other market segmentation revisions. In some implementations, the segmentation module 112 may automatically revise market segments at periodic intervals.

In some implementations, the segmentation module 112 may use one or more of mutation analysis, chi-square tests, basis t-test, KNN and support-vector machines, logistic regression (e.g., GLM, and/or other tools for performing logistic regression), and/or other tools to determine market segments at one or more levels of abstraction.

The strategy development module 114 may be configured to store information relating to a plurality of strategies, monitor metrics related to company performance, revise existing strategies, facilitate the display of information related to strategy execution and company performance, and/or perform other functionality related to managing strategies. The strategy development module 114 may store information related to a plurality of strategies for one or more company goals and/or one or more levels of abstraction for a company goal. For example, strategies may be developed to enhance sales of a product in a specific territory, to increase usage of the system 10 by workers, to enhance cross-sales of related products, to enhance sales to one or more market segments, and/or to otherwise affect company goals. An individual strategy may comprise one or more workflows associated with one or more market segments, with an individual workflow to be executed for a predetermined time period.

The strategy development module 114 may store strategy information related to an individual strategy. Strategy information may comprise one or more of: strategy name, associated segments, associated customers, market conditions (e.g., level of activity in market, type of market, competitors, and/or other market conditions), customer networks, timeframe when strategy is active, number of associated workflows, information related to associated workflows, projected sales, impact of strategy (e.g., change in performance metrics from previous strategy, change in worker performance from previous strategy, and/or other indications of the impact of the strategy), cost to implement, return on investment, priority level, and/or other information related to the strategy. The strategy development module 114 may be configured to obtain one or more portions of strategy information from one or more users of the system 10 via one or more interfaces of one or more client devices, from a storage associated with the system 10, from statistical and/or computational analysis of data related to company performance stored at the storage, and/or by other methods.

The strategy development module 114 may be configured to monitor metrics related to company performance. For example, strategy development module 114 may monitor, for one or more strategies, a number of customers associated with the strategy, a number of sales to the associated customers, profit associated with the strategy, profit associated with an individual customer, number of sales associated with the strategy, number of sales per individual customer, number of activities associated with the strategy, percentage of strategy execution, number of sales per activity, product inventory, overall return on investment for strategy, return on investment for customers associated with the strategy, one or more indicators of strategy efficiency (e.g., percentage of activities completed, whether a threshold number of activities have been executed, and/or other indicators of strategy efficiency), and/or other information related to performance and execution of an individual strategy.

In some implementations, the strategy development module 114 may be configured to revise an individual strategy based on information updated via the system 10. For example, the strategy development module 114 may automatically update an individual strategy to include different segments based on revised segmentation performed by the segmentation module. The strategy development module 114 may update an individual strategy based on an updated workflow associated with the strategy, input from users of the system 10, feedback received from workers, updated information stored via the system 10, statistical and/or computational analysis of data related to company performance, and/or other information. Updated information stored via the system 10 may include, for example, a new cost to implement a strategy, an updated ROI associated with a strategy, updated analysis of one or more metrics, updated predictions related to one or more metrics, cost/benefit analysis of one or more strategies, one or more workflows, one or more workflow activities, and/or other cost, updated historical sales data, updated predictions related to sales data, and/or other updated information. In some implementations, the strategy development module 114 may be configured to provide recommendations to users based on information updated via the system 10.

The strategy development module 114 may be configured to display information related to one or more strategies stored in the storage via one or more interfaces of a client device. In some implementations, strategy development module 114 may be configured to facilitate filtering of available strategies by product, by customer, by market segment, by territory, and/or by other criteria. Strategy development module 114 may be configured to display, for an individual strategy, strategy name, associated product, market conditions, associated segments, associated workflows, number of customers for which strategy is implemented, impact of strategy, cost of strategy, ROI for strategy, and/or other information related to the strategy. In some implementations, strategy development module 114 may be configured to facilitate the editing of a displayed strategy. The strategy development module 114 may be configured to facilitate the editing, creation, and/or deletion of a strategy using drag/drop functionality to include, change, and/or remove information related to the strategy. For example, an interface displaying the strategies may comprise information related to market segments, market conditions, workflows, and/or other information related to a strategy via which strategy information may be changed.

The workflow management module 116 may be configured to monitor workflow execution based on the developed strategies, prepare optimal workflows based on the developed strategies, display performance execution of a workflow, and/or perform other functionality related to workflow management.

The workflow management module 116 may be configured to monitor workflow execution based on the stored strategies. In some implementations, the workflow management module may be configured to display information related to one or more workflows for a strategy stored in the storage via one or more interfaces of a client device. For example, the workflow management module 116 may be configured to display progress of execution of a workflow through display of, for example, a toolbar, a percentage of workflow executed, whether a threshold amount of activity associated with the workflow has been executed, and/or by other visual indicators. In some implementations, the workflow management module 116 may be configured to display progress of execution for an individual workflow for a specific strategy, workflows associated with a specific customer, workflows for a team of workers, workflows for a specific worker, workflows for a geographic territory, workflows for a market segment, workflows for a product, workflows across the company, and/or other types of workflows.

The workflow management module 116 may be configured to prepare optimal workflows based on the developed strategies at different levels of abstraction. The workflow management module 116 may be configured to prepare an optimal workflow based on a stored workflow associated with a stored strategy. The workflow management module 116 may prepopulate data for one or more elements of the workflow. For an optimal workflow, the workflow module may prepopulate data for one or more elements based on statistical and/or computational analysis of data stored at the storage. The data may be associated with previously executed workflows, may be data input into the system 10 by one or more users, may be based on feedback received via the system 10 relating to previously executed workflows, and/or may be other data related to the workflow.

In some implementations, the workflow management module 116 may be configured to prepare one or more optimal workflows for an existing workflow associated with a stored strategy. The one or more workflows may be prepared to maximize different returns, including, for example, customer satisfaction, ROI, gross sales, worker performance, efficiency, reduced costs, and/or other goals.

The workflow management module 116 may use one or more of cadence and response curves, GLM survival/hazard modules, A/B testing, regression analysis (e.g., GLM models and/or other regression models), multinomial models, neural net models, descriptive statistics, and/or other tools to manage workflows.

Figure 3:
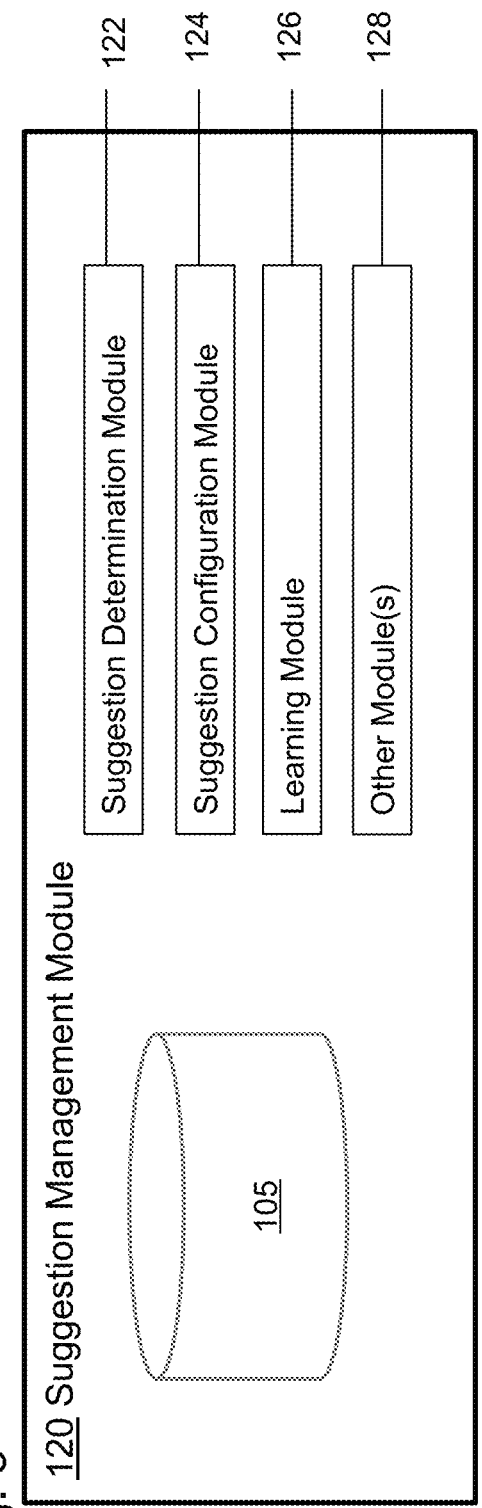
FIG. 3 illustrates a block diagram of an exemplary suggestion management module, according to an aspect of the invention.

Returning to FIG. 1, the suggestion management module 120 may be configured to determine suggestions for activities for a worker, incorporate feedback from previously suggested activities, and/or perform other functionality related to managing suggested activities. Suggestions may be displayed to a worker via functionality associated with activity management module 140 (described below). In some implementations, suggestions may be displayed via an interface on a client device through which a worker accesses their schedule. FIG. 3 illustrates a block diagram of an exemplary suggestion management module, according to an aspect of the invention. In some implementations, the suggestion management module 120 may comprise a suggestion determination module 122, a suggestion configuration module 124, a learning module 126, and/or other modules 128.

The suggestion determination module 122 may be configured to determine suggestions for activities for a worker. A suggestion may comprise information related to the activity, a suggested time at which the activity is to be performed, location information associated with the activity (e.g., a specific location at which the activity is to be performed, a map of the location, directions to the location, and/or other location information), one or more rationales for the activity, information related to factors and/or parameters associated with the suggestion, information indicating whether the suggestion is new, and/or other information related to the activity. A rationale for a suggestion may be based, for example, on a score associated with one or more factors associated with the activity. For example, a rationale may be based on a factor with the highest score, a parameter of a factor with the highest score, a factor and/or parameter that most influenced the score for the suggestion, and/or other information related to the scoring of the activity. Information related to factors and/or parameters associated with the suggestion may comprise, for example, a number of days since an activity of the same type was performed, a known availability of the customer, a trigger associated with the suggestion, and/or other information. Information indicating whether the suggestion is new may comprise an icon, flag, coloring of the displayed suggestion, and/or other indication that the suggestion is new. A suggestion may be considered to be new when, for example, the suggestion was first provided within a prior predetermined time period, the suggestion relates to an activity that was added to a workflow within a prior predetermined time period, the suggestion relates a trigger that was provided within a prior predetermined time period, and/or for other reasons for which the suggestion may be considered to be a "new" suggestion.

The suggestion determination module 122 may determine suggestions for activities for a worker based on one or more criteria. The criteria may include, for example, one or more factors, one or more parameters, weights associated with one or more selected factors, relative weights of one or more selected factors, weights associated with one or more selected parameters, relative weights of one or more selected parameters, bonuses associated with one or more factors, penalties associated with one or more factors, bonuses associated with one or more parameters, penalties associated with one or more parameters, bonuses associated with the overall suggestion, penalties associated with the overall suggestion, and/or other criteria used to determine which suggestions to provide. In some implementations, the criteria used to determine suggestions for a worker may depend upon an associated strategy, associated workflow, associated team of workers, information related to the worker for whom the suggestion is being provided, associated products, associated customers, and/or other levels of abstraction for which suggestions may be determined for the worker. The criteria and associated levels of abstractions used to determine suggestions for a worker may be stored in the storage associated with the system 10.

In some implementations, the suggestion determination module 122 may be configured to determine relevant information to be provided with a suggestion for an activity. In these implementations, the suggestion determination module 122 may store one or more rules relating to relevant information to provide based on the criteria used to determine suggestions, a level of abstraction associated with the suggestions being provided, the worker for whom suggestions are being provided, whether a trigger is associated with the suggestion, and/or other information related to providing suggestions.

Based on the rules associated with criteria used to determine a specific suggestion, a level of abstraction associated with the suggestion, a worker associated with the specific suggestion, and/or other information related to the specific suggestion, the suggestion determination module 122 may determine relevant information to be provided with the specific suggestion. For example, the suggestion determination module 122 may store a rule stating that location information should not be included in the relevant information displayed with a suggestion if the worker for whom the suggestion is provided has visited the location associated with the suggestion a predetermined number of times. Another example rule may state that location information is provided for a worker associated with a large territory, but location information is not provided for a worker associated with a small territory. Yet another example rule may state that information related to a product associated with the suggestion should be included as relevant information if one or more customers associated with the suggestion have purchased more than one product. Other types of rules may be stored as well. The rules stored by the suggestion determination module 122 are not limited to the examples described herein.

In some implementations, relevant information for a suggestion always includes the rationale for a suggestion and information relating to the activity being suggested. In some implementations, the inclusion of a rationale for a suggestion and/or the inclusion of information relating to the activity being suggested as relevant information may depend upon the rules associated with the suggestion.

In some implementations, the suggestion determination module 122 may determine relevant information based on rules associated with a suggestion and/or based on scores associated with the suggestion. For example, relevant information may include information based on one or more scores calculated when determining a score for the suggestion. The information included as relevant information may be based on scores that had a significant impact on the score for the suggestion. For example, scores that had a significant impact may include scores above an average threshold, a predetermined number of scores of the highest value, and/or other types of scores.

In some implementations, the suggestion determination module 122 may determine only a predetermined number of items of relevant information to be provided for a suggestion. In some implementations, the suggestion determination module 122 may provide all relevant information determined for a suggestion. A user of the system may determine a number of items of relevant information to be provided with a suggestion. In some implementations, the rules used to determine relevant information may also state a number of items of relevant information to be provided for a suggestion.

The rules used to determine relevant information to provide with a suggestion may be updated based on information stored at the system 10. For example, the rules may be updated based on feedback provided by users of the system 10, based on performance metrics relating to activities associated with the suggestions, based on an amount of acceptance of the suggestion, based on user input, and/or based on other information stored at the system 10.

In some implementations, the suggestion determination module 122 may determine, for one or more activities to be performed in one or more workflows associated with the worker, one or more respective scores. The suggestion determination module 122 may determine scores for activities to be performed in one or more workflows that have not yet been scheduled by the worker. The suggestion determination module 122 may determine scores for activities to be performed in one or more workflows that have not yet been scheduled and that are due to occur within a predetermined time period. The suggestion determination module 122 may determine scores for other subsets of activities in the one or more workflows associated with the worker.

The suggestion determination module 122 may provide a predetermined number of suggestions with the highest scores (or lowest scores) to the worker via the activity management module. In some implementations, suggestions with a score above a predetermined threshold, suggestions within a first quartile of scores, and/or other groups of suggestions may be provided the worker. In some implementations, the suggestion determination module 122 may calculate a score distribution (e.g., a matrix-based score distribution, and/or other score distribution) of the suggestions to determine which suggestions to provide to a worker. A suggestion with a higher score (or lower score based on weighting, bonuses, and penalties applied) may be indicated to a worker as having more importance than a suggestion with a lower score (or correspondingly, a higher score). In some implementations, an importance of a suggestion may be represented by an icon, label (e.g., high, medium, low, and/or other label), number, percentage based on other suggestions, rank relative to other suggestions, color, and/or indicator.

In some implementations, the suggestion determination module 122 may determine a score for an activity based on a current location of the worker and/or a current time and schedule of the worker. In some implementations, the suggestion determination module 122 may obtain location information for the worker via, for example, a client device associated with the worker, schedule information for the worker that includes location, and/or other information associated with the location for the worker. In these implementations, the suggestion determination module 122 may determine suggestions that comprise specific location information and/or specific timing information related to performing the activity.

The suggestion determination module 122 may be configured to determine one or more scores for one or more activities based on one or more system factors, one or more worker factors, and/or one or more other factors. System factors include, for example, activity value, activity timing, and/or other system factors. Worker factors include, for example, location, availability, and/or other worker factors.

The suggestion determination module 122 may determine a score for an activity based on scores associated with the one or more system factors, one or more worker factors, and/or other factors associated with the activity. The scores associated with the factors may be based on standardized numerical scores associated with the values related to the factors. In some implementations, one or more factors may be scored with respective weights, penalties, bonuses, and/or other scoring effects. In some implementations, a factor may be associated with one or more parameters. A score for a factor may be based on scores for the one or more parameters. The scores associated with the factors may be based on standardized numerical scores associated with the values related to the factors. In some implementations, the one or more parameters may be scored with respective weights, penalties, bonuses, and/or other scoring effects.

Weights, penalties, bonuses, and/or other scoring effects may be based on information stored at storage 105, may be based on information updated by the learning module of the suggestion management module (as discussed below), may be based on input received from managers, may be based on feedback received from workers, and/or may be based on other information available via the system 10. In some implementations, weights, bonuses, penalties, and/or other scoring effects may be applied to a score for an activity based on one or more strategies associated with the activity, one or more workflows associated with the activity, one or more products associated with the activity, one or more customers associated with the activity, and/or based on other information associated with the activity.

The suggestion determination module 122 may be configured to determine a score for an activity value factor associated with an activity based on one or more parameters. For example, the parameters may include performance execution (e.g., comparison of how many activities have been completed and total number of activities for the workflow, types of activities to be completed for the workflow, comparison of the number of activities of the same type of activity to be completed for the workflow and total number of activities of that type, and/or other information related to performance execution), number of activities of the same type performed and/or planned, value of product associated with activity, regulatory requirements associated with the activity, probable success of cross-sale of products when performing the activity, patent term for products associated with the activity, inventory of products associated with the activity, and/or other parameters. In some implementations, one or more parameters associated with the activity value factor may be weighted. For example, activities of a certain type may be weighted higher or lower than activities of another type. In some implementations, one or more bonuses may be associated with an activity when determining a score for activity value. The one or more bonuses may comprise, for example, a bonus based on market segment associated with workflow, a bonus based on promotions for a product associated with the activity, a bonus for promoting information about a specific product, a bonus for performing the activity in an order detailed by the workflow, a bonus for performing an activity before it is due to be performed according to the workflow, and/or other bonuses. In some implementations, one or more penalties may be associated with an activity when determining a score for activity value.

The suggestion determination module 122 may be configured to determine a score for a timing factor associated with an activity based on one or more parameters. For example, the parameters may include time since activity of same type last performed, time since activity in workflow last performed, time until next activity in workflow planned, optimal timing for activity (e.g., based on workflow, based on feedback provided by workers, based on data stored at storage 105, and/or based on other information obtained via the system 10), amount of time past optimal timing, probability of success associated with activity (e.g., based on feedback provided by workers, based on data at storage 105, and/or based on other information obtained via the system 10) and/or other parameters. In some implementations, one or more parameters associated with the timing factor may be weighted. For example, an amount of time past optimal timing may be weighted higher than other factors. In some implementations, one or more bonuses may be associated with an activity when determining a score for timing. The one or more bonuses may comprise, for example, a bonus for performing the activity in an order detailed by the workflow, a bonus for performing an activity before it is due to be performed according to the workflow, a bonus for performing the activity at the optimal timing, and/or other bonuses. In some implementations, one or more penalties may be associated with an activity when determining a score for timing.

The suggestion determination module 122 may be configured to determine a score for an availability factor associated with an activity based on one or more parameters. For example, the parameters may include customer availability (e.g., provided by the system 10, provided by one or more workers, based on feedback provided by one or more workers, provided by the customer, obtained via an API configured to facilitate access a customer calendar, and/or based on other information obtained via the system 10), worker availability (e.g., based on worker schedule data obtained by storage 105, and/or based on other information obtained via the system 10), wait time associated with the activity (e.g., provided by the system 10, provided by one or more workers, provided via the customer, based on feedback provided by one or more workers, and/or based on other information obtained via the system 10), amount of time for performing the activity (e.g., provided by the system 10, provided by one or more workers, provided by the customer, based on feedback provided by one or more workers, and/or based on other information obtained via the system 10), and/or other parameters. In some implementations, one or more parameters associated with the availability factor may be weighted. In some implementations, one or more bonuses may be associated with an activity when determining a score for availability. In some implementations, one or more penalties may be associated with an activity when determining a score for availability. For example, a penalty may be associated with a known schedule conflict determined based on worker availability and/or customer availability.

The suggestion determination module 122 may be configured to determine a score for a location factor associated with an activity based on one or more parameters. For example, the parameters may include proximity to location of activity at different times based on schedule information of worker, travel time to the activity, and/or other parameters. In some implementations, one or more parameters associated with the location factor may be weighted. In some implementations, one or more bonuses may be associated with an activity when determining a score for timing. For example, a bonus may be associated with an activity within a predetermined radius of a worker's current location. In some implementations, one or more penalties may be associated with an activity when determining a score for location. For example, a penalty may be associated with an activity outside a predetermined radius of a worker's current location.

In some implementations, other factors considered by the suggestion determination module 122 comprise customer information (e.g., amount of sales associated with customer, amount of sales of product associated with customer, time since customer purchased product associated with activity, and/or other customer information), sales trends associated with the activity, market share associated with the activity, and/or other factors. In some implementations, these factors may be scored with weights, penalties, bonuses, and/or other scoring effects.

The suggestion determination module 122 may determine an overall score for a suggestion. For example, the suggestion determination module may determine an overall score by combining the scores of one or more factors related to the suggestion. The suggestion determination module 122 may determine an overall score by using linear and/or non-linear functional forms for the one or more factors. In some implementations, the suggestion determination module 122 may apply one or more applicable bonuses, penalties, and/or weights to the overall score. The suggestion determination module 122 may combine the factors by using auto-calibration methods to ensure that adding a factor, removing a factor, or changing the parameters of a factor do not create an imbalance in the distribution of scores of suggestions. For example, the suggestion determination module 122 may use one or more of: monte-carlo simulation techniques, automated sensitivity analyses, normalization of factor scores, functional forms that robustly handle non-normal score distributions, and/or other auto-calibration methods.

In some implementations, the suggestion determination module 122 may automatically determine suggestions, may determine suggestion responsive to user input, and/or may determine suggestion at other times. For example, the suggestion determination module 122 may determine suggestions on a periodic basis, upon provision of a new trigger, upon selection of criteria via the suggestion configuration module, upon addition, revision, or removal of a strategy, upon addition, revision, or removal of a workflow, upon addition, revision, or removal of workers to a team, upon addition, revision, or removal of one or more workers from the system, and/or based upon other activity in the system.

A suggestion configuration module 124 may be configured to facilitate selection of criteria used to determine which suggestions to provide to a worker. The criteria may include, for example, one or more factors, one or more parameters, weights associated with one or more selected factors, relative weights of one or more factors, weights associated with one or more selected parameters, relative weights of one or more selected parameters, bonuses associated with one or more factors, penalties associated with one or more factors, bonuses associated with one or more parameters, penalties associated with one or more parameters, bonuses associated with the overall suggestion, penalties associated with the overall suggestion, and/or other criteria used to determine which suggestions to provide. In some implementations, the suggestion configuration module 124 may be configured to facilitate selection one or more of strategy, workflow, team of workers, one or more individual workers, one or more types of workers, products, customers, and/or other groupings for which suggestions may be determined. In these implementations, the criteria selected via the suggestion configuration module 124 may be applied to determining suggestions for the selected grouping.

The suggestion configuration module 124 may be configured to display expected performance metrics associated with the selected criteria. For example, the suggestion configuration module 124 may be configured to automatically update and display expected performance metrics upon a revision of selected criteria by a user.

In some implementations, the suggestion configuration module 124 may be configured to provide pre-set combinations of criteria. The pre-set combinations of criteria may be associated with one or more strategies, one or more workflows, one or more products, one or more customers, one or more teams of workers, one or more individual workers, one or more types of workers, and/or other grouping for which suggestions may be determined. The pre-set combinations of criteria may include a combination of factors, weights associated with the factors, bonuses and/or penalties associated with the factors, parameters associated with the factors, weights associated with the respective parameters, bonuses and/or penalties associated with the respective parameters, bonuses and/or penalties associated with the suggestion, and/or other criteria used in determining a suggestion. In some implementations, the suggestion configuration module 124 may be configured to display information related to available pre-set combinations of criteria based on groupings selected by a user.

In some implementations, the suggestion configuration module 124 may use one or more of A/B testing, genetic algorithms, distributed Monte Carlo simulations, optimization techniques, and/or other tools to simulate the impact of a selection of criteria for determining suggestions will have on performance metrics. The suggestion configuration module 124 may be configured to facilitate A/B testing of different combinations of criteria, manage trial runs of different combinations of criteria, and/or otherwise determine the impact of different combinations of criteria used to determine suggestions. In some implementations, the suggestion configuration module 124 may automatically perform A/B testing of one or more combinations of criteria for determining suggestions across one or more strategies, one or more workflows, one or more products, one or more customers, one or more teams of workers, one or more workers, and/or across one or more other groupings.

In some implementation, the learning module 126 of the suggestion management module 120 may be configured to update how suggestions are scored based on feedback from previously suggested activities (e.g., based on whether a suggestion was pushed, dismissed, accepted, ignored, and/or otherwise treated, based on feedback provided with treatment of a suggestion, and/or based on other information related to feedback from previously suggested activities), based on feedback from scheduled activities, based on performance execution of a workflow (e.g., based on completing an activity in a workflow, based on reaching a threshold of performance execution for the workflow, and/or based on other information related to performance execution), based on historical sales data associated with a workflow, and/or based on other information available via the system 10.

The learning module 126 may be configured to update weights associated with one or more parameters and/or one or more factors considered by the suggestion management module. For example, the learning module 126 may be configured to update weights, bonuses, penalties, and/or other scoring effects based on feedback provided by workers related to a suggestion, based on whether suggestions were followed by workers, based on updated strategies stored at the system 10, based on updated workflows stored at the system 10, based on updated regulatory information, based on updated legal information, and/or based on other information available via the system 10. In some implementations, the learning module 126 may update weights associated with one or more factors and/or one or more parameters based on length of time since an activity of a same type was performed, based on an amount of time since a customer purchased a product, and/or based on other historical data available via the system 10.

In some implementations, the learning module 126 may update scoring effects, factors, parameters, and/or other attributes used for determining a score for a suggestion based on one or more of: date, location, market segment, product, economic conditions associated with the market segment, product, customer, and/or other abstraction-level, market type, and/or other information.

In some implementations, the learning module 126 may use neural net heuristics and/or other tools to implement updating of weights, bonuses, penalties, and/or other scoring effects. Learning module 126 may continuously update scoring effects, may periodically update scoring effects, may update scoring effects when information is updated via the system 10 (e.g., feedback is received, a strategy is revised, a workflow is revised, and/or other information is updated), and/or may otherwise update scoring effects.

Returning to FIG. 1, the trigger management module 130 may be configured to provide triggers for an activity based on workflow strategy, facilitate acceptance of triggers for scheduled activities, and/or perform other functionality related to managing triggers to prompt workflow activity. Triggers may be displayed to a worker via functionality associated with activity management module (discussed below). In some implementations, triggers may be displayed via an interface on a client device through which a worker accesses an associated schedule. Triggers may be provided based on sales data stored at system 10 (e.g., changes in customer behavior learned from system 10, changes in customer data input via one or more workers and/or one or more managers, sales goals that were not met, sales goals that were exceeded, and/or other information related to sales data), based on marketing events (e.g., promotions associated with a product, promotions associated with cross-sale of a product, and/or other marketing events), based on triggers from other workers (e.g., a suggestion shared between workers, feedback from another worker, and/or other information provided from workers), based on regulatory changes, based on strategies associated with a worker (e.g., activities associated with a strategy, changes in a strategy, and/or other information associated with the strategy). In some implementations, when a trigger is provided to a worker, the worker may be allowed a predetermined amount of time to accept the trigger before the trigger is automatically included as a scheduled event for the worker.

Figure 4:
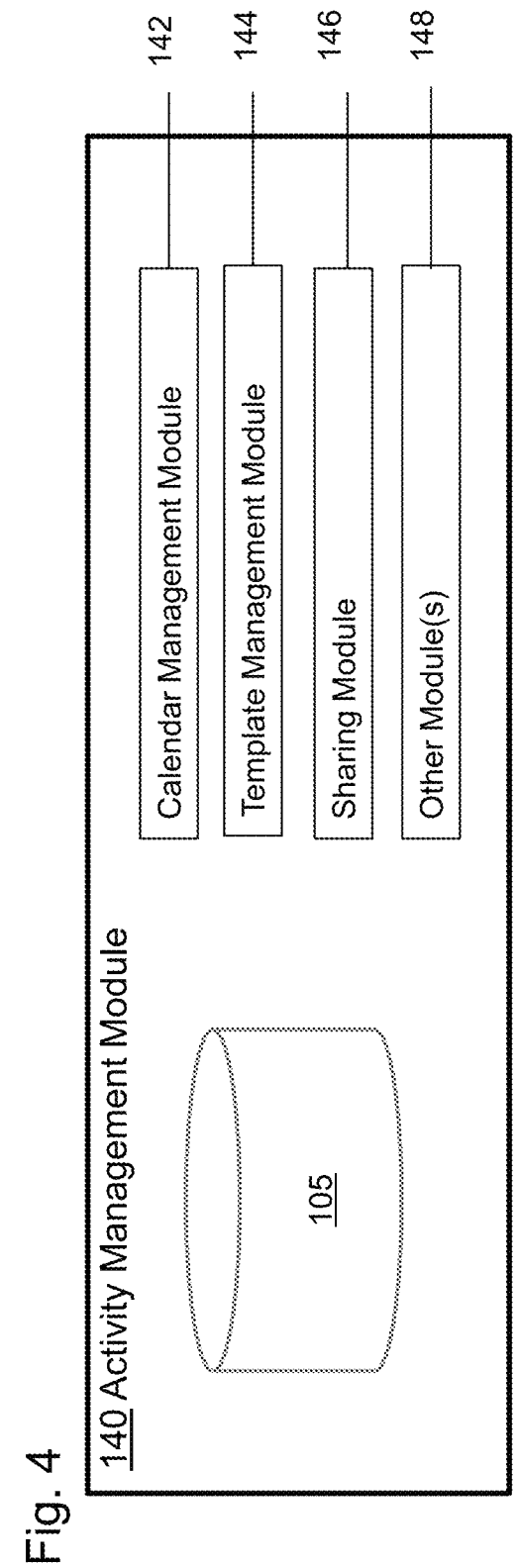
FIG. 4 illustrates a block diagram of an exemplary activity management module, according to an aspect of the invention.

Returning to FIG. 1, the activity management module 140 may be configured to display scheduled activities, facilitate addition, removal, and editing of scheduled activities, accept feedback regarding scheduled activities, display suggestions, accept feedback regarding suggestions, store templates for scheduling activity, create scheduled activities based on stored templates, prepare proposed templates for scheduling activity based on an associated workflow, share suggestions, shared schedule activities, and/or perform other functionality related to managing activities. FIG. 4 illustrates a block diagram of an exemplary activity management module, according to an aspect of the invention. In some implementations, the activity management module 140 may comprise a calendar management module 142, a template management module 144, a sharing module 146, and/or other module 148.

The calendar management module 142 of the activity management module 140 may be configured to display scheduled activities, facilitate the addition, removal and editing of scheduled activities, accept feedback regarding scheduled activities, display suggestions for scheduled activities, accept feedback regarding suggestions, and/or perform other functionality related to managing scheduled activities.

The calendar management module 142 may be configured to display a schedule of activities for a worker. For example, the calendar management module 142 may be configured to display a schedule of activities for a specific day, for a specific week, for a specific month, by date range, by activity type, by location, by product, by customer, by strategy, by workflow, and/or by other criteria. The calendar management module 142 may be configured to display information related to a scheduled activity including, for example, data associated with the activity, notes stored by the worker relating to the activity, activity information stored at the storage 105, contact information of a customer associated with the activity, tips related to a customer associated with the activity, and/or other information related to the activity.

The calendar management module 142 may be configured to facilitate the addition, removal, and/or editing of a scheduled activity. The calendar management module 142 may be configured to create an activity to be scheduled with or without a specific time and date associated with the activity. In some implementations, when a worker creates an activity, the calendar management module 142 may suggest times for the activity based on worker availability, based on expected length of event, based on expected wait time associated with the activity, based on availability of a customer associated with the activity, based on travel time to the activity, and/or based on other information relating to the activity.

In some implementations, the calendar management module 142 may be configured to prompt a worker for feedback relating to a completed schedule event. For example, the calendar management module may be configured to prompt the worker to provide feedback relating to a wait time experienced by the worker for the activity, a length of time for performing the activity, information learned during the activity, tips for handling the activity, notes related to the performance of the activity, and/or other information. The feedback provided by the worker may be used by the suggestion management module 120, the activity management module 140, the strategy management module 110, and/or other modules 199 to optimize strategy, workflows, suggestions provided to the worker, and/or other functionality of the system 10.

In some implementations, the calendar management module 142 may be configured to restrict the creation of a scheduled activity based on strategy and/or workflow associated with the activity. For example, the calendar management module 142 may be configured to restrict the creation of a scheduled activity by a worker when a same type of activity occurred the same day, when a same type of activity occurred within a predetermined time period, when the scheduled activity is contrary to regulations and/or laws, and/or for other reasons.

In some implementations, the calendar management module 142 may be configured to display suggestions for activities provided by the suggestion management module 120, accept feedback regarding suggestions, and/or otherwise enable user interaction with suggestions provided by the suggestion management module 120. The calendar management module 142 may be configured to display suggestions when displaying a schedule of the worker. The calendar management module 142 may be configured to display a suggestion and relevant information for the suggestion. The suggestion and the relevant information for the suggestion may be determined and/or provided by the suggestion determination module 122 of the suggestion management module 120.

Suggestions may be displayed based on an importance of the suggestion (as provided by the suggestion management module 120). For example, a suggestion displayed via the calendar management module 142 may be displayed with an indicator of importance (e.g., a color, rank, percentage, and/or other indicator as discussed above with the suggestion management module 120). In some implementations, suggestions may be displayed by importance, by day, by week, by month, by customer, by location, by product, by rationale, by suggested date/time, by a date range, by filtering criteria associated with the display of the worker's schedule, and/or by other criteria. The calendar management module 142 may facilitate the filtering of suggestions by importance, by day, by week, by month, by customer, by location, by product, by rationale, by suggested date/time, by a date range, by filtering criteria associated with the display of the worker's schedule, by treatment of suggestion (e.g., accepted, dismissed, pushed, ignored, and/or other treatment) and/or by other criteria. In some implementations, a suggestion may no longer be displayed once it has been accepted, dismissed, or ignored for a predetermined period of time.

The calendar management module 142 may be configured to enable a worker to add a suggestion as a scheduled event. For example, the calendar management module 142 may enable a worker to drag and drop a suggestion for an activity into an open time slot of a displayed schedule for the worker. In some implementations, the calendar management module 142 may be configured to display an availability of one or more customers associated with an event for one or more time slots when the user is determining where to drag and drop an event. For example, the availability of one or more customers may be displayed via color, shading, and/or other indication.

In some implementations, the calendar management module 142 may be configured to enable a worker to accept a suggestion, dismiss a suggestion, push a suggestion to another date and/or time, ignore a suggestion (e.g., fail to interact with a suggestion for a predetermined time period, and/or otherwise ignore the suggestion), and/or otherwise treat a suggestion. In some implementations, when a worker accepts a suggestion, the calendar management module 142 may create a scheduled activity for the worker based on the activity of the suggestion. When a worker pushes a suggestion, the calendar management module 142 may be configured to remove the suggestion from display and provide the suggestion for display after a pre-determined time period. The pre-determined time period may be a default pre-determined time period, or may be based on feedback provided by the worker. When a worker dismisses a suggestion, the calendar management module 142 may remove the suggestion from display.

Based on treatment of a suggestion, the calendar management module 142 may be configured to prompt the worker for feedback related to the treatment of the suggestion. For example, the calendar management module 142 may be configured to prompt the worker to provide feedback relating to why the worker accepted the activity, why the worker pushed the activity, why the worker dismissed the activity, why the worker ignored the activity, activities that the worker would prefer as suggestions, and/or other information. The feedback provided by the worker may be used by the suggestion management module 120, the activity management module 140, the strategy management module 110, and/or other modules 199 to optimize strategy, workflows, suggestions provided to the worker, and/or other functionality of the system 10.

In some implementations, along with the suggestion and relevant information associated with the suggestion, the calendar management module 142 may display scores related to the suggestion, scores related to factors associated with the suggestion, weights applied to the suggestion and/or factors associated with the suggestion, information associated with factors and/or parameters associated with the suggestion, and/or other information relating to how the suggestion was determined. The feedback provided by the worker may comprise information relating to one or more factors, one or more parameters, scoring of one or more factors, scoring of one or more parameters, application of one or more weights, application of one or more bonuses, application of one or more penalties, changes to values of one or more weights, bonuses, penalties, and/or other scoring effects, importance of the suggestion, and/or other information relating to the determination of the suggestion. The information associated with factors and/or parameters associated with the suggestion may comprise, for example, information that was calculated during the determination of a score for the suggestion, information used in determining a score for the suggestion, and/or other information that provides context and/or strategy associated with the suggestion.

The template management module 144 may store templates for scheduling workflow activity, create scheduled activities based on stored templates, prepare proposed templates for scheduling workflow activity based on an associated workflow, and/or perform other functionality related to scheduling activity. In some implementations, the template management module 144 may enable a worker to store a schedule of the worker as a template. The template management module 144 may enable a worker to filter activities on a schedule of the worker to store as part of a template. For example, the activities may be filtered by location, activity type, associated product, associated customer, date range, and/or other criteria. In some implementations, the template management module 144 may enable a worker to add notes related to a template. In some implementations, the template management module 144 may be configured to prepare a proposed template for a worker based on activities scheduled for the worker and suggestions provided for the worker.

In some implementations, the sharing module 146 of the suggestion management module may be configured to enable a worker to share suggestions for activities, responses to suggestions, feedback related to suggested activities, feedback related to scheduled activities, templates stored by a worker, schedules, and/or other information stored via the system 10. For example, the sharing module 146 may facilitate sharing information from one worker to another via text message, calendar event, trigger, email, and/or other communication medium.

Returning to FIG. 1, the worker management module 150 may be configured to store information relating to one or more workers, information relating to teams of workers, and/or perform other functionality related to managing workers. For example, for an individual worker, the worker management module 150 may be configured to store worker information, including, for example, one or more of: name, address, schedule, activities executed by the worker, feedback received from the worker related to scheduled activities, feedback received from the user related to suggestions, performance metrics associated with the user, amount of system access and system usage, one or more triggers associated with the worker, performance metrics associated with the worker, products to be sold by the worker, customers associated with the worker, territory associated with the worker, one or more teams associated with the worker, one or more market segments associated with the worker, one or more workflows associated with the products, customer, market segments, and/or territory associated with the worker, and/or other information related to the worker.

The gamification module 160 may be configured to track access and usage of the system 10 by workers, provide incentives related to access and/or use of the workflow management system 10, and/or to perform other functionality related to monitoring access of the workflow management system 10.

In some implementations, the gamification module 160 may be configured to track the access and/or usage of the system 10 by workers. For example, the gamification module 160 may store tracking information for a worker including, for example, frequency of access, length per access, percentage of activities for which a worker provided feedback, type of feedback provided, amount of feedback provided, number of suggestions used, number of suggestions dismissed, amount of feedback provided regarding dismissal of suggestion, number of suggestions pushed, amount of feedback provided regarding pushing of suggestions, number of templates stored by the worker, number of customers for which worker accessed system 10, number of products for which worker accessed system 10, and/or other tracking information.

The gamification module 160 may be configured to provide incentives to a worker based on an amount of access and/or usage of the system 10 by the worker. In some implementations, the gamification module 160 may store one or more levels of usage associated with respective levels of rewards. A level of usage could be based on number of suggestions accepted, number of times feedback provided, frequency of use, and/or other tracking information. In some implementations, the gamification module 160 may associate a suggestion provided to a worker with an incentive. For example, the gamification module 160 may augment a suggestion to include the provision of a reward to the worker if the suggested is accepted by the worker.

In some implementations, the gamification module 160 may be configured to compare tracking information between individual workers of a same team, between teams of workers, between some or all workers, and/or between other sets of users of the system 10. The gamification module 160 may be configured to modify the rewards available to individual workers or teams of workers based on the comparison of tracking information.

The transaction management module 170 may be configured to track transactions relating to strategy, workflow, and workflow activity, implement one or more business models associated with access and/or usage of the system 10, and/or other perform other functionality related to managing transactions. The transaction management module 170 may be configured to implement one or more business models associated with access and/or usage of the system 10. For example, the transaction management module 170 may be configured to store information related to features of the system 10 which a user may access for free and features of the system 10 for which a user may need to pay for access. The transaction management module 170 may also store information related to users who have unlimited access to the system 10. The transaction management module 170 may further include the appropriate functionality for receiving and processing payments from customers, groups, and/or other entities, including, for example, credit card payments, payments via third parties such as PayPal, electronic check processing, and/or other types of payments.

The reporting module 180 may be configured to facilitate analysis and report information related to system usage, information related to strategy and/or workflow execution, customer analytics, market analysis, product analysis, and/or other information stored via the system 10.

The role-based permission module 190 may be configured to tailor a user's access to the system 10 based on one or more roles associated with the user. The role-based permission module 190 may be configured to tailor a user's access to the system 10 based on one or more roles associated with the user. The one or more roles may include system-level roles, company-based roles, and/or other roles. A user of the system 10 may access the system 10 based on the user's system-level role and company-level role. The role-based permissions module 190 may maintain a plurality of system-level roles, including, for example, administrator, company, and/or other roles. System-level roles may grant access to various system features such as for example, access to one or more modules, access to information stored at a storage 105, and/or other access to system features. Different system-level roles may be granted that provide access to different system features.

Company-level roles may grant access to information related to a specific company. Company information may include, for example, information stored at the storage 105 that is associated with the specific company. The role-based permissions module 190 may maintain a plurality of company-level roles, including, for example, manager, worker, team, and/or other roles. Different company-based roles may be granted that provide access to different company information, provide access to different modules, and/or provide other access to the system 10.

In some implementations, the system 10 may be used to manage strategy, workflow, and activity for workers across various industries. The types of industries include pharmaceutical sales, insurance, financial services, consumer goods, business services and office equipment, biotech and/or healthcare, telecommunications, technology services, and/or other industries.

In some implementations, storage 105 of the system 10 may be configured to store information related to system usage, any information accessed, processed, shared, and/or created by system 10, and/or other information developed and/or shared via functionality associated with system 10.

The functionality of the system 10 may be compatible with existing systems, may be integrated with one or more existing systems, or may be performed as a stand-alone system. For example, the system 10 may be integrated with multiple existing systems, such as, for example, existing calendar management systems, existing workflow management systems, and/or other types of systems.

Figure 5:
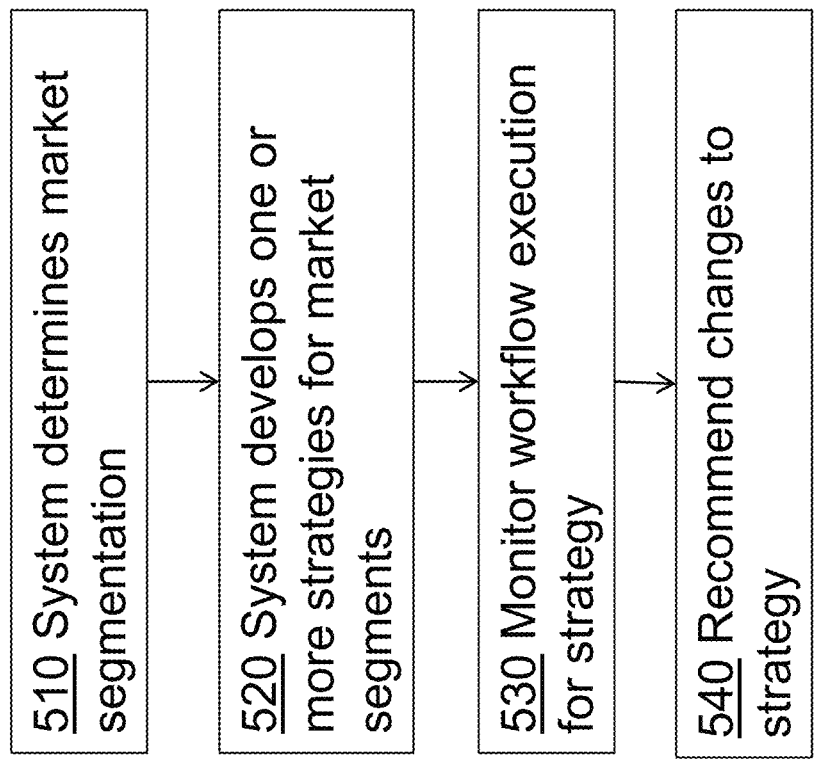
FIG. 5 depicts a flowchart for managing strategies, according to various implementations of the invention.
Figure 6:
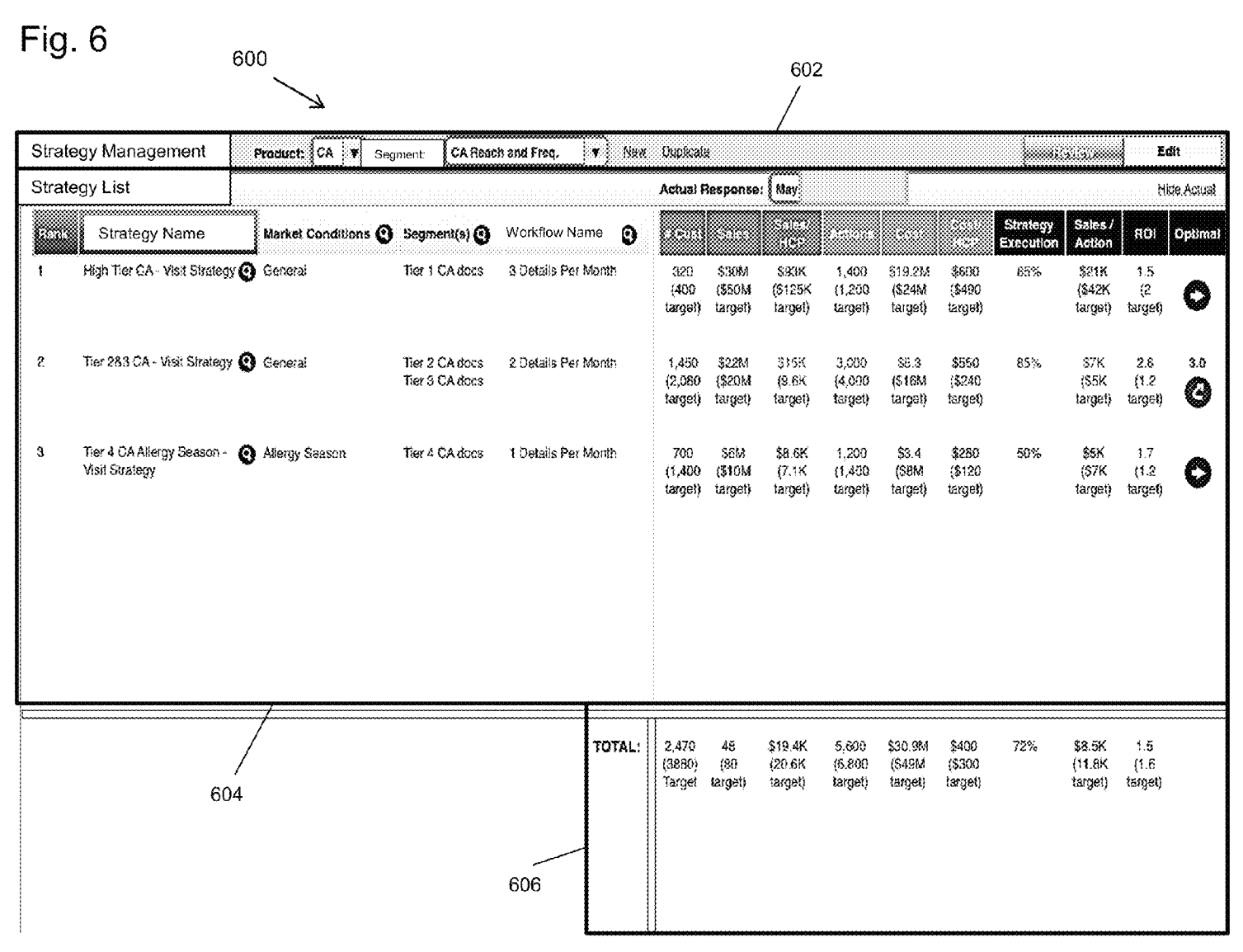
Figure 7:
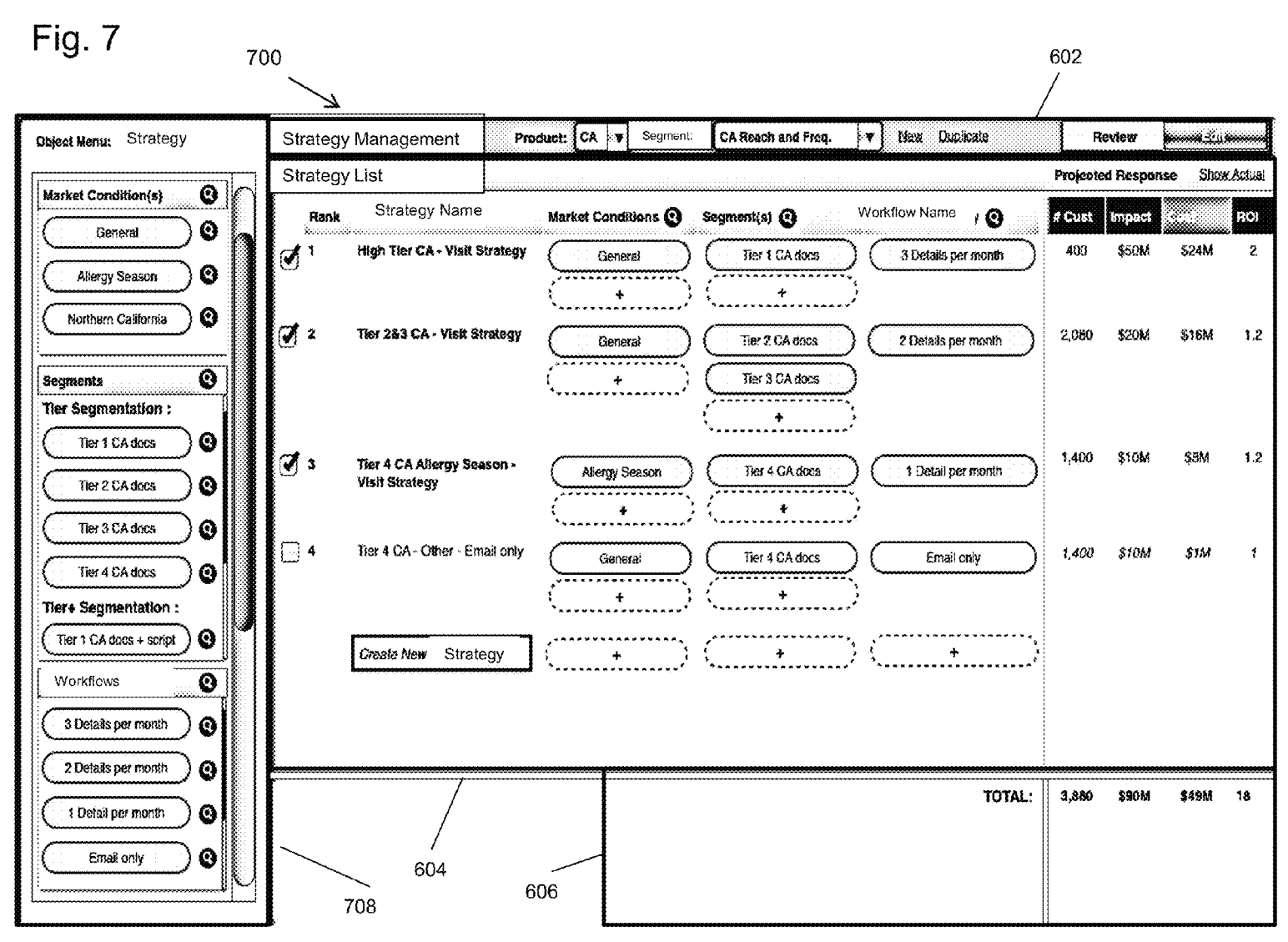
Figure 8:
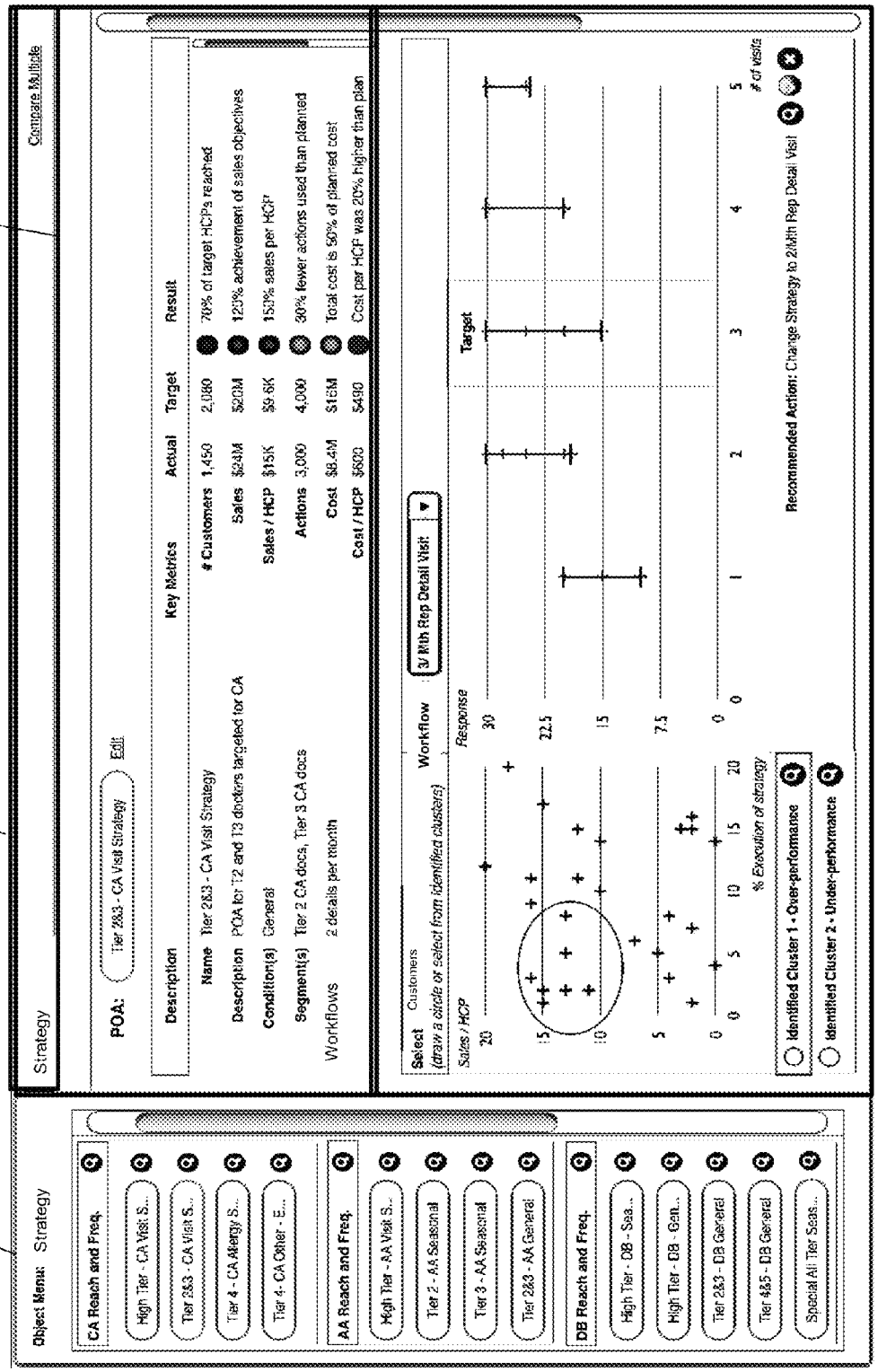
FIG. 8 illustrates an exemplary screenshot of an interface that displays metrics related to execution of a strategy, according to various implementations of the invention.

FIG. 5 illustrates a process for managing strategies, according to various implementations of the invention. FIG. 6 illustrates an exemplary screenshot of an interface 600 that displays strategies stored in the system 10, according to various implementations of the invention. FIG. 7 illustrates an exemplary screenshot of an interface 700 that facilitates the editing of one or more stored strategies, according to various implementations of the invention. FIG. 8 illustrates an exemplary screenshot of an interface 800 that displays metrics related to execution of a strategy, according to various implementations of the invention. Processing will be described with respect to FIG. 5 in reference to the screen shots illustrated in FIGS. 6-8.

The described operations of FIG. 5 and other figures may be accomplished using some or all of the system components described in detail above and, in some implementations, various operations may be performed in different sequences. In other implementations, additional operations may be performed along with some or all of the operations shown in FIG. 5 and the other figures. In yet other implementations, one or more operations may be performed simultaneously. In yet other implementations, one or more combinations of various operations may be performed. Some implementations may not perform all of the operations described with relation to FIG. 5 and other figures. Accordingly, the operations described are exemplary in nature and, as such, should not be viewed as limiting.

The screenshots illustrated in FIG. 6 and other drawing figures are for illustrative purposes only. In some implementations, the screenshots illustrated in FIG. 6 and other drawing figures may be related to the use of the system 10 in the context of pharmaceutical sales. The specific information displayed in the screenshots, and the industry to which the screenshots may be relevant, are exemplary only, and in no way limit the application or scope of the invention. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting. The interface 600 of FIG. 6 and other interfaces described herein may be implemented as a web page communicated from computing device 100 to a client, an application such as a mobile application executing on the client that receives generates the interface based on information communicated from computing device 100, and/or other interface. Whichever type of interface is used, computing device 100 may communicate the data and/or formatting instructions related to the interface to the client, causing the client to generate the various interfaces of FIG. 6 and other drawing figures. Furthermore, computing device 100 may receive data from the client via the various interfaces, as would be appreciated.

In an operation 510, the system 10 may determine one or more market segments. In some implementations, operation 510 may be performed by a segmentation module the same as or similar to segmentation module 112 of the strategy management module 110 (shown in FIG. 2 and described above).

In an operation 520, the system 10 may develop one or more strategies for the one or more determined market segments. In some implementations, operation 520 may be performed by a strategy development module the same as or similar to strategy development module 114 of the strategy management module 110 (shown in FIG. 2 and described above).

FIG. 6 illustrates an exemplary screenshot of an interface 600 that displays strategies stored in the system 10, according to various implementations of the invention. In some implementations, user interface 600 may be presented that includes an exemplary template for displaying strategies. The template for displaying strategies may be presented to a user upon access of strategy information by the user. The user interface 600 may include, for example, navigation bar portion 602, strategy display portion 604, strategy metrics display portion 606, and/or other portions that display information relating to one or more stored strategies.

In some implementations, navigation bar portion 602 may display one or more links to the one or more templates available via the system 10. For example, the navigation bar 208 may display a title related to the template, and information related to the strategies being displayed. For example, the information related to the strategies being displayed may include product, segment, whether the strategies are being viewed, whether the strategies are being edited, links for creating new strategies, links for duplicating a strategy, and/or other information related to the strategies. In some implementations, the information related to product, segment, and/or other information may be displayed in the form of a drop down menu, a link, and/or other interactive component that facilitates filtering, by a user of the template, of the strategies being displayed by the type of information chosen. For example, information related to products may be displayed via a drop down menu that includes names of some or all of the products stored in the system 10, an item relating to all products, and/or other types of products. The strategies displayed may be filtered to correspond to the item chosen in the drop down menu for products. Other examples of configurable and/or interactive components may be used. Other methods of filtering the strategies displayed may be used.

In some implementations, strategy display portion 604 may display information relating to one or more stored strategies. The strategies displayed may be those relating to the filters set via navigation portion 602. Information displayed for a strategy may include, for example, strategy name, market condition, segments associated with the strategy, workflows associated with the strategy, number of customers associated with the strategy, amount of actual sales associated with the strategy, amount of target sales associated with the strategy, number of actions performed in conjunction with the strategy, number of target actions associated with the strategy, actual cost of implementation associated with the strategy, target cost of implementation associated with the strategy, percentage of strategy execution performed, actual amount of sales per action performed, target amount of sales per action associated with the strategy, actual ROI associated with the strategy, target ROI associated with the strategy, whether the strategy is an optimized strategy, a version of optimized strategy, and/or other information related to a strategy. In some implementations, the interface may facilitate hiding actual information associated with the strategy. In some implementations, the interface may facilitate hiding target information associated with the strategy.

In some implementations, metrics display portion 606 may display metrics relating to performance of some or all strategies. The metrics displayed may be those relating to strategies displayed according to the filters set via navigation portion 602. Information displayed related to overall metrics may include, for example, number of customers associated with the displayed strategies, amount of actual sales associated with the displayed strategies, amount of target sales associated with the displayed strategies, number of actions performed in conjunction with the displayed strategies, number of target actions associated with the displayed strategies, actual cost of implementation associated with the displayed strategies, target cost of implementation associated with the displayed strategies, percentage of execution performed of the displayed strategies, actual amount of sales per action performed of the displayed strategies, target amount of sales per action associated with the displayed strategies, actual ROI associated with the displayed strategies, target ROI associated with the displayed strategies, and/or other information related to a strategy. In some implementations, the interface may facilitate hiding actual information associated with the displayed strategies. In some implementations, the interface may facilitate hiding target information associated with the displayed strategies.

In an operation 530, the system 10 may monitor workflow execution for the one or more developed strategies. In some implementations, operation 530 may be performed by one or more of a strategy development module the same as or similar to strategy development module 114 of the strategy management module 110 (shown in FIG. 2 and described above) and workflow management module 116 of the strategy management module 110 (shown in FIG. 2 and described above).

FIG. 7 illustrates an exemplary screenshot of an interface that facilitates the editing of one or more stored strategies, according to various implementations of the invention. In some implementations, user interface 700 may be presented that includes an exemplary template for editing strategies. The template for editing strategies may be presented to a user upon access of strategy information by the user. The screenshot illustrated in FIG. 7 is similar to the screenshot illustrated in FIG. 6 with at least the following differences. The user interface 700 may include, for example, navigation bar portion 602, strategy display portion 704, strategy metrics display portion 606, editing portion 708, and/or other portions that display information relating to one or more stored strategies.

In some implementations, editing portion 708 may display information relating to strategies. For example, editing portion 708 may display one or more types of market conditions, one or more types of segments at one or more levels of abstraction, one or more workflows, and/or other information related to strategies. In some implementations, the interface may facilitate hiding actual information associated with the strategy. In some implementations, the interface may facilitate hiding target information associated with the strategy. The types of market conditions, segments, workflows, and/or other information may be displayed as objects that a user may drag and drop to associate with a displayed strategy. Information displayed with the stored strategy may also be displayed as objects that a user may drag and drop to editing portion 708 to remove from the strategy. Other examples of configurable and/or interactive components may be used. Other methods of editing the strategies displayed and/or creating new strategies may be used.

In an operation 540, the system 10 may recommend changes to one or more strategies based on the monitored workflow execution for the one or more developed strategies. In some implementations, operation 540 may be performed by one or more of a strategy development module the same as or similar to strategy development module 114 of the strategy management module 110 (shown in FIG. 2 and described above) and workflow management module 116 of the strategy management module 110 (shown in FIG. 2 and described above).

FIG. 8 illustrates an exemplary screenshot of an interface that displays metrics related to execution of a strategy, according to various implementations of the invention. In some implementations, user interface 800 may be presented that includes an exemplary template for displaying metrics related to execution of an individual strategy. The template for editing strategies may be presented to a user upon access of strategy information by the user. The screenshot illustrated in FIG. 8 is similar to the screenshot illustrated in FIG. 6 with at least the following differences. The user interface 800 may include, for example, navigation bar portion 802, strategy display portion 804, strategy metrics display portion 806, editing portion 808, and/or other portions that display information relating to one or more stored strategies.

In some implementations, navigation bar portion 802 may display one or more links to the one or more templates available via the system 10. For example, the navigation bar 808 may display a title related to the template, and information related to the strategy being displayed. For example, the information related to the strategy being displayed may include strategy name, a link to compare multiple strategies, and/or other information related to the strategy.

In some implementations, strategy display portion 804 may display information relating to an individual strategy. Information displayed for a strategy may include, for example, strategy name, market condition, segments associated with the strategy, workflows associated with the strategy, number of customers associated with the strategy, target amount of customer associated with strategy, resulting performance related to amount of customers, amount of actual sales associated with the strategy, amount of target sales associated with the strategy, resulting performance related to amount of sales, number of actions performed in conjunction with the strategy, number of target actions associated with the strategy, resulting performance related to number of actions, actual cost of implementation associated with the strategy, target cost of implementation associated with the strategy, resulting performance related to cost of implementation, actual amount of sales per action performed, target amount of sales per action associated with the strategy, resulting performance related to amount of sales per action, actual ROI associated with the strategy, target ROI associated with the strategy, resulting performance related to ROI, whether the strategy is an optimized strategy, a version of optimized strategy, and/or other information related to a strategy.

In some implementations, metrics display portion 806 may display metrics relating to performance of the selected strategy. For example, metrics display portion 806 may display one or more graphs related to performance of the strategy, one or more recommendations for improving performance of the strategy, and/or other information.

Metrics display portion 806 may display one or more graphs related to comparison of performance metrics of execution of the strategy. Metrics such as percentage execution of strategy, sales per customer, response from customer, number of visits, and/or other metrics may be compared. In some implementations, the graphs may be configurable, customizable, and/or otherwise interactive. For example, a user may select one or more portions of data displayed via the graph to obtain more information about the selected data.

In some implementations, the types of graphs displayed in the metrics display portion 806 may be selectable. For example, a predetermined number of graphs may be displayed in the metrics display portion 806, with a dropdown menu for each graph that includes items relating to the strategy. For example, menu items may include customer, workflow, segment, and/or other information relating to the strategy. One or more of the predetermined number of graphs may display data relating to workflows associated with the strategy. For example, the graphs to display data relating to workflows may include drop down menu. The menu items may include the names of some or all of the workflows, a menu item for all workflows, and/or other menu items.

Metrics display portion 806 may also display one or more recommendations for revising the strategy. The metrics display portion 806 may display one or more recommendations for revising the strategy based on, for example, updates to the strategy determined by the strategy development module 114 of the strategy management module 110. In some implementations, metrics display portion 806 may determine one or more recommendations for display based on, for example, an updated workflow associated with the strategy, input from users of the system 10, feedback received from workers, updated information stored via the system 10, statistical and/or computational analysis of data related to company performance, and/or other information.

In some implementations, editing portion 808 may display information relating to strategies. For example, editing portion 808 may display one or more types of segments at one or more levels of abstraction, one or more strategies for the displayed segments, and/or other information related to strategies. The types of segments, strategies, and/or other information may be displayed as objects that a user may select for comparison to the displayed strategy, for viewing of metrics and information related to the selected strategy, and/or for other purposes.

Figure 9:
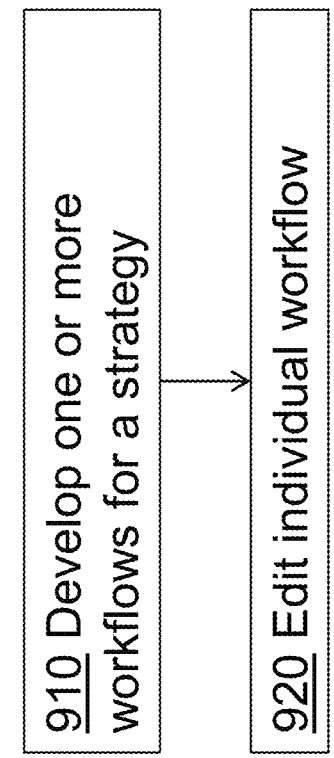
FIG. 9 depicts a flowchart for managing workflows, according to various implementations of the invention.
Figure 10:
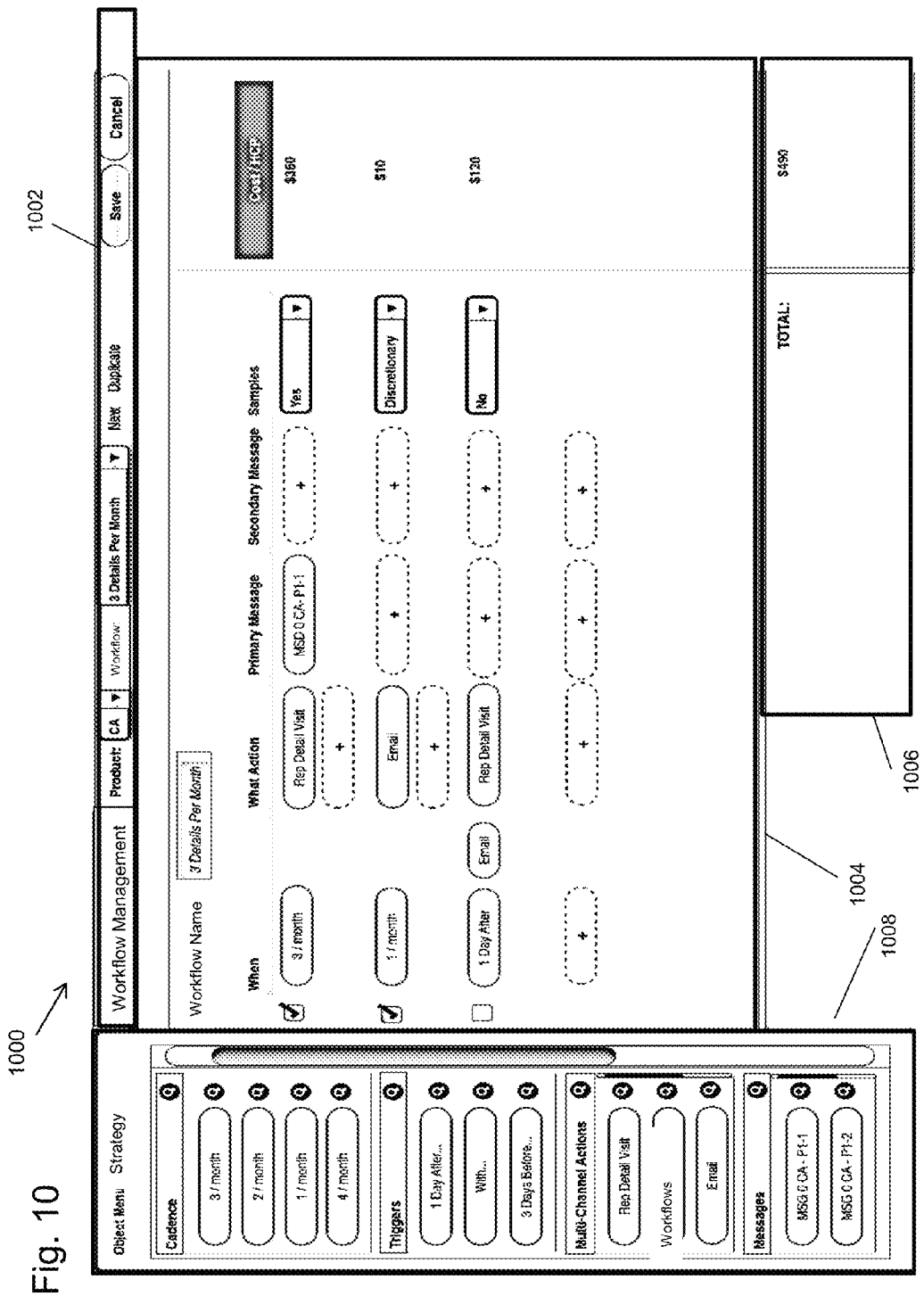
FIG. 10 illustrates an exemplary screenshot of an interface that facilitates display and editing of workflows stored in the system, according to various implementations of the invention.

FIG. 9 illustrates a process for managing workflows, according to various implementations of the invention. FIG. 10 illustrates an exemplary screenshot of an interface that facilitates display and editing of a workflow stored in the system 10, according to various implementations of the invention. Processing will be described with respect to FIG. 9 in reference to the screen shots illustrated in FIG. 10.

In an operation 910, the system 10 may develop one or more workflows for a strategy. In some implementations, operation 910 may be performed by a workflow management module the same as or similar to workflow management module 116 of the strategy management module 110 (shown in FIG. 2 and described above).

In an operation 920, the system 10 may facilitate the editing of one or more workflows for one or more strategies. In some implementations, operation 520 may be performed by workflow management module the same as or similar to workflow management module 116 of the strategy management module 110 (shown in FIG. 2 and described above).

FIG. 10 illustrates an exemplary screenshot of an interface 1000 that displays workflows stored in the system 10, according to various implementations of the invention. In some implementations, user interface 1000 may be presented that includes an exemplary template for displaying workflows. The template for displaying workflows may be presented to a user upon access of workflow information by the user. The user interface 1000 may include, for example, navigation bar portion 1002, workflow display portion 1004, workflow metrics display portion 1006, workflow editing portion 1008, and/or other portions that display information relating to one or more stored strategies.

In some implementations, navigation bar portion 1002 may display one or more links to the one or more templates available via the system 10. For example, the navigation bar 208 may display a title related to the template, and information related to the workflows being displayed. For example, the information related to the workflows being displayed may include product, type of workflow, whether the workflows are being viewed, whether the workflows are being edited, links for creating new workflows, links for duplicating a workflows, links to save changes to the displayed workflows, and/or other information related to the workflows. In some implementations, the information related to product, workflow, and/or other information may be displayed in the form of a drop down menu, a link, and/or other interactive component that facilitates filtering, by a user of the template, of the workflows being displayed by the type of information chosen. For example, information related to products may be displayed via a drop down menu that includes names of some or all of the products stored in the system 10, an item relating to all products, and/or other types of products. The workflows displayed may be filtered to correspond to the item chosen in the drop down menu for products. Other examples of configurable and/or interactive components may be used. Other methods of filtering the workflows displayed may be used.

In some implementations, workflow display portion 1004 may display information relating to one or more stored strategies. The workflows displayed may be those relating to the filters set via navigation portion 1002. Information displayed for a workflow may include, for example, the activities of the workflow, a timing of the activities, a type of activity, primary messaging associated with the activity, secondary messaging associated with the activities, whether samples are provided to a worker performing the activity, a cost per activity per customer, and/or other information related to the workflows.

In some implementations, metrics display portion 1006 may display metrics relating to performance of some or all of the workflows. The metrics displayed may be those relating to workflows displayed according to the filters set via navigation portion 1002. Information displayed related to overall metrics may include, for example, number of customers associated with the displayed workflows, amount of actual sales associated with the displayed workflows, amount of target sales associated with the displayed workflows, actual cost of implementation associated with the displayed workflows, target cost of implementation associated with the displayed workflows, actual cost per customer associated with the displayed workflows, target cost per customer associated with the displayed workflows, percentage of execution performed of the displayed workflows, actual amount of sales per action performed of the displayed workflows, target amount of sales per action associated with the displayed workflows, actual amount of sales per action per customer for the displayed workflows, target amount of sales per action per customer for the displayed workflows, actual ROI associated with the displayed workflows, target ROI associated with the displayed workflows, and/or other information related to a workflow. In some implementations, the interface may facilitate hiding actual information associated with the displayed workflows. In some implementations, the interface may facilitate hiding target information associated with the displayed workflows.

Editing portion 1008 may display information relating to workflows. For example, editing portion 1008 may display one or more types of cadences (e.g., an amount of activities per time period, an amount of time between performance of a recurring activity, and/or other type of cadence), one or more timing triggers that may trigger scheduled performance of an activity, types of communication(s) associated with an activity of the workflow, types of messages for use in primary messaging and/or secondary messaging, and/or other information related to workflows. The types of cadences, triggers, communications, messages, and/or other information may be displayed as objects that a user may drag and drop to associate with a displayed workflow. Information displayed with the stored workflow may also be displayed as objects that a user may drag and drop to editing portion 1008 to remove from the workflow. Other examples of configurable and/or interactive components may be used. Other methods of editing the workflows displayed and/or creating new workflows may be used.

Figure 11:
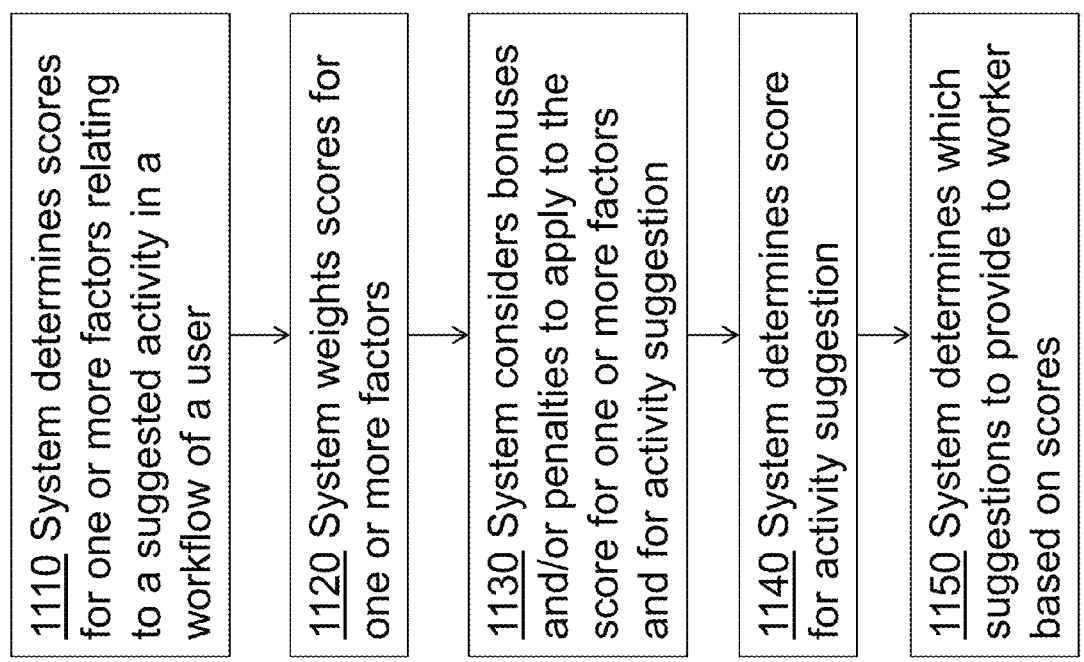
FIG. 11 depicts a flowchart for determining suggestions for a worker, according to various implementations of the invention.
Figure 12:
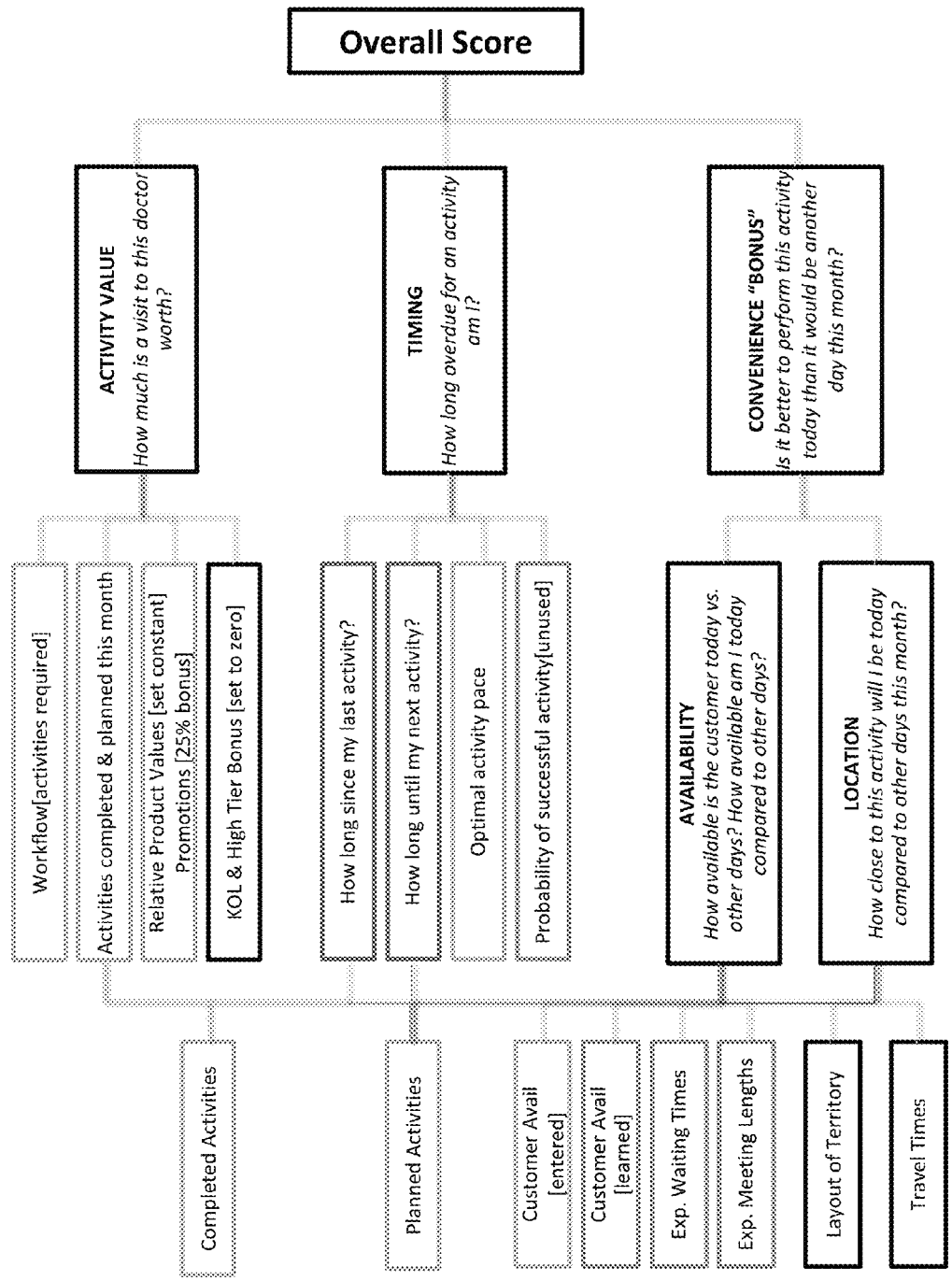
FIG. 12 depicts exemplary factors and parameters related to determining a score for a suggestion, according to various implementations of the invention.
Figure 14:
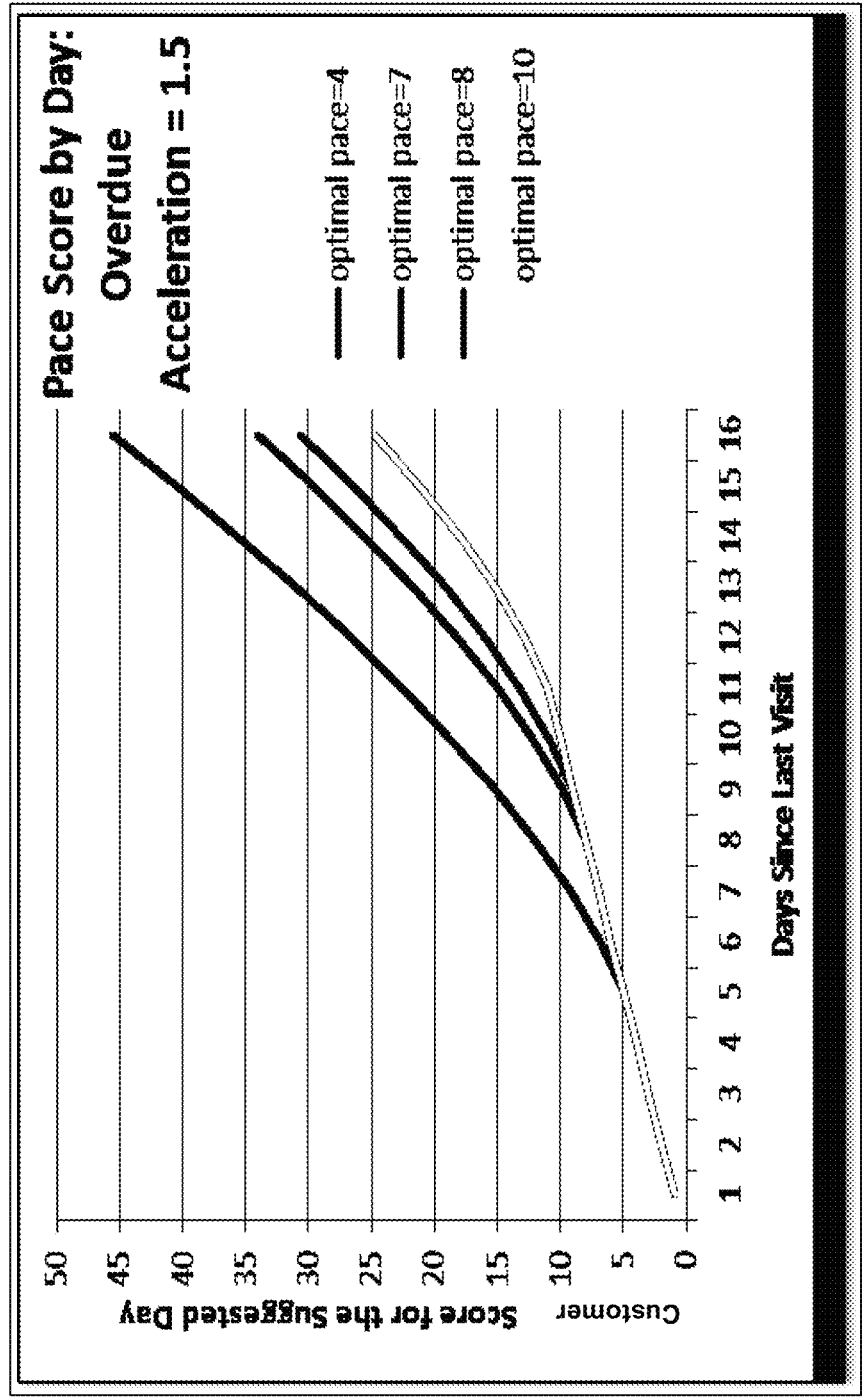
FIG. 14 illustrates an exemplary graph of score values related to the overdue accelerator parameter, according to various implementations of the invention.
Figure 15:
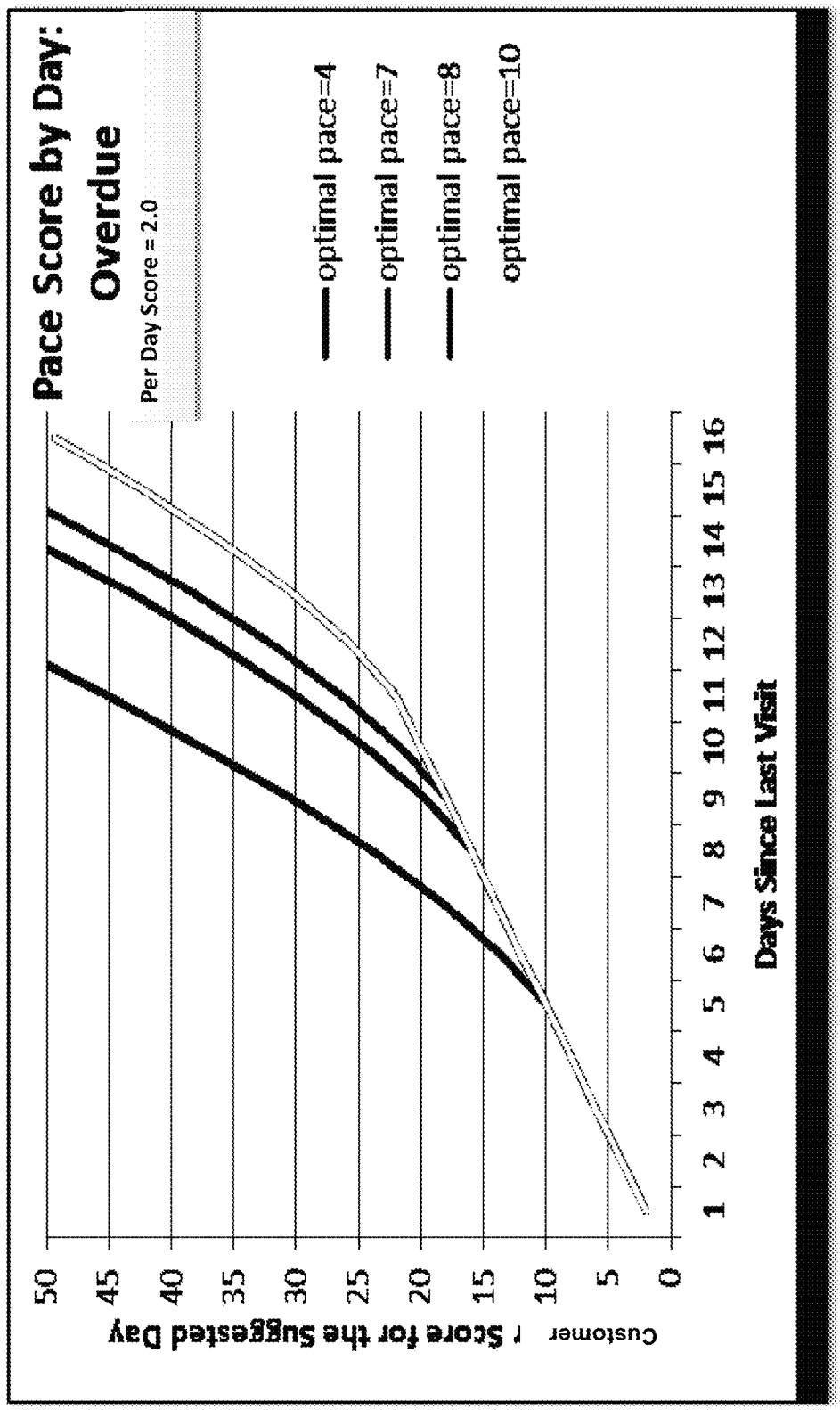
FIG. 15 illustrates an exemplary graph of score values related to a per day pacing score parameter, according to various implementations of the invention.
Figure 16:
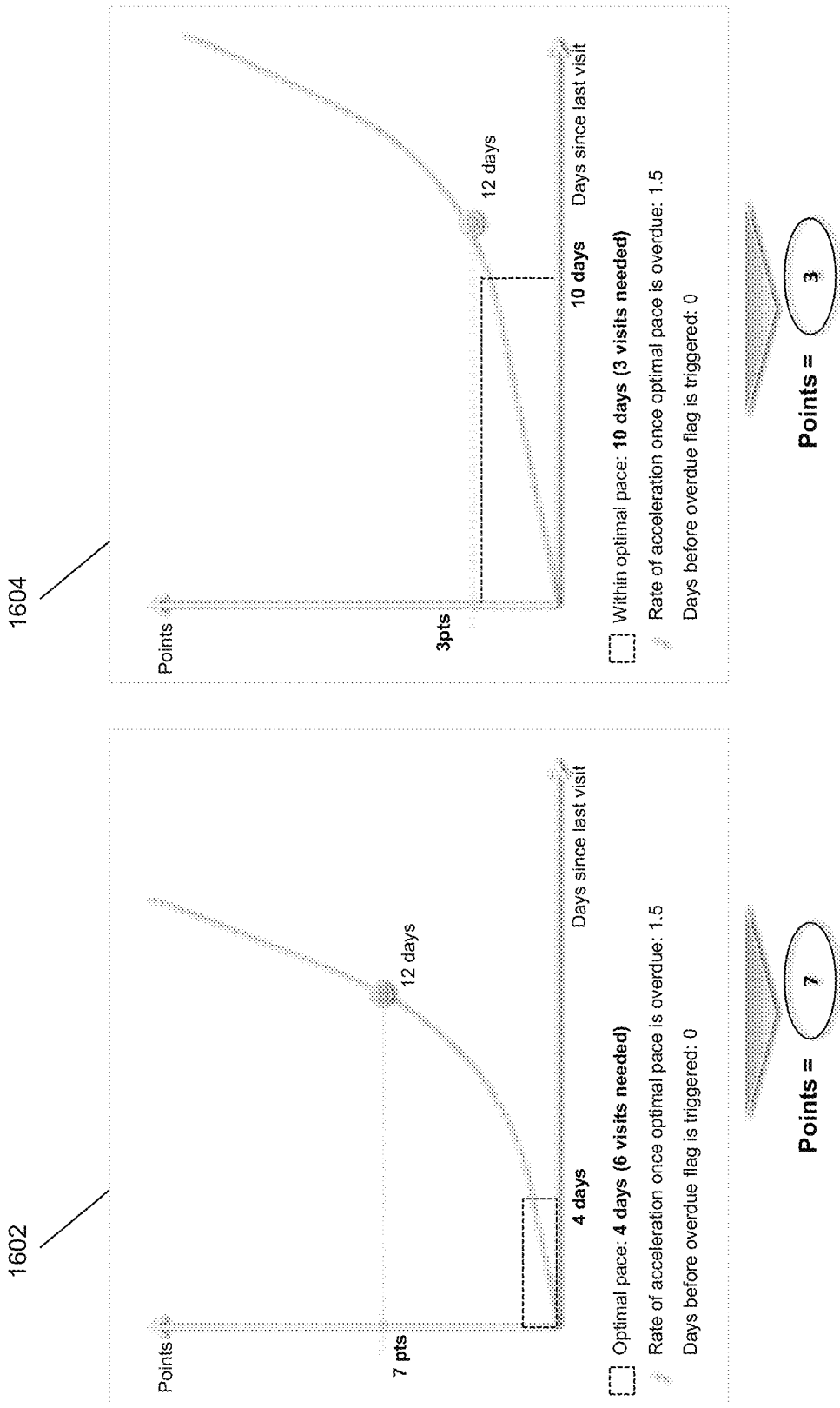
FIG. 16 illustrates an exemplary determination of a score related to a timing factor related to exemplary suggestions, according to various implementations of the invention.
Figure 17:
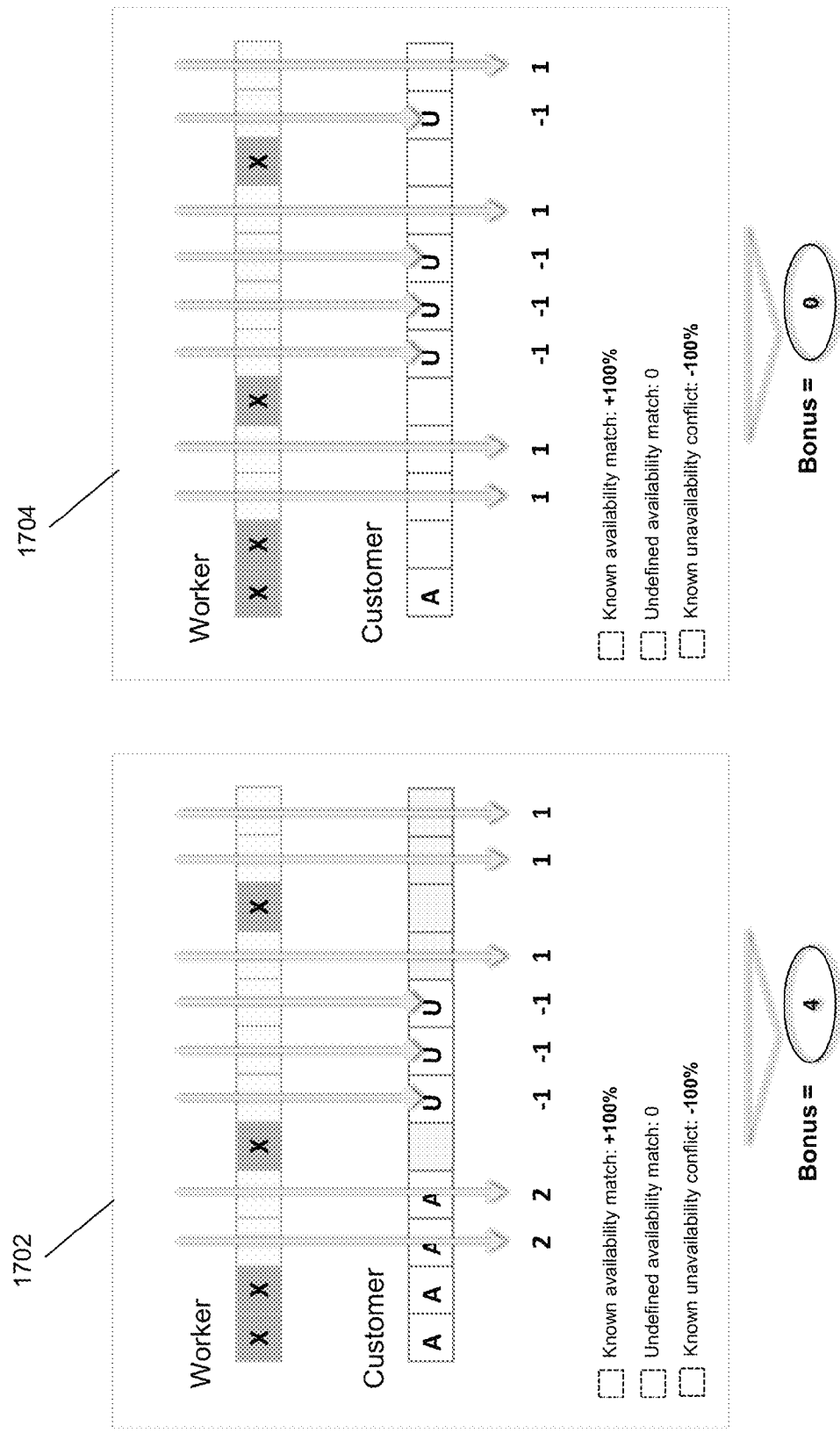
FIG. 17 illustrates an exemplary determination of a score related to an availability factor related to exemplary suggestions, according to various implementations of the invention.
Figure 18:
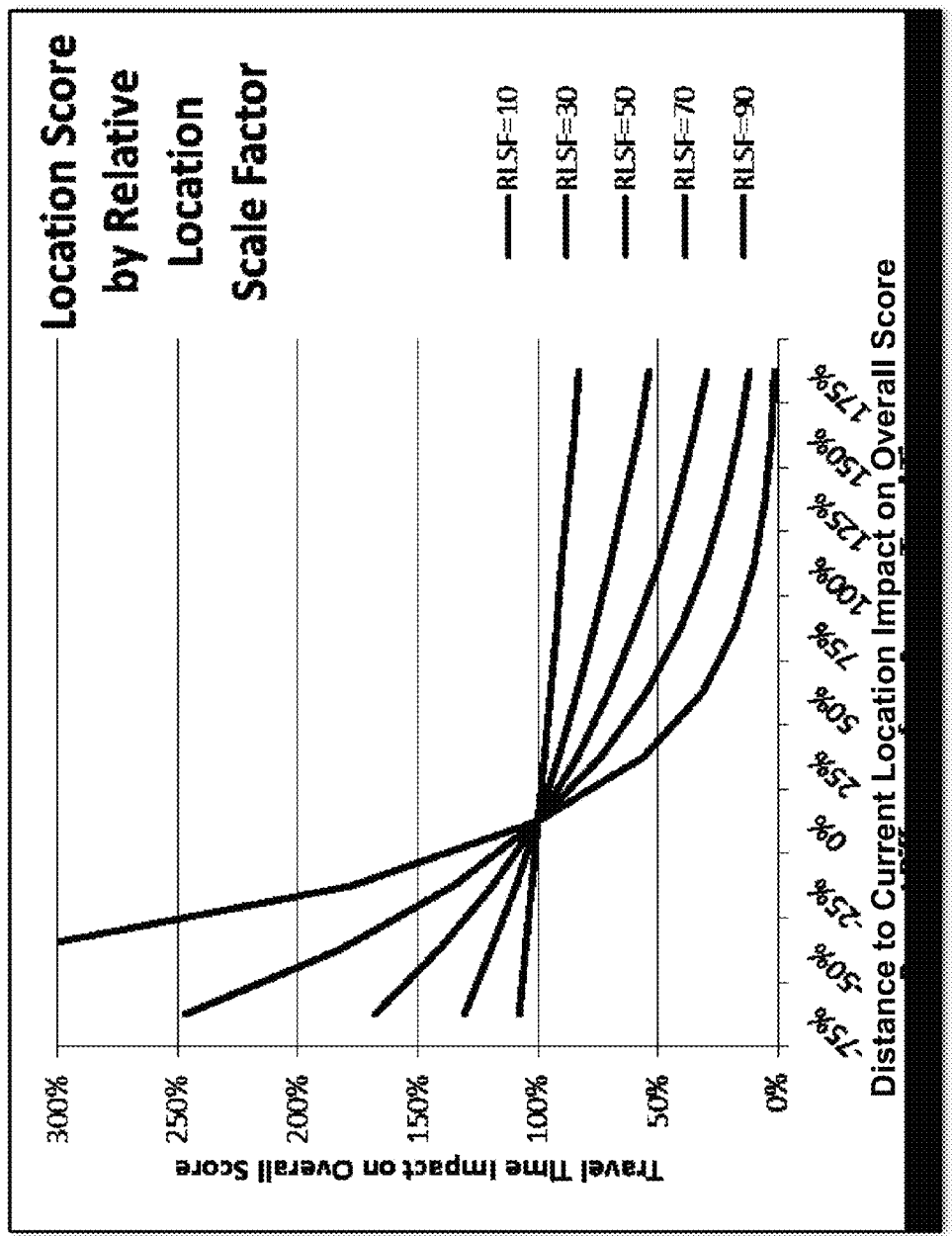
FIG. 18 illustrates an exemplary graph of score values related to a location factor for determining a score for a suggestion, according to various implementations of the invention.
Figure 19:
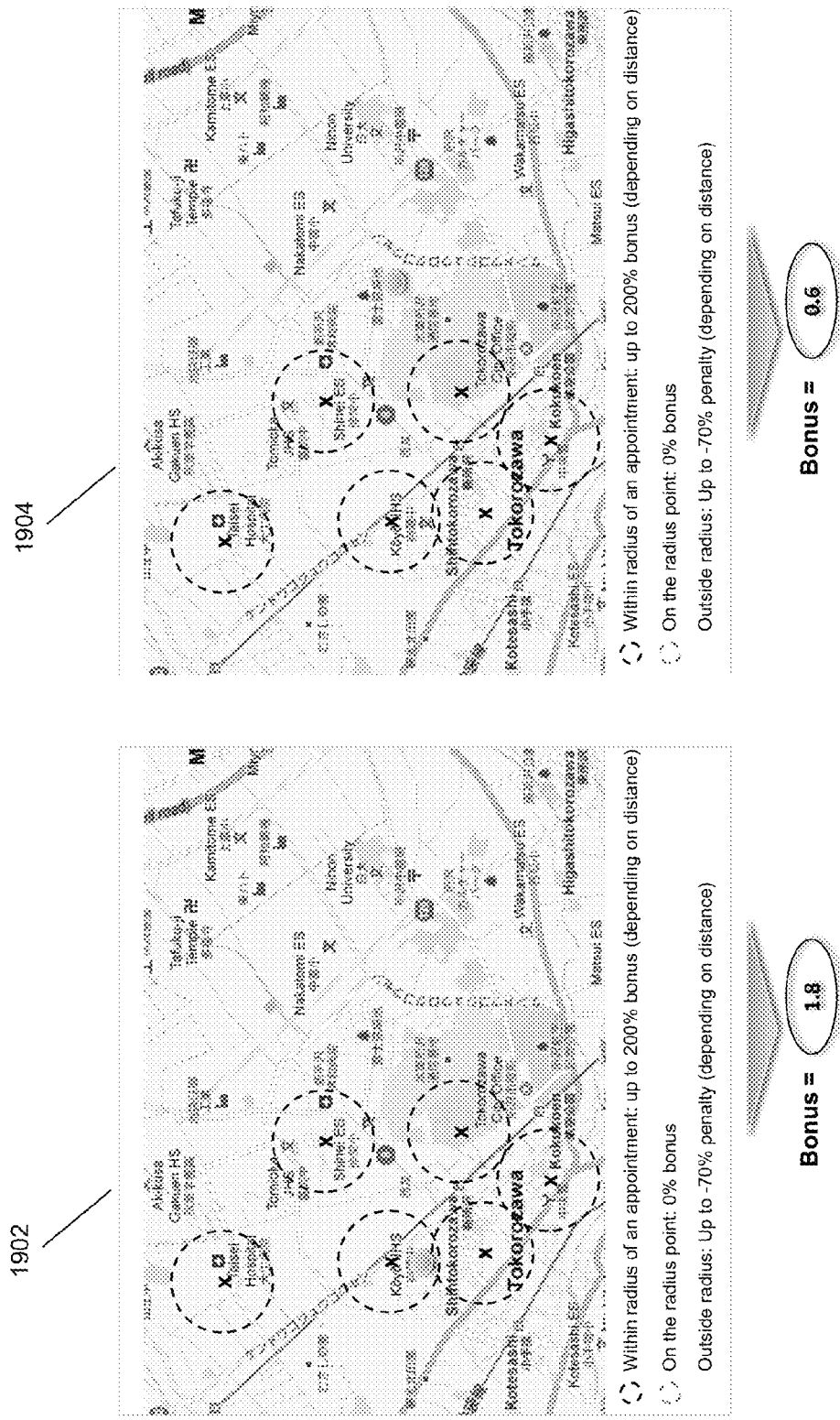
FIG. 19 illustrates an exemplary screenshot displaying a score related to a location factor related to exemplary suggestions, according to various implementations of the invention.

FIG. 11 depicts a flowchart for managing suggestions for a worker, according to various implementations of the invention. FIG. 12 depicts exemplary factors and parameters related to determining a score for a suggestion, according to various implementations of the invention. FIG. 13 depicts exemplary default values for weights to be applied to scores determined for factors and parameters related to determining a score for a suggestion, according to various implementations of the invention. FIG. 14 illustrates an exemplary graph of score values related to the overdue accelerator parameter, according to various implementations of the invention. FIG. 15 illustrates an exemplary graph of score values related to a per day pacing score parameter, according to various implementations of the invention. FIG. 16 illustrates an exemplary screenshot displaying a score related to a timing factor related to exemplary suggestions, according to various implementations of the invention. FIG. 17 illustrates an exemplary screenshot displaying a score related to an availability factor related to exemplary suggestions, according to various implementations of the invention. FIG. 18 illustrates an exemplary graph of score values related to a location factor for determining a score for a suggestion, according to various implementations of the invention. FIG. 19 illustrates an exemplary screenshot displaying a score related to a location factor related to exemplary suggestions, according to various implementations of the invention. Processing will be described with respect to FIG. 11 in reference to the screen shots illustrated in FIGS. 12-19.

The operations depicted in FIG. 11 may be performed for each activity to be performed in workflows associated with a worker, for one or more activities to be performed in workflows associated with the worker, for one or more activities to be performed in a predetermined time period for a worker, for a predetermined number of activities to be performed in workflows associated with the worker, and/or for other subsets of activities in workflows associated with the worker. The predetermined number of activities may be chosen, for example, based on chronological order, based on market segment, based on product, based on customer, based on a priority associated with the associated market segment, product, customer, and/or other information associated with the activity, and/or based on other information. The activities may be chosen by a suggestion management module the same as or similar to suggestion management module 120 (shown in FIG. 2 and described above).

In an operation 1110, the system 10 may determine scores for one or more factors related to a suggestion for an activity. In some implementations, operation 1110 may be performed by a suggestion determination module the same as or similar to suggestion determination module 122 of the suggestion management module 120 (shown in FIG. 2 and described above). In an operation 1120, the system 10 may weight scores for the one or more factors. In some implementations, operation 1120 may be performed by a suggestion management module the same as or similar to suggestion management module 120 (shown in FIG. 2 and described above). In an operation 1130, the system 10 may consider bonuses and/or penalties to apply to the score. In some implementations, operation 1130 may be performed by a suggestion management module the same as or similar to suggestion management module 120 (shown in FIG. 2 and described above).

FIG. 12 depicts exemplary factors and parameters related to determining a score for a suggestion, according to various implementations of the invention. FIG. 12 shows a set of parameters that may be considered when determining scores for one or more factors used to determine overall score for a suggested activity. FIG. 12 also depicts exemplary types of data used in determining scores for parameters and/or factors related to determining a score for a suggested activity. In some implementations, types of data associated with one or more of the parameters may be used to determine scores for a specific factor. In some implementations, types of data associated with one or more parameters may be considered when determining scores for a plurality of factors. In some implementations, one or more of the parameters and/or types of data may be set by users of the system 10, may be learned or updated based on information processed via the system 10, may comprise default values, and/or may otherwise be determined. One or more of the exemplary parameters and factors depicted in FIG. 12 may correlate to the parameters and factors discussed with respect to the suggestion determination module 122 of the suggestion management module 120 (shown in FIG. 2 and described above). In some implementations, the exemplary parameters and factors depicted in FIG. 12 may be handled in a manner similar to the parameters and factors processed by the suggestion determination module 122 of the suggestion management module 120.

FIG. 13 depicts exemplary default values for weights to be applied to scores determined for factors and/or parameters related to determining a score for a suggestion, according to various implementations of the invention. The exemplary default values for weights may be applied to scores in a manner the same or similar to the application of weights to scores by a suggestion determination module the same as or similar to the suggestion determination module 122 of the suggestion management module 120. In some implementations, the values for the weights may be updated by a learning module in a manner same as or similar to the learning module 124 of the suggestion management module 120.

FIG. 14 illustrates an exemplary graph of score values related to the overdue accelerator parameter, according to various implementations of the invention. FIG. 15 illustrates an exemplary graph of score values related to a per day pacing score parameter, according to various implementations of the invention.

The graphs displayed by FIGS. 14 and 15 illustrate the determination of a score to a parameter (and/or factor) based on a weighted analysis of one or more variables relating to the parameter (and/or factor). As shown in FIGS. 14 and 15, the determination of scores of factors and/or parameters may be performed in a non-linear fashion. For example, in FIG. 14, when discussing an overdue acceleration parameter related to an activity value factor, a comparison of days since the last visit and the customer score for the suggested day yield a non-linear algorithm by which to determine a score for the overdue acceleration parameter. Scores for parameters (and/or factors) may be calculated based on a weighted analysis of one or more variables. In FIG. 15, when discussing a pacing parameter related to a timing factor, a comparison of days since the last visit and the customer score for the suggested day yield a non-linear algorithm by which to determine a score for the pacing parameter.

FIG. 16 illustrates an exemplary determination of a score related to a timing factor related to exemplary suggestions, according to various implementations of the invention. In some implementations, the determinations depicted in FIG. 16 may be performed by a suggestion management module the same as or similar to suggestion management module 120 (shown in FIG. 2 and described above). The determinations depicted in graphs 1602 and 1604 show the determination of a score for timing based on the number of days since an activity of a same type was performed, a weight applied to the rate of acceleration, a number of days before the activity is overdue, and/or other considerations.

FIG. 17 illustrates an exemplary determination of a score related to an availability factor related to exemplary suggestions, according to various implementations of the invention. In some implementations, the determinations depicted in FIG. 17 may be performed by a suggestion management module the same as or similar to suggestion management module 120 (shown in FIG. 2 and described above). The determinations depicted in graphs 1702 and 1704 show the application of bonuses and penalties based on a correlation between worker availability and customer availability.

FIG. 18 illustrates an exemplary graph of score values related to a location factor for determining a score for a suggestion, according to various implementations of the invention. The graph displayed by FIG. 18 illustrates the determination of a plurality of location scores relating to a plurality of suggestions analyzed by a suggestion determination module the same as or similar to suggestion determination module 122 of suggestion management module 120. The determination of a location score may be based on a weighted analysis of one or more variables relating to the parameter (and/or factor). As shown in FIG. 18, the determination of a location score may be based on travel time, distance to current location, and/or other considerations related to location.

FIG. 19 illustrates an exemplary screenshot displaying a score related to a location factor related to exemplary suggestions, according to various implementations of the invention. In some implementations, the determinations depicted in FIG. 19 may be performed by a suggestion management module the same as or similar to suggestion management module 120 (shown in FIG. 2 and described above). The determinations depicted in graphs 1902 and 1904 show the application of bonuses and penalties to suggestions at various locations based on whether the locations are within a distance radius of an appointment.

Figure 20:
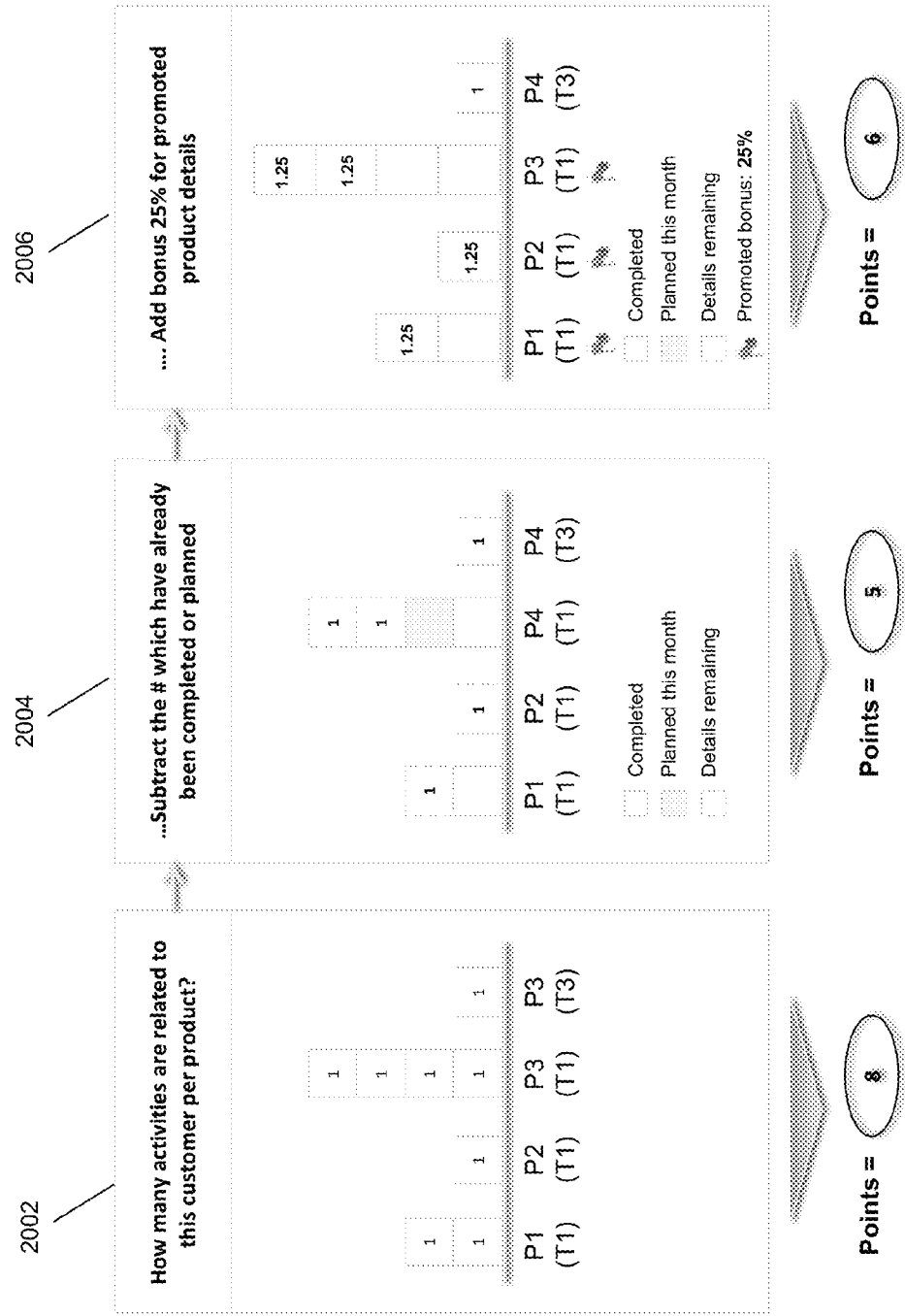
FIG. 20 illustrates an exemplary flowchart for determining a score related to a customer factor, according to various implementations of the invention.

FIG. 20 illustrates an exemplary flowchart for determining a score related to a customer factor when determining a score for a suggestion, according to various implementations of the invention. In an operation 2002, a number of activities per product for a customer are determined. In an operation 2004, a number of performed and/or scheduled activities are subtracted from the number determined in operation 2002. In an operation 2006, a bonus is applied for any products for which a product bonus is available. In some implementations, the operations depicted in FIG. 20 may be performed by a suggestion management module the same as or similar to suggestion management module 120 (shown in FIG. 2 and described above).

Returning to FIG. 11, in an operation 1140, the system 10 may determine a score for the suggestion. For example, the system 10 may determine a score for the suggestion of an activity based on the weighted values of the factors and/or parameters considered, any bonuses and/or penalties applied, and/or other information relating to scoring the suggestion. In some implementations, operation 1140 may be performed by a suggestion management module the same as or similar to suggestion management module 120 (shown in FIG. 2 and described above.

In an operation 1150, the system 10 determines which suggestions to provide to a worker based on the determined scores. For example, the system 10 may determine which suggestions to provide for display by the activity management module 120. In some implementations, operation 1150 may be performed by a suggestion management module the same as or similar to suggestion management module 120 (shown in FIG. 2 and described above).

Figure 21:
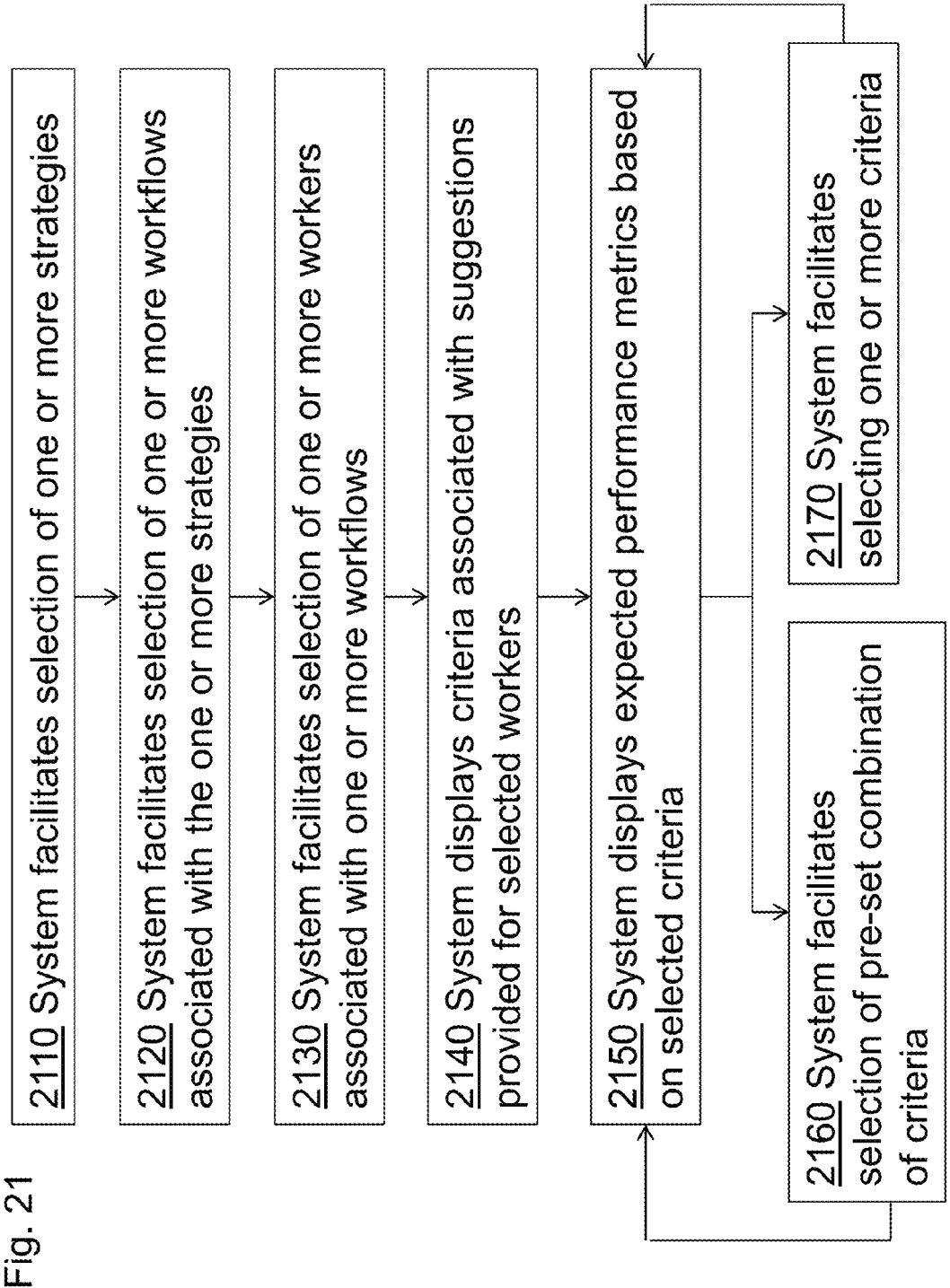
FIG. 21 depicts a flowchart for selecting criteria used for determining suggestions, according to various implementations of the invention.
Figure 22:
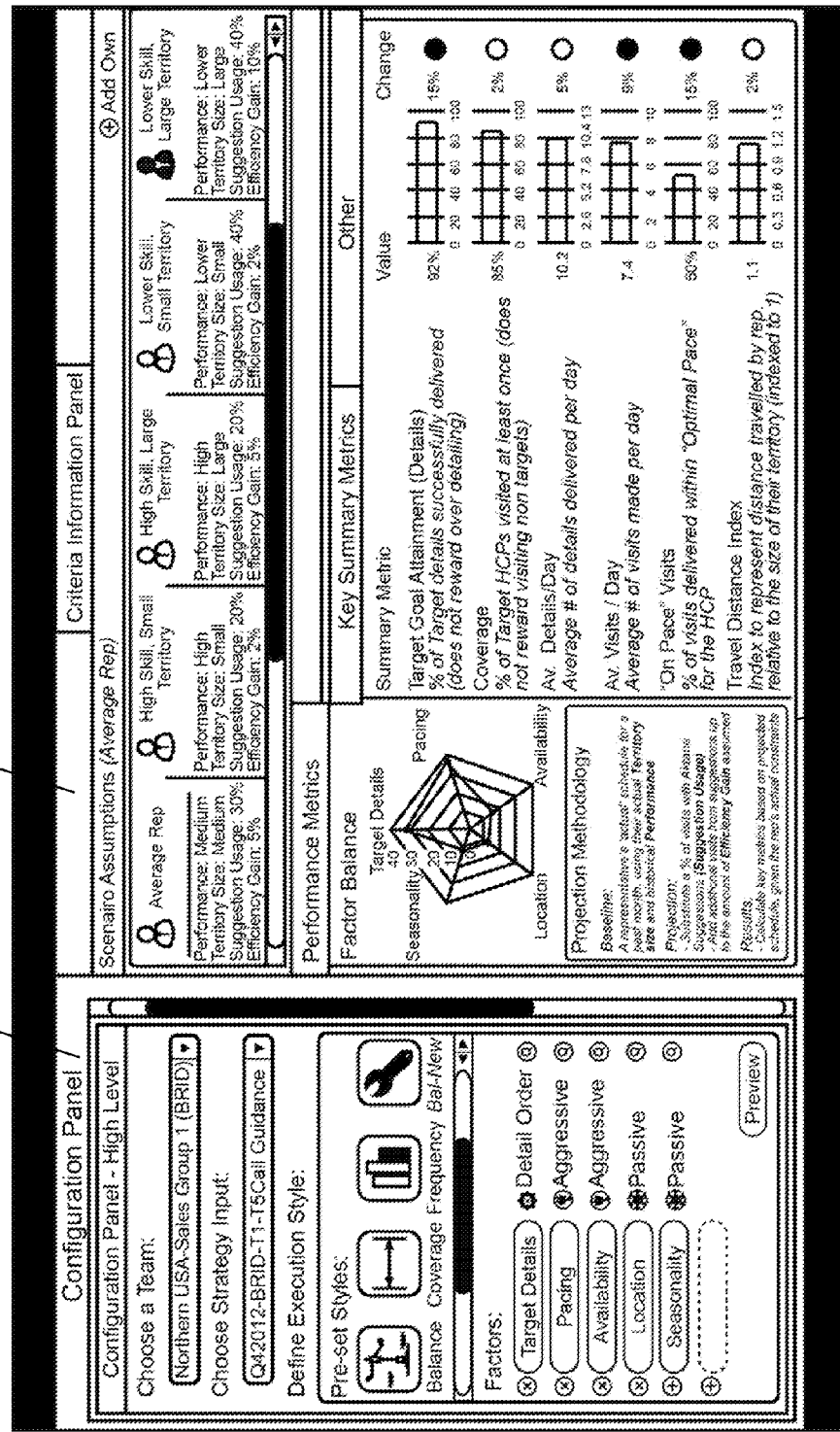
FIG. 22 illustrates an exemplary screenshot of an interface that displays selectable criteria for determining suggestions and expected performance metrics, according to various implementations of the invention.

FIG. 21 depicts a flowchart for selecting criteria used for determining suggestions, according to various implementations of the invention. FIG. 22 illustrates an exemplary screenshot of an interface that displays selectable criteria for determining suggestions and expected performance metrics, according to various implementations of the invention. Processing will be described with respect to FIG. 21 in reference to the screen shots illustrated in FIG. 22.

In an operation 2110, the system 10 may facilitate selection of one or more strategies. In some implementations, operation 2110 may be performed by a suggestion configuration module the same as or similar to suggestion configuration module 124 of suggestion management module 120 (shown in FIG. 2 and described above).

In an operation 2120, the system 10 may facilitate selection of one or more workflows associated with the one or more strategies. In some implementations, operation 2120 may be performed by a suggestion configuration module the same as or similar to suggestion configuration module 124 of suggestion management module 120 (shown in FIG. 2 and described above).

In an operation 2130, the system 10 may facilitate selection of one or more workers associated with the one or more workflows. In some implementations, operation 2130 may be performed by a suggestion configuration module the same as or similar to suggestion configuration module 124 of suggestion management module 120 (shown in FIG. 2 and described above).

In an operation 2140, the system 10 may display criteria associated with suggestions provided for the selected workers. In some implementations, operation 2140 may be performed by a suggestion configuration module the same as or similar to suggestion configuration module 124 of suggestion management module 120 (shown in FIG. 2 and described above).

In an operation 2150, the system 10 may display expected performance metrics based on the selected criteria. In some implementations, operation 2150 may be performed by a suggestion configuration module the same as or similar to suggestion configuration module 124 of suggestion management module 120 (shown in FIG. 2 and described above).

In an operation 2160, the system 10 may facilitate selection of a pre-set combination of criteria for determining suggestions for the selected workers. In some implementations, operation 2160 may be performed by a suggestion configuration module the same as or similar to suggestion configuration module 124 of suggestion management module 120 (shown in FIG. 2 and described above).

In an operation 2170, the system 10 may facilitate selection of one or more criteria for determining suggestions for the selected workers. In some implementations, operation 2170 may be performed by a suggestion configuration module the same as or similar to suggestion configuration module 124 of suggestion management module 120 (shown in FIG. 2 and described above).

Upon completion of operations 2160 and/or 2170, the system 10 may display expected performance metrics based on the selected criteria in an operation 2150. As mentioned above, operation 2150 may be performed by a suggestion configuration module the same as or similar to suggestion configuration module 124 of suggestion management module 120 (shown in FIG. 2 and described above).

FIG. 22 illustrates an exemplary screenshot of an interface that displays selectable criteria for determining suggestions and expected performance metrics, according to various implementations of the invention. The template for displaying selectable criteria for determining suggestions and expected performance metrics may be presented to a manager upon access of strategy information, workflow information, and/or other portions of system 10. The user interface 2200 may include, for example, configuration panel portion 2202, criteria information panel 2204, performance metrics portion 2206, and/or other portions that display information relating to one or more stored strategies.

In some implementations, configuration panel portion 2202 may display one or more links to the one or more templates available via the system 10. For example, the configuration panel portion 2202 may display a title related to the template, an interactive component via which a user may select a strategy, an interactive component via which a user may select a workflow, an interactive component via which a user can select a team of workers associated the workflow, an interactive component via which a user may select a product, an interactive component via which a user may select a customer, and/or other interactive components via which a user may select groupings for which suggestions are determined. In some implementations, the interactive components may be displayed in the form of a drop down menu, a selectable list, a set of items that may be dragged and dropped, and/or other interactive components that facilitates selection of information corresponding to the interactive component. Other examples of configurable and/or interactive components may be used. Other methods of selecting groupings for which suggestions are determined may be used.

Configuration panel 202 may also display one or more interactive components for selecting criteria for determining suggestions. The one or more interactive components may include, for example, components for one or more factors, components for one or more parameters, components for weights associated with one or more selected factors, components for relative weights of one or more factors, components for weights associated with one or more selected parameters, components for relative weights of one or more selected parameters, components for bonuses associated with one or more factors, components for penalties associated with one or more factors, components for bonuses associated with one or more parameters, components for penalties associated with one or more parameters, components for bonuses associated with the overall suggestion, components for penalties associated with the overall suggestion, and/or other criteria used to determine which suggestions to provide. In some implementations, the interactive components may be displayed in the form of a drop down menu, a selectable list, a set of items that may be dragged and dropped, a text box that accepts input of a criterion, and/or other interactive components that facilitates selection of information corresponding to the interactive component. Other examples of configurable and/or interactive components may be used. Other methods of selecting criteria for determining suggestions may be used.

Configuration panel 202 may also display one or more interactive components for selecting values to be associated for the selected criteria. In some implementations, the interactive components may be displayed in the form of a drop down menu, a selectable list, a set of items that may be dragged and dropped, a progress bar that may indicate relative values of one or more factors, a text box that accepts input of a value, and/or other interactive components that facilitates selection of information corresponding to the interactive component. Other examples of configurable and/or interactive components may be used. Other methods of selecting values for criteria may be used.

In some implementations, pre-set combinations of criteria may be selectable via configuration panel portion 2202. The pre-set combinations of criteria may be associated with pre-set values associated with the respective criteria. A pre-set combination of criteria may be identified by one or more of: a corresponding name, a set of factors, an indicator that indicates an expected type of performance associated with the pre-set combination of criteria, a type of worker associated with the pre-set combination of criteria, a type of territory, type of customer, a type of strategy associated with the pre-set combination of criteria, and/or other identifier. A type of performance may comprise, for example, an aggressive performance, a passive performance, a performance closely correlated to a workflow, and/or other type of performance. A type of worker may comprise, for example, an average worker, an above-average worker, a below-average worker, and/or other type of worker. A type of territory may comprise, for example, large territory, small territory, average territory, and/or other type of territory. A type of customer may comprise, for example, a large customer, an average customer, a small customer, and/or other type of customer. A type of strategy may comprise, for example, a combination of one or more of type of worker, type of performance, type of territory, type of customer, and/or other information related to a strategy. Configuration panel 202 may also facilitate the creation of a new pre-set combination of criteria.

The criteria information panel 2204 may display factors, parameters, weights, bonuses, penalties, usage information, and/or other information associated with a pre-set combination of criteria. Usage information associated with a pre-set combination of criteria may include, for example, type of performance expected with the usage of the pre-set combination of criteria, suggested territory size, suggested percentage of usage of the pre-set combination of criteria, expected efficiency gain associated with the usage of the pre-set combination of criteria, and/or other information related to usage of the pre-set combination of criteria.

In some implementations, criteria and associated values selected via the configuration panel portion 2202 may be saved as a pre-set combination of criteria.

Performance metrics panel 2206 may display performance metrics associated with the selected criteria for the selected grouping for which suggestions may be determined. The performance metrics displayed may include one or more of: number of activities successfully performed, number of customers interacted with at least once, number of activities per day, number of activities performed within an optimal timing, number of activities performed within an optimal timing per customer, distance traveled by worker relative to a territory covered by the worker, number of sales, percentage of difference in sales from previous predetermined time period, and/or other performance metrics. The metrics may be displayed as one or more of: a percentage of a target goal, as within a certain quartile, as meeting a predetermined threshold, a change from a predetermined time period, an absolute number, a rank compared to other groupings for which suggestions are determined, an icon to indicate whether performance is average, above average, or needs improvement, and/or other indicator of performance.

In some implementations, performance metrics panel 2206 may also include information relating to how performance metrics are calculated, how expected performance metrics are calculated, average results per worker, baseline activity information per worker, recommendations for how to increase performance metrics, and/or other information relating to performance by the selected grouping for which suggestions may be determined. Performance metrics panel 2206 may also display a graph and/or other image showing how a balance of the selected factors. For example, the graph may show a relative impact of the factors used for determining suggestions. In some implementations, the graph may show an optimal balancing of the factors to obtain optimal performance metrics for the grouping for which suggestions are being determined.

Figure 23:
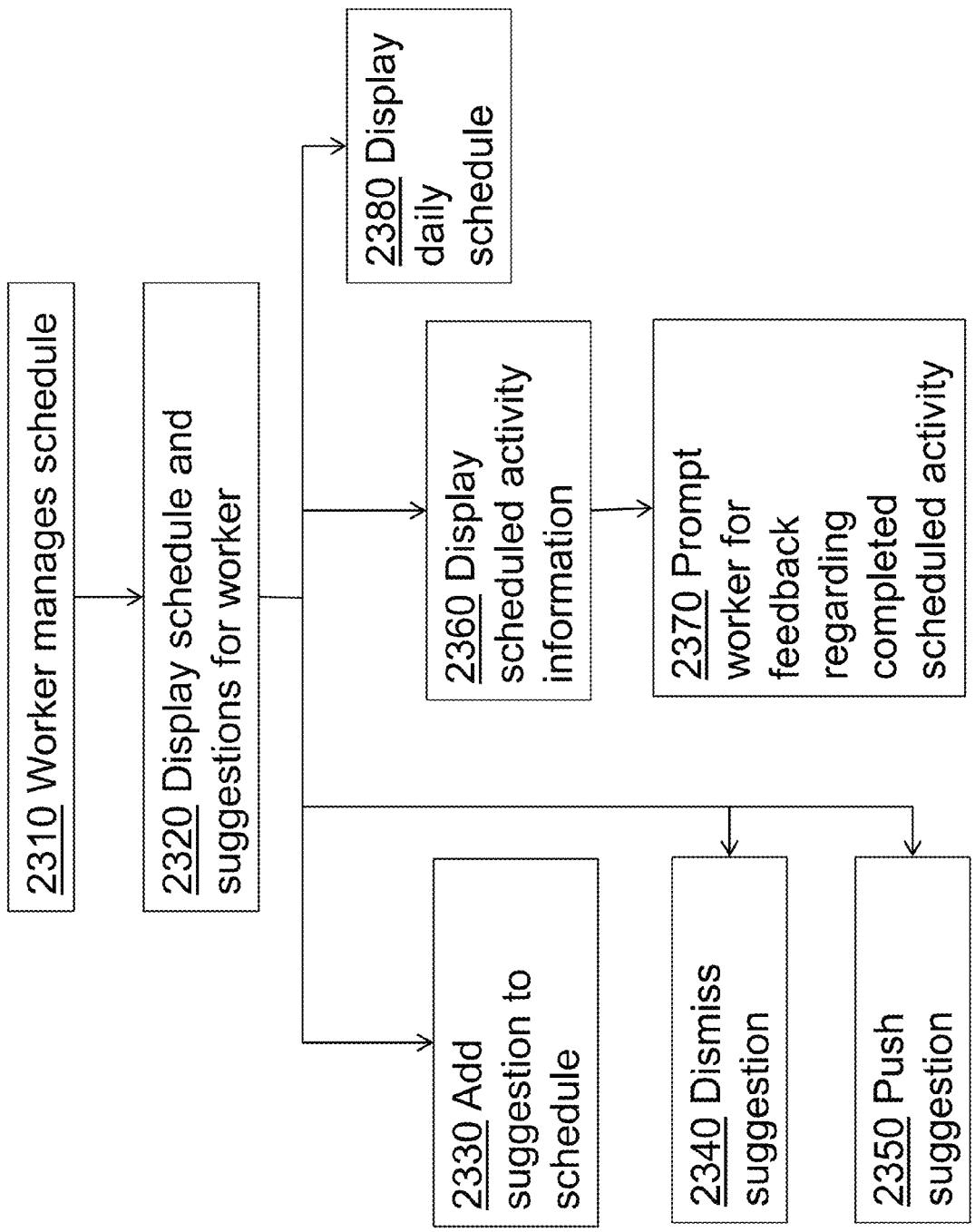
FIG. 23 depicts a flowchart for managing a schedule, according to various implementations of the invention.
Figure 24:
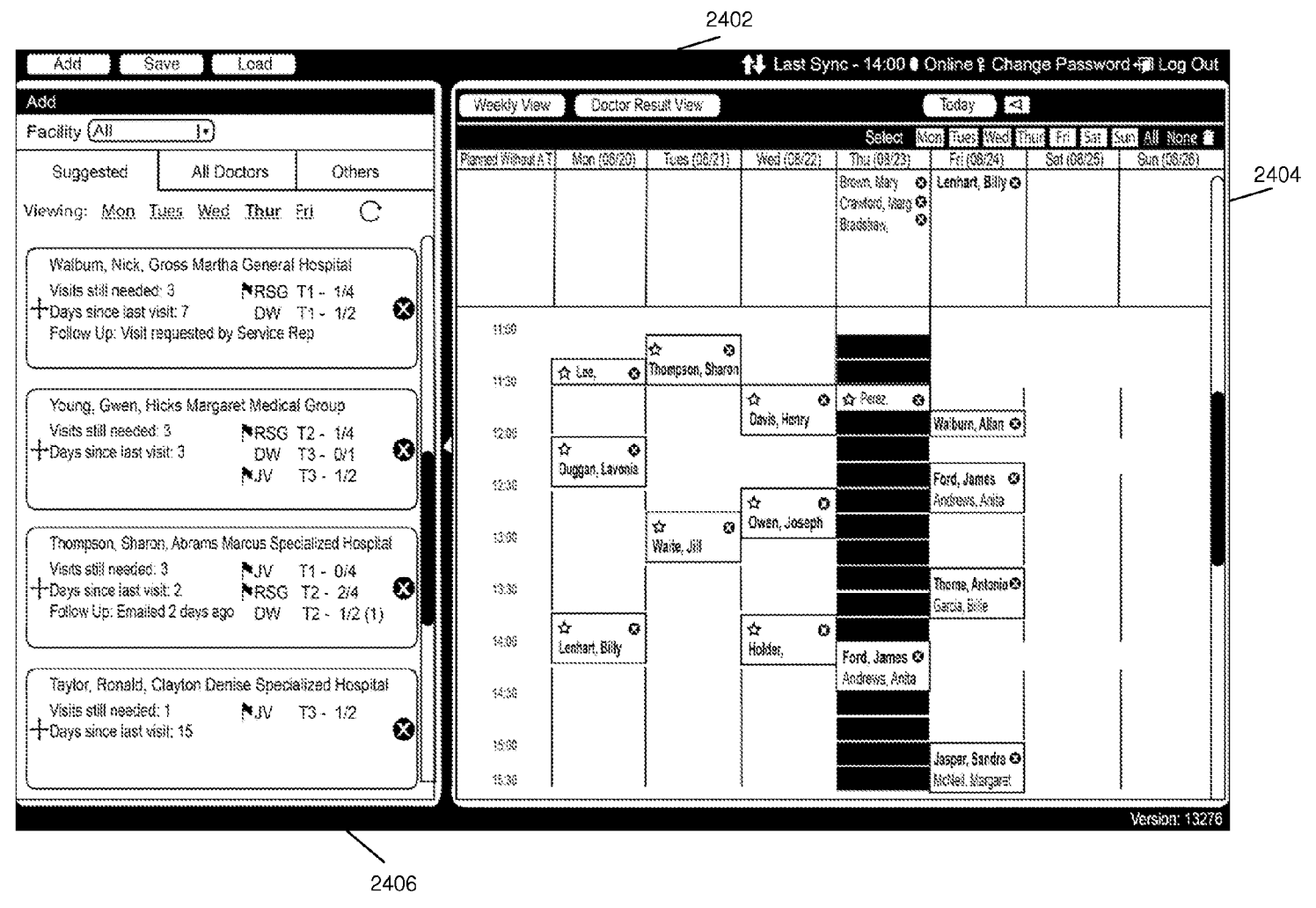
Figure 25:
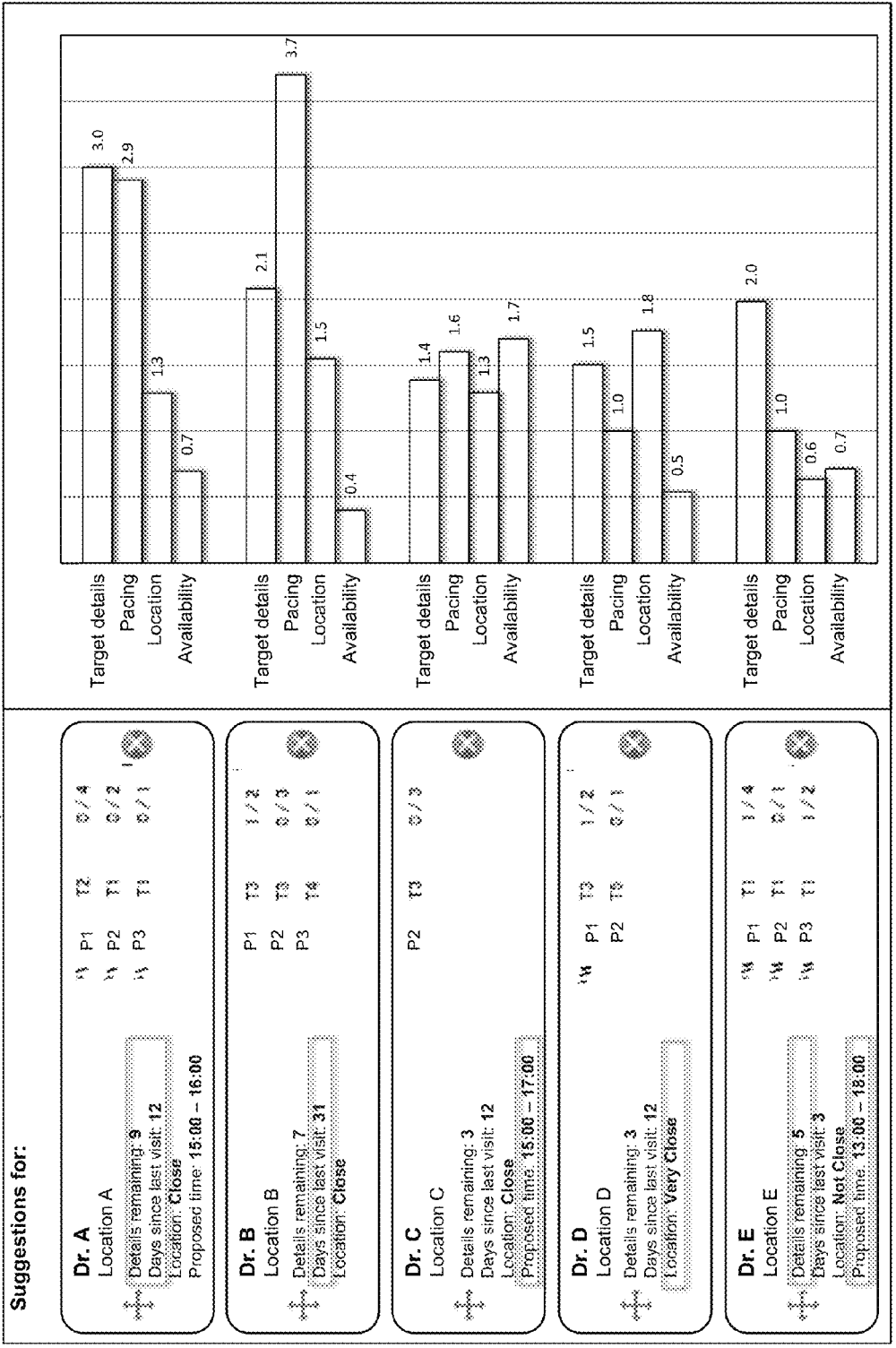
FIG. 25 illustrates an exemplary screenshot displaying scores related to factors related to exemplary suggestions, according to various implementations of the invention.
Figure 26:
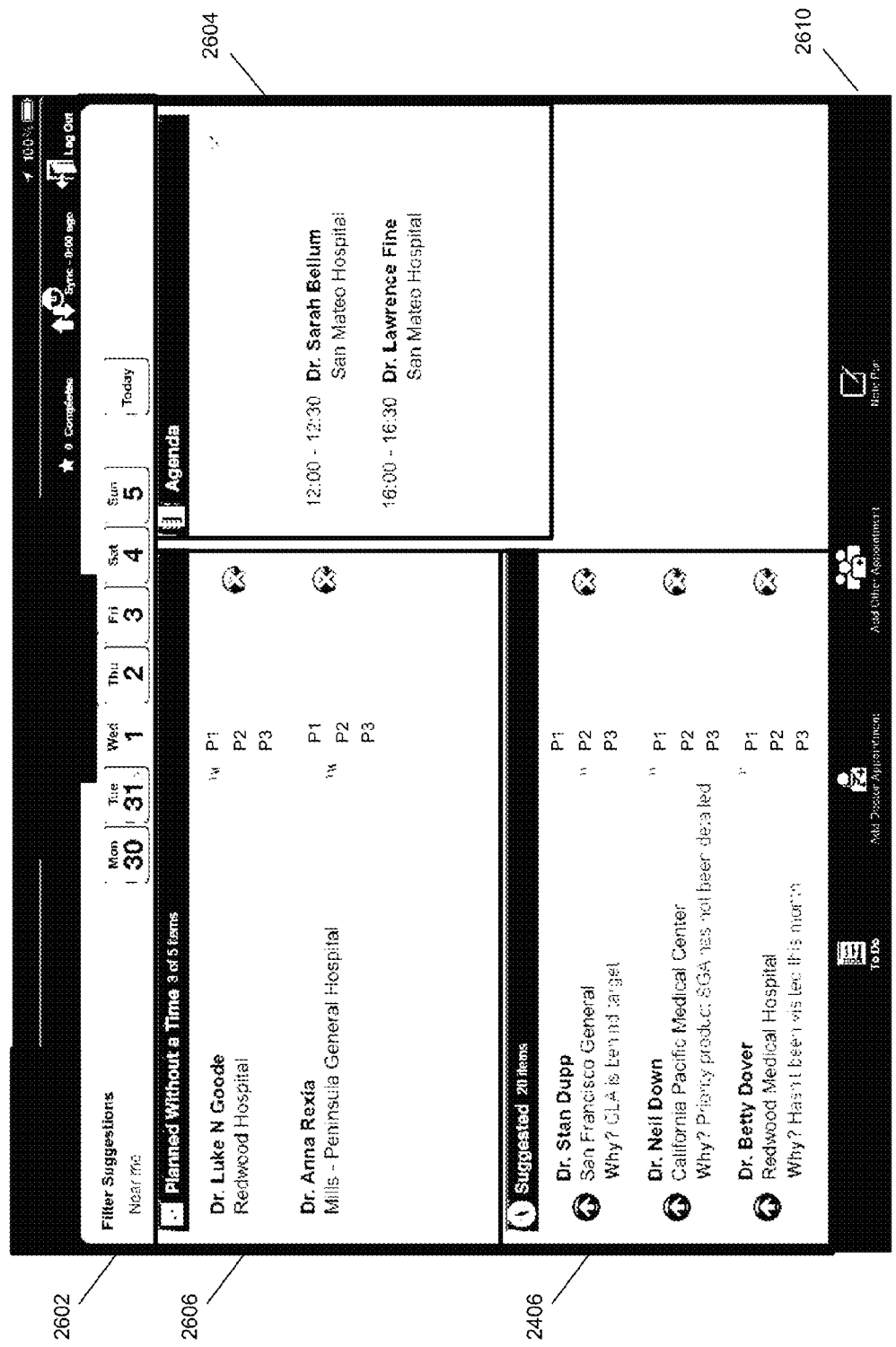
FIG. 26 illustrates an exemplary screenshot of an interface that displays a daily schedule of a worker, according to various implementations of the invention.
Figure 27:
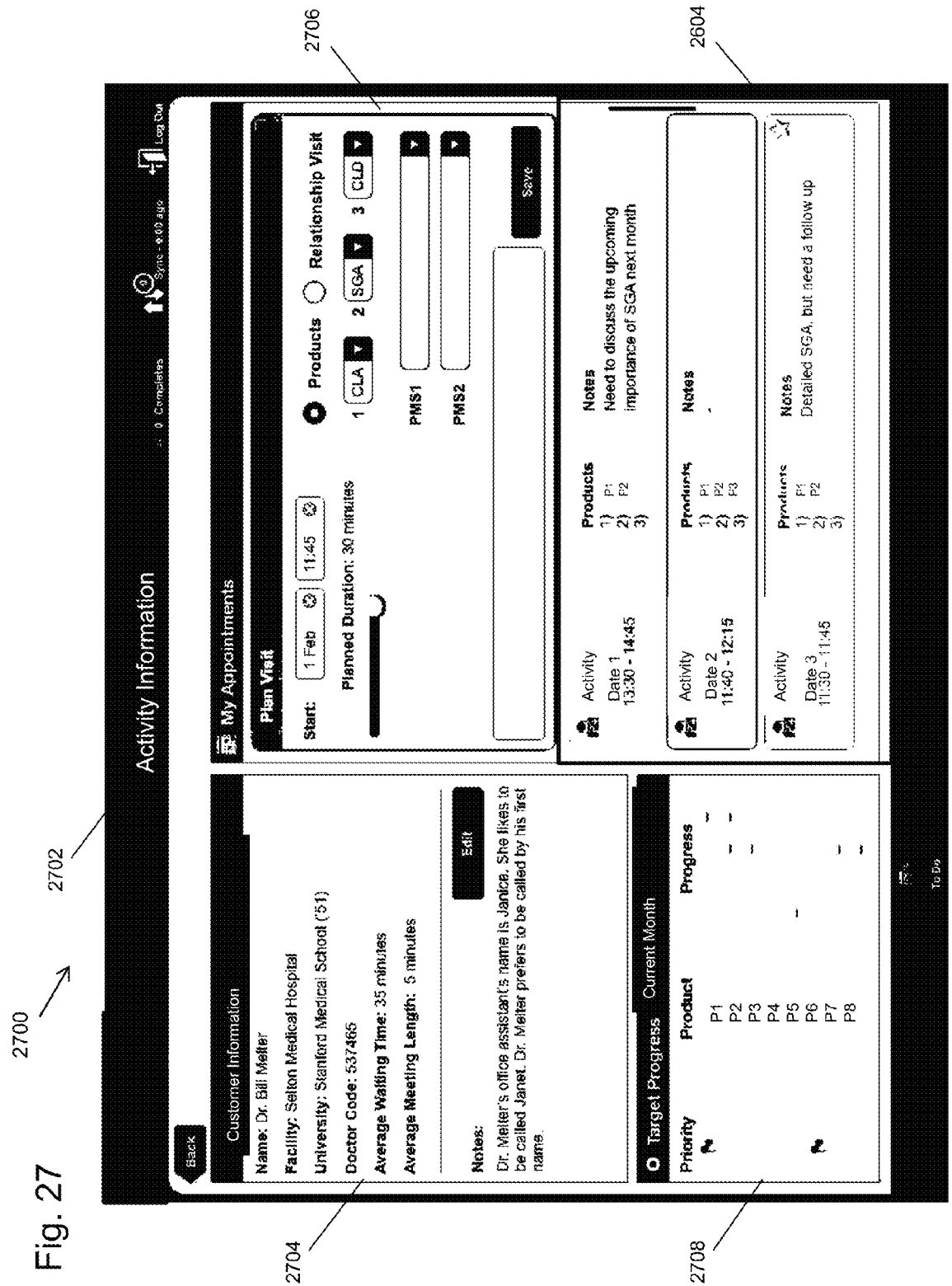
FIG. 27 illustrates an exemplary screenshot of an interface that facilitates editing of an activity, according to various implementations of the invention.

FIG. 23 illustrates a process for managing a schedule of a worker, according to various implementations of the invention. FIG. 24 illustrates an exemplary screenshot of an interface that displays a monthly schedule of a worker, according to various implementations of the invention. FIG. 25 illustrates an exemplary screenshot of an interface that displays a daily schedule of a worker, according to various implementations of the invention. FIG. 26 illustrates an exemplary screenshot of an interface that displays a daily schedule of a worker, according to various implementations of the invention. FIG. 27 illustrates an exemplary screenshot of an interface that facilitates editing of an activity, according to various implementations of the invention. Processing will be described with respect to FIG. 23 in reference to the screen shots illustrated in FIGS. 24-27.

In an operation 2310, the system 10 may facilitate management, by a worker, of a schedule associated with the worker. In some implementations, operation 2310 may be performed by a calendar management module the same as or similar to calendar management module 142 of the activity management module 140 (shown in FIG. 2 and described above).

In an operation 2320, the system 10 may facilitate the display of a worker's schedule and suggestions provided for activities for the worker. In some implementations, operation 2320 may be performed by one or more of a calendar management module the same as or similar to calendar management module 142 of the activity management module 140 (shown in FIG. 2 and described above) and a suggestion management module the same as or similar to suggestion management module 120 (shown in FIG. 2 and described above).

FIG. 24 illustrates an exemplary screenshot of an interface 2400 that displays a schedule and suggestions provided for a worker, according to various implementations of the invention. The template for displaying a schedule and provided suggestions may be presented to a worker upon access of the worker's schedule. The user interface 2400 may include, for example, navigation bar portion 2402, schedule display portion 2404, suggestion display portion 2406, and/or other portions that display information relating to one or more stored strategies.

In some implementations, navigation bar portion 2402 may display one or more links to the one or more templates available via the system 10. For example, the navigation bar 2402 may display a title related to the template, a link to add the displayed schedule to a template, a link to save the displayed schedule as a template, a link to load a saved template, information related to a displayed schedule and suggestions being displayed, and/or other information. For example, the information related to the schedule and suggestions being displayed may include a time that the schedule and corresponding suggestions were last synced, whether the worker is connected to a network, an ability to view a weekly view of the schedule and corresponding suggestions, a daily view of the schedule and corresponding suggestions, a monthly view of the schedule and corresponding suggestions, a view of the schedule and corresponding suggestions during a chosen date range, and/or other information related to the schedule and the strategy. In some implementations, the information related to a date range for displaying the schedule and/or other information may be displayed in the form of a drop down menu, a calendar, and/or other interactive component that facilitates selection of two dates that correspond to a date range. Other examples of configurable and/or interactive components may be used. Other methods of choosing a date range for displaying the schedule and corresponding suggestions may be used.

In some implementations, schedule display portion 2404 may display information relating to a schedule for the user. The schedule displayed may comprise information relating to a time period selected via navigation portion 2402. Information displayed for a schedule may include, for example, activities scheduled during the time period selected via navigation portion 2412, and/or other information related to a schedule. A display of an activity scheduled in the schedule display portion 2404 may comprise a link, a click-through item, and/or other configurable and/or interactive item. Interaction with a scheduled activity displayed in the schedule display portion 2404 may facilitate viewing and/or editing of corresponding activity information. The schedule display portion 2404 may also facilitate the drag and drop of activities and/or suggestions to the schedule displayed. In some implementations, when a potential activity and/or suggestion is hovered over a time period, the time period may indicate whether the customer associated with the potential activity and/or suggestion is available during that time period.

In some implementations, suggestion display portion 2404 may display information relating to suggestions. For example, suggestion display portion 2404 may display one or more suggestions provided by a suggestion management module the same as or similar to suggestion management module 120. Information relating to suggestions may comprise, for example, types of suggestions displayed, subsets of time periods corresponding to the selected time period of the schedule for which to display suggestions, information relating to one or more suggestions for activities, and/or other information relating to suggestions. Information relating to one or more suggestions for activities may comprise relevant information associated with the suggestion. For example, the relevant information may include one or more of: a date of the activity, location information associated with the activity (e.g., a specific location at which the activity is to be performed, a map of the location, directions to the location, and/or other location information), one or more rationales for the activity, one or more customers associated with the activity, one or more products associated with the activity, one or more scores (for the overall suggestion, for one or more factors associated with the suggestion, for one or more parameters associated with the factors, and/or other scores) related to the suggestion, performance execution information related to the suggestion, whether a suggestion is a new suggestion, and/or other relevant information.

In some implementations, the information related to suggestions may be displayed in the form of a drop down menu, a link, and/or other interactive component that facilitates filtering, by a user of the template, of the suggestions being displayed by the type of information chosen. For example, information related to products may be displayed via a drop down menu that includes names of some or all of the products stored in the system 10, an item relating to all products, and/or other types of products. The suggestions displayed may be filtered to correspond to the item chosen in the drop down menu for products. In another example, information related to a time frame for displaying the schedule may be displayed via a drop down menu. The suggestions displayed may be filtered to correspond to the time frame chosen in the drop down menu. Other examples of configurable and/or interactive components may be used. Other methods of filtering the suggestions displayed may be used.

FIG. 25 illustrates an exemplary screenshot displaying scores related to factors related to exemplary suggestions, according to various implementations of the invention. In some implementations, user interface 2500 may be presented that includes an exemplary template for displaying suggestions and related scores. The template for displaying suggestions and related scores may be presented to a user upon access of suggestion information and/or schedule information by the user. The screenshot illustrated in FIG. 25 is similar to the screenshot illustrated in FIG. 24 with at least the following differences. The user interface 2500 may include, for example, suggestion display portion 2406, score display portion 2504, and/or other portions that display information relating to one or more suggestions.

Score display portion 2504 may display a graph depicting scores related to one or more factors and/or one or more parameters of a factor related to determining a score for the displayed suggestion. In some implementations, weights, bonuses, and/or penalties applied to the parameters and/or factors may be displayed. In some implementations, values for weights, bonuses and/or penalties may be displayed, edited, saved, and/or canceled by user input.

Returning to FIG. 23, in an operation 2330, the system 10 may facilitate the addition of a suggestion to a schedule. In some implementations, operation 2330 may be performed by one or more of a calendar management module the same as or similar to calendar management module 142 of the activity management module 140 (shown in FIG. 2 and described above) and a suggestion management module the same as or similar to suggestion management module 120 (shown in FIG. 2 and described above).

In an operation 2340, the system 10 may facilitate the dismissal of a suggestion. In some implementations, operation 2340 may be performed by one or more of a calendar management module the same as or similar to calendar management module 142 of the activity management module 140 (shown in FIG. 2 and described above) and a suggestion management module the same as or similar to suggestion management module 120 (shown in FIG. 2 and described above).

In an operation 2350, the system 10 may facilitate the push of a suggestion provided to a later time and/or date. In some implementations, operation 2350 may be performed by one or more of a calendar management module the same as or similar to calendar management module 142 of the activity management module 140 (shown in FIG. 2 and described above) and a suggestion management module the same as or similar to suggestion management module 120 (shown in FIG. 2 and described above).

In an operation 2360, the system 10 may facilitate the display of information related to a scheduled activity. In some implementations, operation 2360 may be performed by a calendar management module the same as or similar to calendar management module 142 of the activity management module 140 (shown in FIG. 2 and described above). In an operation 2370, the system 10 may facilitate prompting a user for feedback regarding a completed scheduled activity. In some implementations, operation 2370 may be performed by a calendar management module the same as or similar to calendar management module 142 of the activity management module 140 (shown in FIG. 2 and described above).

FIG. 26 illustrates an exemplary screenshot of an interface that displays a daily schedule of a worker, according to various implementations of the invention. In some implementations, user interface 2600 may be presented that includes an exemplary template for displaying a daily schedule of a worker. The template for displaying a daily schedule may be presented to a user upon access of schedule information by the user. The screenshot illustrated in FIG. 26 is similar to the screenshot illustrated in FIG. 24 with at least the following differences. The user interface 2600 may include, for example, navigation bar portion 2602, scheduled activity display portion 2604, stored activity display portion 2606, suggestion display portion 2406, schedule navigation bar 2610, and/or other portions that display information relating to a daily schedule.

Navigation bar portion 2602 may display one or more links to the one or more templates available via the system 10. For example, the navigation bar 2602 may display a title related to the template, a link to add the displayed daily schedule to a template, a link to save the displayed daily schedule as a template, a link to load a saved template, information related to a displayed daily schedule and suggestions being displayed, and/or other information.

In some implementations, scheduled activity display portion 2604 may display information relating to activities scheduled for the user for the day for which the schedule is displayed. Activity information may include, for example, a time of the activity, a location of the activity, one or more customers associated with the activity, one or more products associated with the activity, one or more tips relating to the activity, and/or other information relating to the activity.

Stored activity display portion 2606 may display information related to activities that have been stored with the system 10 but that do not have an associated time and/or date. Information related to stored activities may include, for example, a potential time of the activity, a location of the activity, one or more customers associated with the activity, one or more products associated with the activity, one or more tips relating to the activity, and/or other information relating to the activity.

Suggestion display portion 2406 may display suggestions relevant to the day for which the worker's daily schedule is displayed.

Schedule navigation bar 2610 may display one or more links to the one or more templates available via the system 10. For example, the navigation bar 2610 may display a title related to the template, and information related to the templates related to providing functionality for the schedule. For example, the information related to the providing functionality may include links for viewing a to do list associated with the worker, links for adding one or more types of activities, links for adding notes, and/or other information related to functionality provided via the system 10.

Returning to FIG. 23, in an operation 2380, the system 10 may facilitate the display of a daily schedule including corresponding suggestions and activities that were scheduled without a time and/or date. In some implementations, operation 2380 may be performed by a calendar management module the same as or similar to calendar management module 142 of the activity management module 140 (shown in FIG. 2 and described above).

FIG. 27 illustrates an exemplary screenshot of an interface that facilitates editing of an activity, according to various implementations of the invention. In some implementations, user interface 2700 may be presented that includes an exemplary template for editing an activity. The template for editing strategies may be presented to a user upon access of activity information by the user, upon completion of an activity by the user, and/or upon other access of other functionality related to an individual activity. The screenshot illustrated in FIG. 27 is similar to the screenshot illustrated in FIG. 26 with at least the following differences. The user interface 2700 may include, for example, navigation bar portion 2702, customer information display portion 2704, activity feedback portion 2706, performance execution display portion 2708, scheduled activity display portion 2604, and/or other portions that display information relating to one or more stored strategies.

Navigation bar portion 2702 may display one or more links to the one or more templates available via the system 10. For example, the navigation bar 2702 may display a title related to the template, a link to edit an activity, information related to the activity being displayed, and/or other information.

Customer information display portion 2704 may display information related to the individual activity being displayed. For example, activity information display portion 2504 may display information related to customer, associated facility and/or company of the customer, education, customer identification number, average expected waiting time, average expected meeting length, associated products, associated messaging, notes, tips, and/or other information related to the customer.

Activity feedback portion 2706 may display information related to the performance of the activity. For example, information related to the performance of the activity may include actual start time of the activity, actual end time of the activity, planned duration of the activity, actual wait time associated with the activity, type of activity, products associated with the activity, messaging associated with the activity, notes for the activity, tips for the activity, and/or other information related to the performance of the activity. In some implementations, one or more pieces of information related to the performance of the activity may be configured to receive user input. Feedback relating to a scheduled activity may be provided via activity feedback portion 2706.

Performance execution display portion 2708 may display information related to performance execution metrics relating to the activity and/or associated workflow. For example, information related to performance execution metrics may be displayed as one or more graphs showing metrics related to performance execution of a workflow associated with the displayed activity. Metrics may include, for example, target progress for a predetermined time period, progress per product, progress per customer, and/or other metrics discussed with the strategy management module 110.

The computing device 100 may be any computing device such as, for example, a server, a desktop computer, laptop computer, personal digital assistant, smart phone, gaming console, and/or any other computing device. Computing device 100 may include a storage module 105, one or more processors 101, and/or other components. Illustration of computing device 100 in FIG. 1 is not intended to be limiting.

Computing device 100 may include a plurality of hardware, software, and/or firmware components operating together to provide the functionality attributed herein to computing device 100. For example, computing device 100 may be implemented by a cloud of computing platforms operating together as computing device 100. Other configurations and system architectures may be used. For example, computing device 100 may be or include one or more servers connected to one or more client computing devices 30 via a network 20 such as a Wide Area Network, Local Area Network, the Internet, a cloud-based network and/or other network or combination thereof. The computing device 100 may be capable of communicating with network 20, one or more client computing devices 30, and/or one or more other devices.

Processor(s) 101 may provide information processing capabilities within computing device 100. As such, processor 101 may include one or more of a digital processor, an analog processor, a digital circuit designed to process information, an analog circuit designed to process information, a state machine, and/or other mechanisms for electronically processing information. Although processor 101 is shown in FIG. 1 as a single entity, this is not intended to be limiting, as processor 101 may include a plurality of processors operating in coordination or cooperation. This may include implementations in which computing device 100 includes a multi-processor device, a farm of server devices operating together, and/or virtual resources provided by the cloud. The processor 101 may be configured to execute modules 110, 120, 130, 140, 150, 160, 170, 180, 190, and/or 199. Processor 101 may be configured to execute modules 110, 120, 130, 140, 150, 160, 170, 180, 190, and/or 199 by software, hardware, firmware, some combination of software, hardware, and/or firmware, and/or other mechanisms for configuring processing capabilities on processor 101.

It should be appreciated that although modules 110, 120, 130, 140, 150, 160, 170, 180, 190, and/or 199 are illustrated in FIG. 1 as being co-located within a single computing device, in implementations in which processor 101 includes multiple processing units, one or more of modules 110, 120, 130, 140, 150, 160, 170, 180, 190, and/or 199 may be located remotely from the other modules. The description of the functionality provided by the different modules 110, 120, 130, 140, 150, 160, 170, 180, 190, and/or 199 described below is for illustrative purposes, and is not intended to be limiting, as any of modules 110, 120, 130, 140, 150, 160, 170, 180, 190, and/or 199 may provide more or less functionality than is described. For example, one or more of modules 110, 120, 130, 140, 150, 160, 170, 180, 190, and/or 199 may be eliminated, and some or all of its functionality may be provided by other ones of modules 110, 120, 130, 140, 150, 160, 170, 180, 190, 195, and/or 103. As another example, processor 101 may be configured to execute one or more additional modules that may perform some or all of the functionality attributed below to one of modules 110, 120, 130, 140, 150, 160, 170, 180, 190, and/or 199.

The storage module 105 may comprise electronic storage media that electronically stores information non-transiently. The electronic storage media of storage module 105 may include one or both of system storage that is provided integrally (i.e., substantially non-removable) with computing device 100 and/or removable storage that is removably connectable to computing device 100 via, for example, a port (e.g., a USB port, a firewire port, etc.) or a drive (e.g., a disk drive, etc.). The storage module 105 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The storage module 105 may include one or more virtual storage resources (e.g., cloud storage, a virtual private network, and/or other virtual storage resources). The storage module 105 may store software algorithms, information determined by processor 101, information received from computing device 100, information received from client computing devices 30, and/or other information that enables computing device 100 to function as described herein.

In some implementations, the storage module 105 may comprise at least one database that stores system data such as information related to system usage, information processed via system 10, and/or other data. The storage module 105 may be associated and communicate with the computing device 100. For example, the one or more databases comprising the storage module 105 may be, include, or interface to, for example, an Oracle™ relational database sold commercially by Oracle Corporation. Other databases, such as Informix™, DB2 (Database 2) or other data storage, including file-based, object, or query formats, platforms, or resources such as OLAP (On Line Analytical Processing), SQL (Standard Query Language), NoSQL, a SAN (storage area network), Microsoft Access™ or other form of database may also be used, incorporated, or accessed. The database may comprise one or more such databases that reside in one or more physical devices and in one or more physical locations. The database may store a plurality of types of data and/or files and associated data or file descriptions, administrative information, or any other data.

In some implementations, the storage module 105 may be part of or hosted by a computing device on the network 20. In some implementations, the storage module 105 may be part of or hosted by the computing device 100. In some implementations, the storage module 105 may be physically separate from the computing device 100 but may be operably communicable therewith.

The client computing device 30 may include one or more physical processors configured to execute computer program modules. By way of non-limiting example, the client computing device 30 may include one or more of a server, desktop computer, a laptop computer, a handheld computer, a tablet computing platform, a NetBook, a Smartphone, a gaming console, and/or other computing platforms. The client computing device 30 may be capable of communicating with network 20, computing device 100, the storage module 105, and/or other devices.

In addition, implementations of the invention may be made in hardware, firmware, software, or any suitable combination thereof. Aspects of the invention may also be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described herein in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations described herein as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A system for recommending sales activities to individual workers based on worker specific information and overall company-level sales strategy, the system comprising:
one or more physical processors configured to execute computer program instructions, comprising:
a strategy management component configured to:
determine a first configurable strategy based on a plurality of configurable market segments, wherein the first configurable strategy is related to promoting the first product;
determine a first plurality of configurable workflows related to the first configurable strategy, the first plurality of configurable workflows comprising a first configurable workflow, wherein determining the first configurable workflow comprises determining a first set of activities related to promoting a first product to a first customer and a second configurable workflow, wherein determining the second configurable workflow comprises determining a second set of activities related to promoting the first product to a second customer;

determine a first configurable market segment of the plurality of market segments, wherein determining the first configurable market segment comprises:

receiving information related to the first customer to be targeted by the first configurable strategy;

receiving information related to the first product to be targeted by the first configurable strategy;

receiving abstraction information related to one or more of: a territory, a worker type, or a company goal, wherein the company goal comprises a sales goal for the first product; and defining the first configurable market segment based on the first customer, the first product, and the abstraction information;

associate the first configurable workflow with the defined first configurable market segment to target the first product to the first customer to pursue the sales goal for the first product;

determine a second configurable strategy based on a second plurality of market segments different from the first plurality of market segments, wherein the second configurable strategy is related to promoting a second product; and determine a second plurality of configurable workflows related to the second configurable strategy, the second plurality of configurable workflows comprising a third configurable workflow related to promoting a second product to the first customer;

a suggestion management component configured to:

determine a first suggested activity for a first worker based on the first set of activities of the first configurable workflow, the second set of activities of the second configurable workflow, a first time period during which the first suggested activity is to be performed, a location associated with the first suggested activity, and a frequency of occurrence associated with the first suggested activity; and determine a second suggested activity for the first worker responsive to a determination that the first worker is associated with the third workflow, wherein the second suggested activity is determined based on the first set of activities of the first configurable workflow, the second set of activities of the second configurable workflow, a third set of activities from the third configurable workflow, a second time period during which the second suggested activity is to be performed, a second location associated with the second suggested activity, and a second frequency of occurrence associated with the second suggested activity; and an activity management component configured to:

output, to the first worker, a schedule for the first time period and the first suggested activity, wherein the schedule comprises a plurality of scheduled activities associated with the first worker within the first time period; and output, to the first worker, the second suggested activity with the schedule for the first time period and the first suggested activity.

2. The system of claim 1, wherein the activity management component is configured to:

receive, from the first worker, an indication regarding whether the first worker accepts or rejects the first suggested activity;

responsive to receiving the indication that the first worker accepts the first suggested activity, add the first suggested activity to the plurality of scheduled activities of the calendar.

3. The system of claim 2, wherein the suggestion determination component is configured to:

determine a set of suggested activities for the first worker based on the first set of activities of the first configurable workflow, the second set of activities of the second configurable workflow, and the schedule of the first worker, and wherein the activity management component is configured to:

prepare a proposed schedule for the first time period based on the plurality of scheduled activities of the schedule and the set of suggested activities.

4. The system of claim 1, wherein the suggestion management component is configured to:

access information related to a current location of the first worker;

determine a first timed suggested activity to output to the first worker with the schedule based on:

the schedule for the first worker;

the first set of activities of the first configurable workflow;

the second set of activities of the second configurable workflow;

the current location of the first worker; and an activity value associated with performing the first timed suggested activity in the first time period, wherein the activity value is calculated based on one or more of:

information relating to a schedule of a client associated with the first timed suggested activity, a wait time associated with the first timed suggested activity, travel time from the current location to a location of the first timed suggested activity, or an amount of time passed since an activity similar to the first timed suggested activity occurred, and wherein the activity management component is configured to:

output, to the first worker, the first timed suggested activity with the schedule.

5. The system of claim 1, wherein the suggestion management component is configured to:

determine a rationale for the first suggested activity, wherein the rationale includes information related to a value of the first suggested activity to a customer associated with the first suggested activity; and wherein the activity management component is configured to:

output, to the first worker, the rationale for the first suggested activity with the first suggested activity.

6. The system of claim 5, wherein the rationale comprises information for the first worker to share with a customer associated with the first suggested activity.

7. The system of claim 5, wherein the suggestion management component is configured to:

calculate a score for the first suggested activity based on calculating a first rank value for a first factor and calculating a second rank value for a second factor, wherein the rationale comprises information related to one or more of: the first rank value calculated for the first factor associated with the first suggested activity and the second rank value calculated for the second factor associated with the first suggested activity.

8. The system of claim 1, wherein the activity management component is configured to:
   facilitate receipt of feedback from the first worker related to a first executed activity of the first set of activities of the first configurable workflow; and
   wherein the strategy management component is configured to:
      update the first configurable workflow based on the received feedback.

9. The system of claim 1, wherein the suggestion management component is configured to:
   determine, as a third suggested activity, an activity triggered by one or more of: receipt, from a second worker, of feedback related to the activity, a change in behavior of a customer of the company, or compliance with regulations related to the company, and
   wherein the activity management module is configured to:
      output, to the first worker, the third suggested activity with the schedule.

10. The system of claim 1, wherein the strategy management component is configured to:
    facilitate selection of a first criteria for determining the first strategy based on one or more of: strategy type, worker type, or level of involvement;
    prepare an optimized sample strategy based on the selected criteria; and
    determine expected performance metrics based on the optimized sample strategy.

11. The system of claim 10, wherein the strategy management component is configured to:
    prepare an optimized configurable workflow based on the optimized strategy; and
    populate data for an optimized activity of the optimized configurable workflow based on feedback received from a plurality of workers of the company.

12. A method for recommending sales activities to individual workers based on worker specific information and overall managing company-level sales strategy for a company, the method being implemented in a computer system comprising one or more physical processors configured to execute computer program instructions, the method comprising:
    determining, by the one or more physical processors, a first configurable strategy based on a plurality of configurable market segments, wherein the first configurable strategy is related to promoting the first product;
    determining, by the one or more physical processors, a first plurality of configurable workflows related to the first configurable strategy, the first plurality of configurable workflows comprising a first configurable workflow, wherein determining, by the one or more physical processors, the first configurable workflow comprises determining, by the one or more physical processors, a first set of activities related to promoting a first product to a first customer and a second configurable workflow, wherein determining, by the one or more physical processors, the second configurable workflow comprises determining, by the one or more physical processors, a second set of activities related to promoting the first product to a second customer;
    determining, by the one or more physical processors, a first configurable market segment of the plurality of market segments, wherein determining the first configurable market segment comprises:
       receiving, by the one or more physical processors, information related to the first customer to be targeted by the first configurable strategy;
       receiving, by the one or more physical processors, information related to the first product to be targeted by the first configurable strategy;
       receiving, by the one or more physical processors, abstraction information related to one or more of: a territory, a worker type, or a company goal, wherein the company goal comprises a sales goal for the first product; and
       defining, by the one or more physical processors, the first configurable market segment based on the first customer, the first product, and the abstraction information;
    associating, by the one or more physical processors, the first configurable workflow with the defined first configurable market segment to target the first product to the first customer to pursue the sales goal for the first product;
    determining, by the one or more physical processors, a second configurable strategy based on a second plurality of market segments different from the first plurality of market segments, wherein the second configurable strategy is related to promoting a second product; and
    determining, by the one or more physical processors, a second plurality of configurable workflows related to the second configurable strategy, the second plurality of configurable workflows comprising a third configurable workflow related to promoting a second product to the first customer;
    determining, by the one or more physical processors, a first suggested activity for a first worker based on the first set of activities of the first workflow, the second set of activities of the second workflow, a first time period during which the first suggested activity is to be performed, a location associated with the first suggested activity, and a frequency of occurrence associated with the first suggested activity;
    determining, by the one or more physical processors, a second suggested activity for the first worker responsive to a determination that the first worker is associated with the third workflow, wherein the second suggested activity is determined based on the first set of activities of the first configurable workflow, the second set of activities of the second configurable workflow, a third set of activities from the third configurable workflow, a second time period during which the second suggested activity is to be performed, a second location associated with the second suggested activity, and a second frequency of occurrence associated with the second suggested activity;
    outputting to the first worker, by the one or more physical processors, a schedule for the first time period and the first suggested activity, wherein the schedule comprises a plurality of scheduled activities associated with the worker within the first time period; and
    outputting, by the one or more physical processors, to the first worker, the second suggested activity with the schedule for the first time period and the first suggested activity.

13. The method of claim 12, further comprising:
receiving, by the one or more processors, an indication from the first worker regarding whether the first worker accepts or rejects the first suggested activity;
responsive to receiving the indication that the first worker accepts the first suggested activity, adding, by the one or more processors, the first suggested activity to the plurality of scheduled activities of the calendar.

14. The method of claim 13, further comprising:
determining, by the one or more processors, a set of suggested activities for the first worker based on the first set of activities of the first configurable workflow, the second set of activities of the second configurable workflow, and the schedule of the first worker; and
preparing, by the one or more physical processors, a proposed schedule for the first time period based on the plurality of scheduled activities of the schedule and the set of suggested activities.

15. The method of claim 12, further comprising:
accessing, by the one or more physical processors, information related to a current location of the first worker;
determining, by the one or more physical processors, a first timed suggested activity to output to the first worker with the schedule based on:
the schedule for the first worker;
the first set of activities of the first configurable workflow;
the second set of activities of the second configurable workflow;
the current location of the first worker; and
an activity value associated with performing the first timed suggested activity in the first time period, wherein the activity value is calculated based on one or more of:
information relating to a schedule of a client associated with the first time suggested activity, a wait time associated with the first timed suggested activity, travel time from the current location to a location of the first timed suggested activity, or an amount of time passed since an activity similar to the first time suggested activity occurred and
outputting to the first worker, by the one or more physical processors, the first timed suggested activity with the schedule.

16. The method of claim 12, further comprising:
determining, by the one or more physical processors, a rationale for the first suggested activity, wherein the rationale includes information related to a value of the first suggested activity to a customer associated with the first suggested activity; and
outputting to the first worker, by the one or more physical processors, the rationale for the first suggested activity with the first suggested activity.

17. The method of claim 16, wherein the rationale comprises information for the first worker to share with a customer associated with the first suggested activity.

18. The method of claim 16, further comprising:
calculating, by the one or more processors, a score for the first suggested activity based on calculating a first rank value for a first factor and calculating a second rank value for a second factor,
wherein the rationale comprises information related to one or more of: the first rank value calculated for the first factor associated with the first suggested activity and the second rank value calculated for the second factor associated with the first suggested activity.

19. The method of claim 12, further comprising:
facilitating, by the one or more physical processors, receipt of feedback from the first worker related to a first executed activity of the first set of activities of the first configurable workflow; and
updating, by the one or more physical processors, the first configurable workflow based on the received feedback.

20. The method of claim 12, further comprising:
determining, by the one or more physical processors, as a second suggested activity, an activity triggered by one or more of: receipt, from a second worker, of feedback related to the activity, a change in behavior of a customer of the company, or compliance with regulations related to the company; and
outputting to the first worker, by the one or more physical processors, the second suggested activity with the schedule.

21. The method of claim 12, further comprising:
facilitating, by the one or more physical processors, selection of a first criteria for determining the first strategy based on one or more of: strategy type, worker type, or level of involvement;
preparing, by the one or more physical processors, an optimized sample strategy based on the selected criteria; and
determining, by the one or more physical processors, expected performance metrics based on the optimized sample strategy.

22. The method of claim 21, further comprising:
preparing, by the one or more physical processors, an optimized configurable workflow based on the optimized strategy; and
populating, by the one or more physical processors, data for an optimized activity of the optimized configurable workflow based on feedback received from a plurality of workers of the company.

23. A non-transitory electronic storage media storing information related to recommending sales activities to individual workers based on worker specific information and overall company-level sales strategy, the stored information comprising:
information related to one or more company goals, a plurality of products, a plurality of customers, and a plurality of workers;
computer program instructions configured to cause a client computing platform to:
determine a first configurable strategy based on a plurality of configurable market segments, wherein the first configurable strategy is related to promoting the first product;
determine a first plurality of configurable workflows related to the first configurable strategy, the first plurality of configurable workflows comprising a first configurable workflow, wherein determining the first configurable workflow comprises determining a first set of activities related to promoting a first product to a first customer and a second configurable workflow, wherein determining the second configurable workflow comprises determining a second set of activities related to promoting the first product to a second customer;
determine a first configurable market segment of the plurality of market segments, wherein determining the first configurable market segment comprises:
receiving information related to the first customer to be targeted by the first configurable strategy;
receiving information related to the first product to be targeted by the first configurable strategy;

receiving abstraction information related to one or more of: a territory, a worker type, or a company goal, wherein the company goal comprises a sales goal for the first product; and defining the first configurable market segment based on the first customer, the first product, and the abstraction information;

associate the first configurable workflow with the defined first configurable market segment to target the first product to the first customer to pursue the sales goal for the first product;

determine a second configurable strategy based on a second plurality of market segments different from the first plurality of market segments, wherein the second configurable strategy is related to promoting a second product; and determine a second plurality of configurable workflows related to the second configurable strategy, the second plurality of configurable workflows comprising a third configurable workflow related to promoting a second product to the first customer;

determine a first suggested activity for a first worker based on the first set of activities of the first workflow, the second set of activities of the second workflow, a first time period during which the first suggested activity is to be performed, a location associated with the first suggested activity, and a frequency of occurrence associated with the first suggested activity;

determine a second suggested activity for the first worker responsive to a determination that the first worker is associated with the third workflow, wherein the second suggested activity is determined based on the first set of activities of the first configurable workflow, the second set of activities of the second configurable workflow, a third set of activities from the third configurable workflow, a second time period during which the second suggested activity is to be performed, a second location associated with the second suggested activity, and a second frequency of occurrence associated with the second suggested activity;

output, to the first worker, a schedule for the first time period and the first suggested activity, wherein the schedule comprises a plurality of scheduled activities associated with the first worker within the first time period; and output, to the first worker, the second suggested activity with the schedule for the first time period and the first suggested activity.

24. The non-transitory electronic storage media of claim 23, wherein the instructions are configured to cause the client computing platform to:

determine a rationale for the first suggested activity, wherein the rationale includes information related to a value of the first suggested activity to a customer associated with the first suggested activity; and output, to the first worker, the rationale for the first suggested activity with the first suggested activity.

25. The non-transitory electronic storage media of claim 23, wherein the instructions are configured to cause the client computing platform to:

receive, from the first worker, an indication regarding whether the first worker accepts or rejects the first suggested activity;

responsive to receiving the indication that the first worker accepts the first suggested activity, add the first suggested activity to the plurality of scheduled activities of the calendar.

26. The non-transitory electronic storage media of claim 23, wherein the instructions are configured to cause the client computing platform to:

access information related to a current location of the first worker;

determine a first timed suggested activity to output to the first worker with the schedule based on:
  the schedule for the first worker;
  the first set of activities of the first configurable workflow;
  the second set of activities of the second configurable workflow;
  the current location of the first worker; and
  an activity value associated with performing the first timed suggested activity in the first time period, wherein the activity value is calculated based on one or more of:
    information relating to a schedule of a client associated with the first timed suggested activity, a wait time associated with the first timed suggested activity, travel time from the current location to a location of the first timed suggested activity, or an amount of time passed since an activity similar to the first timed suggested activity occurred, and output, to the first worker, the first timed suggested activity with the schedule.

* * * * *